United States Patent

(12) United States Patent
Won

(10) Patent No.: US 12,294,932 B2
(45) Date of Patent: May 6, 2025

(54) METHODS, APPARATUSES, AND COMPUTER PROGRAM PRODUCTS FOR MANAGING A DEVICES NETWORK CAPABILITIES IN PRIVATE NETWORKS

(71) Applicant: NOKIA TECHNOLOGIES OY, Espoo (FI)

(72) Inventor: Sung Hwan Won, Flower Mound, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 31 days.

(21) Appl. No.: 17/176,306

(22) Filed: Feb. 16, 2021

(65) Prior Publication Data

US 2021/0258857 A1    Aug. 19, 2021

Related U.S. Application Data

(60) Provisional application No. 62/977,548, filed on Feb. 17, 2020.

(51) Int. Cl.
H04W 48/02 (2009.01)
H04W 48/18 (2009.01)
H04W 84/04 (2009.01)

(52) U.S. Cl.
CPC ........... *H04W 48/02* (2013.01); *H04W 48/18* (2013.01); *H04W 84/042* (2013.01)

(58) Field of Classification Search
CPC .... H04W 48/02; H04W 48/18; H04W 84/042
See application file for complete search history.

(56) References Cited

U.S. PATENT DOCUMENTS

2014/0153408 A1* 6/2014 Jun ..................... H04L 65/1066
370/250
2019/0045423 A1* 2/2019 Kumar ............... H04W 68/005
(Continued)

FOREIGN PATENT DOCUMENTS

CN    105530699 A  *  4/2016  ............ H04W 60/06
CN    110741688 A     1/2020
JP    2021052346 A *  4/2021

OTHER PUBLICATIONS

3gpp TS 24.501 version 15.1.0 Release 15 (Year: 2018).*
(Continued)

*Primary Examiner* — Charles N Appiah
*Assistant Examiner* — Nicole M Louis-Fils
(74) *Attorney, Agent, or Firm* — ALSTON & BIRD LLP

(57) ABSTRACT

Described is an approach for managing network capabilities for a user equipment (UE). A UE can maintain subscriber data that comprises an entry index of networks for which various access modes are enabled/disabled, and a counter for each network/access mode combination. After requesting access to a network, the UE may receive a non-integrity protected rejection message that indicates the network does not allow a particular access mode. Based on the cause of access rejection, the UE can disallow the particular access mode for the network, start a timer, and increment a counter associated with the network/access mode combination. Once the timer expires, if the counter value is below a threshold the UE re-enables the particular access mode for the network, or if the counter value is at or above the threshold, the UE removes the respective entry index for the particular access mode for the network.

9 Claims, 12 Drawing Sheets

(56) References Cited

U.S. PATENT DOCUMENTS

| | | | | |
|---|---|---|---|---|
| 2019/0174449 | A1 | 6/2019 | Shan et al. | |
| 2019/0357116 | A1* | 11/2019 | Huang-Fu | H04W 48/02 |
| 2020/0084818 | A1* | 3/2020 | Xu | H04W 76/18 |
| 2021/0051566 | A1* | 2/2021 | Tiwari | H04W 48/02 |
| 2021/0136659 | A1* | 5/2021 | Ianev | H04W 28/02 |
| 2021/0360723 | A1* | 11/2021 | Takakura | H04W 48/18 |
| 2022/0086790 | A1* | 3/2022 | Wang | H04W 60/04 |

OTHER PUBLICATIONS

"3rd Generation Partnership Project; Technical Specification Group Core Network and Terminals; Non-Access-Stratum (NAS) Protocol for 5G Systems (5GS); Stage 3; (Release 15)", 3GPP TS 24.501 v16.3.0 (Dec. 20, 2019), 645 pages.

"3rd Generation Partnership Project; Technical Specification Group Core Network and Terminals; Non-Access-Stratum (NAS) Functions Related to Mobile Station (MS) in Idle Mode (Release 16)", 3GPP TS 23.122 v16.4.0 (Dec. 19, 2019), 80 pages.

"3rd Generation Partnership Project; Technical Specification Group Services and System Aspects; Security Architecture and Procedures for 5G System (Release 16)", 3GPP TS 33.501 v.16.1.0 (Dec. 31, 2019), 202 pages.

"3rd Generation Partnership Project; Technical Specification Group Services and System Aspects; Service requirements for the 5G system; Stage 1 (Release 17)", 3GPP TS 22.261 v17.1.0 (Dec. 27, 2019), 83 pages.

"3rd Generation Partnership Project; Technical Specification Group Services and System Aspects; Procedures for the 5G System (5GS); Stage 2 (Release 16)" 3GPP TS 23.502 v16.3.0 (Dec. 22, 2019), 558 pages.

"3rd Generation Partnership Project; Technical Specification Group Core Network and Terminals; Non-Access-Stratum (NAS) protocol for Evolved Packet System (EPS); Stage 3 (Release 16)", 3GPP TS 24.301 v16.3.0 (Dec. 20, 2019), 570 pages.

"3rd Generation Partnership Project; Technical Specification Group Core Network and Terminals; Mobile radio interface Layer 3 specification; Core network protocols; Stage 3 (Release 16)" 3GPP TS 24.008 v16.3.0 (Dec. 20, 2019), 794 pages.

"3rd Generation Partnership Project; Technical Specification Group Radio Access Network; Evolved Universal Terrestrial Radio Access (E-UTRA); Radio Resource Control (RCC); Protocol Specification (Release 15)", 3GPP TS 36.331 v15.8.0 (Jan. 8, 2020), 964 pages.

"3rd Generation Partnership Project; Technical Specification Group Radio Access Network; NR; Radio Resource Control (RCC) Protocol Specification (Release 15)", 3GPP TS 38.331 v15.8.0 (Jan. 8, 2020), 532 pages.

"3rd Generation Partnership Project; Technical Specification Group Radio Access Network; Evolved Universal Terrestrial Radio Access (E-UTRA); User Equipment (UE) Procedures in Idle Mode (Releaase 15)", 3GPP TS 36.304 v15.5.0 (Jan. 7, 2020), 55 pages.

"3rd Generation Partnership Project; Technical Specification Group Radio Access Network; NR; User Equipment (UE) Procedures in Idle Mode and RRC Inactive State (Release 15)", 3GPP TS 38.304 v15.6.0 (Jan. 7, 2020), 30 pages.

International Search Report and Written Opinion for International Application No. PCT/EP2021/052688 dated May 3, 2021, 16 pages.

Nokia et al., "Lists of Forbidden Networks in an Snpn", 3GPP TSG-CT WG1 Meeting #119, C1-194621 (Aug. 26-30, 2019), 23 pages.

First Examination Report for Indian Application No. 202247052515 dated Nov. 25, 2022, 7 pages.

Office Action for Vietnamese Application No. 1-2022-05797 dated Oct. 7, 2022, 2 pages.

Office Action for Taiwanese Application No. 110105053 dated Jul. 13, 2022, 5 pages.

Notice of Allowance for Taiwanese Application No. 110105053 dated Jun. 28, 2023, 3 pages.

Office Action for Japanese Application No. 2022-549443 dated Sep. 26, 2023, 11 pages.

Office Action for Japanese Application No. 2022-549443 dated Jun. 25, 2024, 5 pages.

Office Action for European Application No. 21704211.8 dated Jul. 4, 2024, 3 pages.

Office Action for European Application No. 21704211.8 dated Feb. 6, 2025, 6 pages.

Office Action for Chinese Application No. 202180028867.6 dated Dec. 2, 2024, 10 pages.

Office Action for Japanese Application No. 2022-549443 dated Feb. 20, 2025, 8 pages.

* cited by examiner

METHODS, APPARATUSES, AND COMPUTER PROGRAM PRODUCTS FOR MANAGING A DEVICES NETWORK CAPABILITIES IN PRIVATE NETWORKS

CROSS-REFERENCE TO RELATED APPLICATIONS

This application claims benefit of U.S. Provisional Application No. 62/977,548, filed Feb. 17, 2020, the entire contents of which are incorporated herein by reference.

TECHNOLOGICAL FIELD

An example embodiment relates generally to managing communication in a communication system, and more particularly to managing a device's network capabilities in private networks.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system, at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined.

SUMMARY

When a conventional user equipment (UE) is accessing a network or requests access to the network and is denied access by the network, the UE may determine that a particular network access approach or interface is disallowed by the network. In such instances, a conventional UE typically must disable that particular network access approach or interface for all networks and/or disable all network access approaches or interfaces for that particular network. The system, apparatus, method, and computer program product described herein are, according to some embodiments, provided to solve at least some of the technical issues faced in conventional and emergent networks. For instance, an improved UE of some embodiments can be provided by physically, configurationally, operatively, and/or functionally modifying a conventional UE, such as a smart phone or the like, such that network capability information can be stored at the embodied UE in a much more granular and organized manner. This increased granularity of network access capabilities, e.g., by generating a hierarchical data storage structure in which subscriber information stores an index of network-specific entries, network access approach-specific, and/or interface-specific entries. In some embodiments, such a structure and the inclusion of such information in subscriber information at the UE may lead to a reduction in the number of instances in which the embodied UE is falsely disabled for a particular network, for a particular network access approach or interface, and/or for a particular network access approach or interface for a particular network. Said otherwise, the embodied apparatus (and/or the embodied method or the embodied computer program product), when practically applied to manage network access capabilities for a UE, can lead to less computational complexity and less messaging between the UE and the network or network entity because the UE does not need to continue requesting access from a network that has disallowed access for the UE. Likewise, the UE may retain a larger network availability and/or have a larger set of network access approaches or interfaces by which the UE can access networks, which leads to improved performance of the UE with regard to, e.g., the speed and availability of messaging between UE of different users, requesting services from a network, the provisioning of services by the network, the handling of emergency services, the downlink/uplink speed and bandwidth (capacity), and the like. Some described embodiments lead to substantial technical improvements of UE, such as a smart phone or another mobile device, when the UE is accessing a network or requesting access to a network, e.g., because the UE may be able to review a list of available networks, determine a particular network or subset of the list of available networks that the UE either knows can be accessed via a particular network access approach or interface or for which the UE does not have any information that the network does not allow a particular network access approach or interface. As such, the UE may send a message, such as an initial registration request or the like, to the particular network or subset of the list of available networks for registration or to request a service without having to use a conventional trial-and-error approach and/or without having to send extraneous messages back and forth between the UE and each of the available networks in order to request information regarding a networks capabilities and/or what access approaches/interfaces are allowed/disallowed by the network. This may also lead the UE to be able to receive a registration acceptance message from a requested network more rapidly because there is a lower likelihood that the network to which the UE requested access is going to deny access. Over time, the UE may continue to update and improve the index of network entries containing network capability information such that the UE may reduce the time required to access a network, receive a provisioned service, send a message, upload/download packets, etc.

As such, described herein are approaches for managing network capabilities for UEs. Embodied UEs may maintain subscriber data that comprises an entry index of networks for which various access modes are enabled/disabled, and a counter for each network/access mode combination. After requesting access to a network, the UE may receive a non-integrity protected rejection message that indicates the network does not allow a particular access mode. Based on the cause of access rejection, the UE can disallow the particular access mode for the network, start a timer, and increment a counter associated with the network/access mode combination. Once the timer expires, if the counter value is below a threshold the UE re-enables the particular access mode for the network, or if the counter value is at or above the threshold, the UE removes the respective entry index for the particular access mode for the network. As such, provided herein are methods, apparatuses, and computer program products in accordance with example embodiments for managing a device's network capabilities in private networks.

In some embodiments, a method can comprise maintaining, for a user equipment, a list of subscriber data for one or more networks, the list of subscriber data comprising one or more entries, each of which includes an entry index or a network identity and is used to send a request to a particular network; maintaining one or more counters, for each of the one or more entries; maintaining a list of one or more entry indices of entries which are used to send requests to particular networks not allowing the particular network access mode or a list of one or more network identities of particular networks not allowing the particular network access mode; in an instance in which a non-integrity protected rejection message to the request is received from the particular network that indicates the particular network does not allow a particular network access mode, disabling the particular network access mode for the entry used to send a request or the particular network, starting a timer, and incrementing the one of the one or more counters associated with the entry; once the timer expires, in an instance in which a counter value for the one of the one or more counters is below a predetermined threshold, re-enabling the particular network access mode for the entry used to send a request or the particular network; and once the timer expires, in an instance in which the counter value for the one of the one or more counters satisfies the predetermined threshold, including the index of the entry used to send a request or the identity of the particular network in the list of one or more entry indices or the list of one or more network identities. In some embodiments, the particular network access mode comprises one from among a trusted network access mode, an untrusted network access mode, or a non-access stratum interface or protocol. In some embodiments, the one or more networks comprise at least one of a non-public network (NPN), a private network, a standalone non-public network (SNPN), an NPN deployed in conjunction with a public network, an NPN deployed in conjunction with a public land mobile network (PLMN), an NPN deployed in conjunction with a public network using a shared radio access network, an NPN deployed in conjunction with a public network using a shared radio access network and a shared control plane, an NPN deployed in a public network, or an NPN deployed in a PLMN. In some embodiments, the non-integrity protected rejection message comprises an indication that the N1 mode is not allowed for the particular network or an indication that an untrusted network access mode is not allowed for the particular network. In some embodiments, the one or more networks comprise an NPN deployed in conjunction with a PLMN, wherein the user equipment is deployed in a PLMN access mode, and the list of subscriber data comprises a list of PLMNs. In some embodiments, the predetermined threshold for the one of the one or more counters is implementation dependent and specific to the particular network access mode and the indication received in the non-integrity protected rejection message.

In some embodiments, an apparatus can comprise at least one processor; and at least one memory including computer program code, the at least one memory and the computer program code configured to, with the at least one processor, cause the apparatus at least to perform: maintaining, for a user equipment, a list of subscriber data for one or more networks, the list of subscriber data comprising one or more entries, each of which includes an entry index or a network identity and is used to send a request to a particular network; maintaining one or more counters, for each of the one or more entries; maintaining a list of one or more entry indices of entries which are used to send requests to particular networks not allowing the particular network access mode or a list of one or more network identities of particular networks not allowing the particular network access mode; in an instance in which a non-integrity protected rejection message to the request is received from the particular network that indicates the particular network does not allow a particular network access mode, disabling the particular network access mode for the entry used to send a request or the particular network, starting a timer, and incrementing the one of the one or more counters associated with the entry; once the timer expires, in an instance in which a counter value for the one of the one or more counters is below a predetermined threshold, re-enabling the particular network access mode for the entry used to send a request or the particular network; and once the timer expires, in an instance in which the counter value for the one of the one or more counters satisfies the predetermined threshold, including the index of the entry used to send a request or the identity of the particular network in the list of one or more entry indices or the list of one or more network identities. In some embodiments, the particular network access mode comprises one from among a trusted network access mode, an untrusted network access mode, or a non-access stratum interface or protocol. In some embodiments, the one or more networks comprise at least one of a non-public network (NPN), a private network, a standalone non-public network (SNPN), an NPN deployed in conjunction with a public network, an NPN deployed in conjunction with a public land mobile network (PLMN), an NPN deployed in conjunction with a public network using a shared radio access network, an NPN deployed in conjunction with a public network using a shared radio access network and a shared control plane, an NPN deployed in a public network, or an NPN deployed in a PLMN. In some embodiments, the non-integrity protected rejection message comprises an indication that the N1 mode is not allowed for the particular network or an indication that an untrusted network access mode is not allowed for the particular network. In some embodiments, the one or more networks comprise an NPN deployed in conjunction with a PLMN, wherein the user equipment is deployed in a PLMN access mode, and the list of subscriber data comprises a list of PLMNs. In some embodiments, the predetermined threshold for the one of the one or more counters is implementation dependent and specific to the particular network access mode and the indication received in the non-integrity protected rejection message.

In some embodiments, an apparatus can comprise means, such as a processor or processing circuitry and a memory storing computer program code, for maintaining, for a user equipment, a list of subscriber data for one or more networks, the list of subscriber data comprising one or more entries, each of which includes an entry index or a network identity and is used to send a request to a particular network; means for maintaining one or more counters, for each of the one or more entries; means for maintaining a list of one or more entry indices of entries which are used to send requests to particular networks not allowing the particular network access mode or a list of one or more network identities of particular networks not allowing the particular network access mode; means for, in an instance in which a non-integrity protected rejection message to the request is received from the particular network that indicates the particular network does not allow a particular network access mode, disabling the particular network access mode for the entry used to send a request or the particular network, starting a timer, and incrementing the one of the one or more counters associated with the entry; means for, once the timer expires, in an instance in which a counter value for the one of the one or more counters is below a predetermined threshold, re-enabling the particular network access mode for the entry used to send a request or the particular network; and means for, once the timer expires, in an instance in which the counter value for the one of the one or more counters satisfies the predetermined threshold, including the index of the entry used to send a request or the identity of the particular network in the list of one or more entry indices or the list of one or more network identities. In some embodiments, the particular network access mode comprises one from among a trusted network access mode, an untrusted network access mode, or a non-access stratum interface or protocol. In some embodiments, the one or more networks comprise at least one of a non-public network (NPN), a private network, a standalone non-public network (SNPN), an NPN deployed in conjunction with a public network, an NPN deployed in conjunction with a public land mobile network (PLMN), an NPN deployed in conjunction with a public network using a shared radio access network, an NPN deployed in conjunction with a public network using a shared radio access network and a shared control plane, an NPN deployed in a public network, or an NPN deployed in a PLMN. In some embodiments, the non-integrity protected rejection message comprises an indication that the N1 mode is not allowed for the particular network or an indication that an untrusted network access mode is not allowed for the particular network. In some embodiments, the one or more networks comprise an NPN deployed in conjunction with a PLMN, wherein the user equipment is deployed in a PLMN access mode, and the list of subscriber data comprises a list of PLMNs. In some embodiments, the predetermined threshold for the one of the one or more counters is implementation dependent and specific to the particular network access mode and the indication received in the non-integrity protected rejection message.

In some embodiments, a computer program product can comprise a non-transitory computer readable medium comprising computer instructions stored thereon for performing at least the following: maintaining, for a user equipment, a list of subscriber data for one or more networks, the list of subscriber data comprising one or more entries, each of which includes an entry index or a network identity and is used to send a request to a particular network; maintaining one or more counters, for each of the one or more entries; maintaining a list of one or more entry indices of entries which are used to send requests to particular networks not allowing the particular network access mode or a list of one or more network identities of particular networks not allowing the particular network access mode; in an instance in which a non-integrity protected rejection message to the request is received from the particular network that indicates the particular network does not allow a particular network access mode, disabling the particular network access mode for the entry used to send a request or the particular network, starting a timer, and incrementing the one of the one or more counters associated with the entry; once the timer expires, in an instance in which a counter value for the one of the one or more counters is below a predetermined threshold, re-enabling the particular network access mode for the entry used to send a request or the particular network; and once the timer expires, in an instance in which the counter value for the one of the one or more counters satisfies the predetermined threshold, including the index of the entry used to send a request or the identity of the particular network in the list of one or more entry indices or the list of one or more network identities. In some embodiments, the particular network access mode comprises one from among a trusted network access mode, an untrusted network access mode, or a non-access stratum interface or protocol. In some embodiments, the one or more networks comprise at least one of a non-public network (NPN), a private network, a standalone non-public network (SNPN), an NPN deployed in conjunction with a public network, an NPN deployed in conjunction with a public land mobile network (PLMN), an NPN deployed in conjunction with a public network using a shared radio access network, an NPN deployed in conjunction with a public network using a shared radio access network and a shared control plane, an NPN deployed in a public network, or an NPN deployed in a PLMN. In some embodiments, the non-integrity protected rejection message comprises an indication that the N1 mode is not allowed for the particular network or an indication that an untrusted network access mode is not allowed for the particular network. In some embodiments, the one or more networks comprise an NPN deployed in conjunction with a PLMN, wherein the user equipment is deployed in a PLMN access mode, and the list of subscriber data comprises a list of PLMNs. In some embodiments, the predetermined threshold for the one of the one or more counters is implementation dependent and specific to the particular network access mode and the indication received in the non-integrity protected rejection message.

In some embodiments, a method can comprise maintaining, for a user equipment, a list of subscriber data for one or more networks, the list of subscriber data comprising one or more entries, each of which includes an entry index or a network identity and is used to send a request to a particular network; maintaining a list of one or more entry indices of entries which are used to send requests to particular networks not allowing the particular network access mode or a list of one or more network identities of particular networks not allowing the particular network access mode; in an instance in which an integrity protected rejection message to the request is received from the particular network that indicates the particular network does not allow a particular network access mode, disabling the particular network access mode for the entry used to send a request or the particular network; and including the index of the entry used to send a request or the identity of the particular network in the list of one or more entry indices or the identity of the particular network in the list of one or more network identities.

In some embodiments, an apparatus can comprise at least one processor; and at least one memory including computer program code, the at least one memory and the computer program code configured to, with the at least one processor, cause the apparatus at least to perform: maintaining, for a user equipment, a list of subscriber data for one or more networks, the list of subscriber data comprising one or more entries, each of which includes an entry index or a network identity and is used to send a request to a particular network; maintaining a list of one or more entry indices of entries which are used to send requests to particular networks not allowing the particular network access mode or a list of one or more network identities of particular networks not allowing the particular network access mode; in an instance in which an integrity protected rejection message to the request is received from the particular network that indicates the particular network does not allow a particular network access mode, disabling the particular network access mode for the entry used to send a request or the particular network; and once the timer expires, including the index of the entry used to send a request or the identity of the particular network in the list of one or more entry indices or the list of one or more network identities.

In some embodiments, an apparatus can comprise means, such as a processor or processing circuitry and a memory storing computer program code, for maintaining, for a user equipment, a list of subscriber data for one or more networks, the list of subscriber data comprising one or more entries, each of which includes an entry index or a network identity and is used to send a request to a particular network; means for maintaining a list of one or more entry indices of entries which are used to send requests to particular networks not allowing the particular network access mode or a list of one or more network identities of particular networks not allowing the particular network access mode; means for, in an instance in which an integrity protected rejection message to the request is received from the particular network that indicates the particular network does not allow a particular network access mode, disabling the particular network access mode for the entry used to send a request or the particular network; and means for, once the timer expires, including the index of the entry used to send a request or the identity of the particular network in the list of one or more entry indices or the list of one or more network identities.

In some embodiments, a computer program product can comprise a non-transitory computer readable medium comprising computer instructions stored thereon for performing at least the following: maintaining, for a user equipment, a list of subscriber data for one or more networks, the list of subscriber data comprising one or more entries, each of which includes an entry index or a network identity and is used to send a request to a particular network; maintaining a list of one or more entry indices of entries which are used to send requests to particular networks not allowing the particular network access mode or a list of one or more network identities of particular networks not allowing the particular network access mode; in an instance in which an integrity protected rejection message to the request is received from the particular network that indicates the particular network does not allow a particular network access mode, disabling the particular network access mode for the entry used to send a request or the particular network; and once the timer expires, including the index of the entry used to send a request or the identity of the particular network in the list of one or more entry indices or the list of one or more network identities.

In some embodiments, a method can comprise maintaining, for a user equipment, a list of subscriber data for one or more networks, the list of subscriber data comprising an entry index comprising a list of networks for which one or more network access modes are disabled; maintaining one or more counters, for each of the one or more networks, of access attempts via the one or more network access modes; in an instance in which a non-integrity protected rejection message is received that indicates a particular network of the one or more networks is not configured for a particular network access mode of the one or more network access modes, disabling the particular network access mode for the particular network, starting a timer, and incrementing one of the one or more counters associated with the particular network; once the timer expires, in an instance in which a counter value for the one of the one or more counters is below a predetermined threshold, re-enabling the particular network access mode for the particular network; and once the timer expires, in an instance in which the counter value for the one of the one or more counters satisfies the predetermined threshold, removing the respective entry index for the particular access mode for the particular network from the list of subscriber data.

In some embodiments, an apparatus can comprise at least one processor; and at least one memory including computer program code, the at least one memory and the computer program code configured to, with the at least one processor, cause the apparatus at least to perform: maintaining, for a user equipment, a list of subscriber data for one or more networks, the list of subscriber data comprising an entry index comprising a list of networks for which one or more network access modes are disabled; maintaining one or more counters, for each of the one or more networks, of access attempts via the one or more network access modes; in an instance in which a non-integrity protected rejection message is received that indicates a particular network of the one or more networks is not configured for a particular network access mode of the one or more network access modes, disabling the particular network access mode for the particular network, starting a timer, and incrementing one of the one or more counters associated with the particular network; once the timer expires, in an instance in which a counter value for the one of the one or more counters is below a predetermined threshold, re-enabling the particular network access mode for the particular network; and once the timer expires, in an instance in which the counter value for the one of the one or more counters satisfies the predetermined threshold, removing the respective entry index for the particular access mode for the particular network from the list of subscriber data.

In some embodiments, an apparatus can comprise means, such as a processor or processing circuitry and a memory storing computer program code, for maintaining, for a user equipment, a list of subscriber data for one or more networks, the list of subscriber data comprising an entry index comprising a list of networks for which one or more network access modes are disabled; means for maintaining one or more counters, for each of the one or more networks, of access attempts via the one or more network access modes; means for, in an instance in which a non-integrity protected rejection message is received that indicates a particular network of the one or more networks is not configured for a particular network access mode of the one or more network access modes, disabling the particular network access mode for the particular network, starting a timer, and incrementing one of the one or more counters associated with the particular network; means for, in an instance in which a counter value for the one of the one or more counters is below a predetermined threshold once the timer expires, re-enabling the particular network access mode for the particular network; and means for, in an instance in which the counter value for the one of the one or more counters satisfies the predetermined threshold once the timer expires, removing the respective entry index for the particular access mode for the particular network from the list of subscriber data.

In some embodiments, a computer program product can comprise a non-transitory computer readable medium comprising computer instructions stored thereon for performing at least the following: maintaining, for a user equipment, a list of subscriber data for one or more networks, the list of subscriber data comprising an entry index comprising a list of networks for which one or more network access modes are disabled; maintaining one or more counters, for each of the one or more networks, of access attempts via the one or more network access modes; in an instance in which a non-integrity protected rejection message is received that indicates a particular network of the one or more networks is not configured for a particular network access mode of the one or more network access modes, disabling the particular network access mode for the particular network, starting a timer, and incrementing one of the one or more counters associated with the particular network; once the timer expires, in an instance in which a counter value for the one of the one or more counters is below a predetermined threshold, re-enabling the particular network access mode for the particular network; and once the timer expires, in an instance in which the counter value for the one of the one or more counters satisfies the predetermined threshold, removing the respective entry index for the particular access mode for the particular network from the list of subscriber data.

In some embodiments, a method can comprise compiling a list of networks for which one or more access modes or one or more access types have been disabled at a user equipment; transmitting, from a user equipment to a network entity of a network, via a particular access mode, for a particular access type, an initial registration request message or a service request message; receiving from said network entity, in response to the initial registration request or the service request message, a rejection message comprising an indication of a reason for rejection of the initial registration request message or the service request message; in an instance in which the reason is that the particular access mode is a N1 access mode and the network entity is not configured for N1 access, determining a number of times the rejection message has been received from the network entity and, if the number of times satisfies a threshold, adding an entry for the network to said list of networks; and, in an instance in which the reason is that the particular access type is an untrusted access type and the network is not configured for untrusted access, determining a number of times the rejection message has been received from the network entity and, if the number of times satisfies a threshold, adding an entry for the particular access type, associated with the network, to said list of networks.

In some embodiments, an apparatus can comprise at least one processor; and at least one memory including computer program code, the at least one memory and the computer program code configured to, with the at least one processor, cause the apparatus at least to perform: compiling a list of networks for which one or more access modes or one or more access types have been disabled at a user equipment; transmitting, from a user equipment to a network entity of a network, via a particular access mode, for a particular access type, an initial registration request message or a service request message; receiving from said network entity, in response to the initial registration request or the service request message, a rejection message comprising an indication of a reason for rejection of the initial registration request message or the service request message; in an instance in which the reason is that the particular access mode is a N1 access mode and the network entity is not configured for N1 access, determining a number of times the rejection message has been received from the network entity and, if the number of times satisfies a threshold, adding an entry for the network to said list of networks; and, in an instance in which the reason is that the particular access type is an untrusted access type and the network is not configured for untrusted access, determining a number of times the rejection message has been received from the network entity and, if the number of times satisfies a threshold, adding an entry for the particular access type, associated with the network, to said list of networks.

In some embodiments, an apparatus can comprise means, such as a processor or processing circuitry and a memory storing computer program code, for compiling a list of networks for which one or more access modes or one or more access types have been disabled at a user equipment; means for transmitting, from a user equipment to a network entity of a network, via a particular access mode, for a particular access type, an initial registration request message or a service request message; means for receiving from said network entity, in response to the initial registration request or the service request message, a rejection message comprising an indication of a reason for rejection of the initial registration request message or the service request message; means for, in an instance in which the reason is that the particular access mode is a N1 access mode and the network entity is not configured for N1 access, determining a number of times the rejection message has been received from the network entity and, if the number of times satisfies a threshold, adding an entry for the network to said list of networks; and means for, in an instance in which the reason is that the particular access type is an untrusted access type and the network is not configured for untrusted access, determining a number of times the rejection message has been received from the network entity and, if the number of times satisfies a threshold, adding an entry for the particular access type, associated with the network, to said list of networks.

In some embodiments, a computer program product can comprise a non-transitory computer readable medium comprising computer instructions stored thereon for performing at least the following: compiling a list of networks for which one or more access modes or one or more access types have been disabled at a user equipment; transmitting, from a user equipment to a network entity of a network, via a particular access mode, for a particular access type, an initial registration request message or a service request message; receiving from said network entity, in response to the initial registration request or the service request message, a rejection message comprising an indication of a reason for rejection of the initial registration request message or the service request message; in an instance in which the reason is that the particular access mode is a N1 access mode and the network entity is not configured for N1 access, determining a number of times the rejection message has been received from the network entity and, if the number of times satisfies a threshold, adding an entry for the network to said list of networks; and, in an instance in which the reason is that the particular access type is an untrusted access type and the network is not configured for untrusted access, determining a number of times the rejection message has been received from the network entity and, if the number of times satisfies a threshold, adding an entry for the particular access type, associated with the network, to said list of networks.

In some embodiments, a method can comprise retrieving a list of subscriber data for a user equipment and associated with one or more networks, the list of subscriber data comprising one or more entries, each of the one or more entries including an entry index or a network identity, the one or more entries being operable to track sending of a request to a particular network or to track rejections received by the particular network; providing one or more counters for each of the one or more entries; retrieving a list of one or more entry indices of entries operable to be used to send requests to particular networks not allowing a particular network access mode or a list of one or more network identities of particular networks not allowing the particular network access mode; sending, using a particular entry associated with the particular network and the particular network access mode, a request to the particular network, wherein the request comprises one of an initial registration request or a service request; in an instance in which, in response to the sending of the request to the particular network, a non-integrity protected rejection message is received from the particular network that indicates the particular network does not allow the particular network access mode, disabling the particular network access mode for the particular entry used to send the request or the particular network, starting a timer, and incrementing a corresponding counter of the one or more counters associated with the particular entry, the corresponding counter being associated with a cause value indicated in the non-integrity protected rejection message; and, once the timer expires, in an instance in which a counter value for the corresponding counter of the one or more counters is below a predetermined threshold, re-enabling the particular network access mode for the particular entry used to send the request or the particular network; or, once the timer expires, in an instance in which the counter value for the corresponding counter of the one or more counters is equal to or greater than the predetermined threshold, including the index of the particular entry used to send the request or the identity of the particular network in the list of one or more entry indices or the list of one or more network identities.

In some embodiments, an apparatus can comprise at least one processor; and at least one memory including computer program code, the at least one memory and the computer program code configured to, with the at least one processor, cause the apparatus at least to perform: retrieving a list of subscriber data for a user equipment and associated with one or more networks, the list of subscriber data comprising one or more entries, each of the one or more entries including an entry index or a network identity, the one or more entries being operable to track sending of a request to a particular network or to track rejections received by the particular network; providing one or more counters for each of the one or more entries; retrieving a list of one or more entry indices of entries operable to be used to send requests to particular networks not allowing a particular network access mode or a list of one or more network identities of particular networks not allowing the particular network access mode; sending, using a particular entry associated with the particular network and the particular network access mode, a request to the particular network, wherein the request comprises one of an initial registration request or a service request; in an instance in which, in response to the sending of the request to the particular network, a non-integrity protected rejection message is received from the particular network that indicates the particular network does not allow the particular network access mode, disabling the particular network access mode for the particular entry used to send the request or the particular network, starting a timer, and incrementing a corresponding counter of the one or more counters associated with the particular entry, the corresponding counter being associated with a cause value indicated in the non-integrity protected rejection message; and once the timer expires, in an instance in which a counter value for the corresponding counter of the one or more counters is below a predetermined threshold, re-enabling the particular network access mode for the particular entry used to send the request or the particular network; or once the timer expires, in an instance in which the counter value for the corresponding counter of the one or more counters is equal to or greater than the predetermined threshold, including the index of the particular entry used to send the request or the identity of the particular network in the list of one or more entry indices or the list of one or more network identities.

In some embodiments, an apparatus can comprise means, such as a processor or processing circuitry and a memory storing computer program code, for retrieving a list of subscriber data for a user equipment and associated with one or more networks, the list of subscriber data comprising one or more entries, each of the one or more entries including an entry index or a network identity, the one or more entries being operable to track sending of a request to a particular network or to track rejections received by the particular network; means for providing one or more counters for each of the one or more entries; means for retrieving a list of one or more entry indices of entries operable to be used to send requests to particular networks not allowing a particular network access mode or a list of one or more network identities of particular networks not allowing the particular network access mode; means for sending, using a particular entry associated with the particular network and the particular network access mode, a request to the particular network, wherein the request comprises one of an initial registration request or a service request; means for, in an instance in which, in response to the sending of the request to the particular network, a non-integrity protected rejection message is received from the particular network that indicates the particular network does not allow the particular network access mode, disabling the particular network access mode for the particular entry used to send the request or the particular network, starting a timer, and incrementing a corresponding counter of the one or more counters associated with the particular entry, the corresponding counter being associated with a cause value indicated in the non-integrity protected rejection message; and means for, once the timer expires, in an instance in which a counter value for the corresponding counter of the one or more counters is below a predetermined threshold, re-enabling the particular network access mode for the particular entry used to send the request or the particular network; or means for, once the timer expires, in an instance in which the counter value for the corresponding counter of the one or more counters is equal to or greater than the predetermined threshold, including the index of the particular entry used to send the request or the identity of the particular network in the list of one or more entry indices or the list of one or more network identities.

In some embodiments, a computer program product can comprise a non-transitory computer readable medium comprising computer instructions stored thereon for performing at least the following: retrieving a list of subscriber data for a user equipment and associated with one or more networks, the list of subscriber data comprising one or more entries, each of the one or more entries including an entry index or a network identity, the one or more entries being operable to track sending of a request to a particular network or to track rejections received by the particular network; providing one or more counters for each of the one or more entries; retrieving a list of one or more entry indices of entries operable to be used to send requests to particular networks not allowing a particular network access mode or a list of one or more network identities of particular networks not allowing the particular network access mode; sending, using a particular entry associated with the particular network and the particular network access mode, a request to the particular network, wherein the request comprises one of an initial registration request or a service request; in an instance in which, in response to the sending of the request to the particular network, a non-integrity protected rejection message is received from the particular network that indicates the particular network does not allow the particular network access mode, disabling the particular network access mode for the particular entry used to send the request or the particular network, starting a timer, and incrementing a corresponding counter of the one or more counters associated with the particular entry, the corresponding counter being associated with a cause value indicated in the non-integrity protected rejection message; and once the timer expires, in an instance in which a counter value for the corresponding counter of the one or more counters is below a predetermined threshold, re-enabling the particular network access mode for the particular entry used to send the request or the particular network; or once the timer expires, in an instance in which the counter value for the corresponding counter of the one or more counters is equal to or greater than the predetermined threshold, including the index of the particular entry used to send the request or the identity of the particular network in the list of one or more entry indices or the list of one or more network identities.

Various other aspects are also described in the following detailed description and in the attached claims.

BRIEF DESCRIPTION OF THE DRAWINGS

Figure 1:
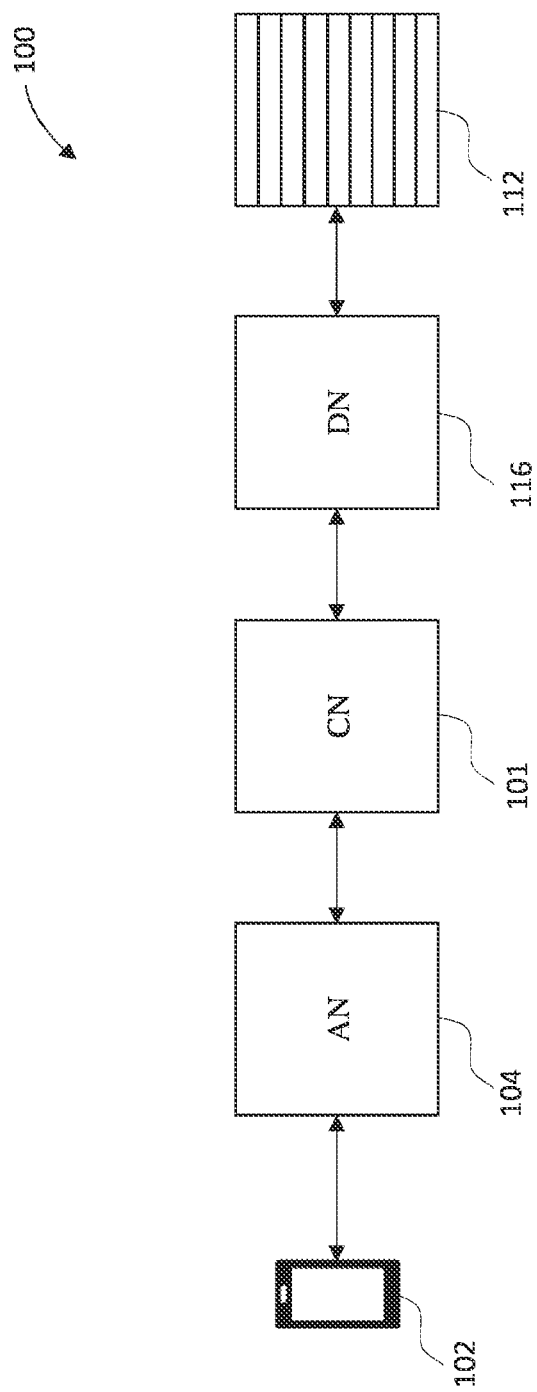
Figure 2:
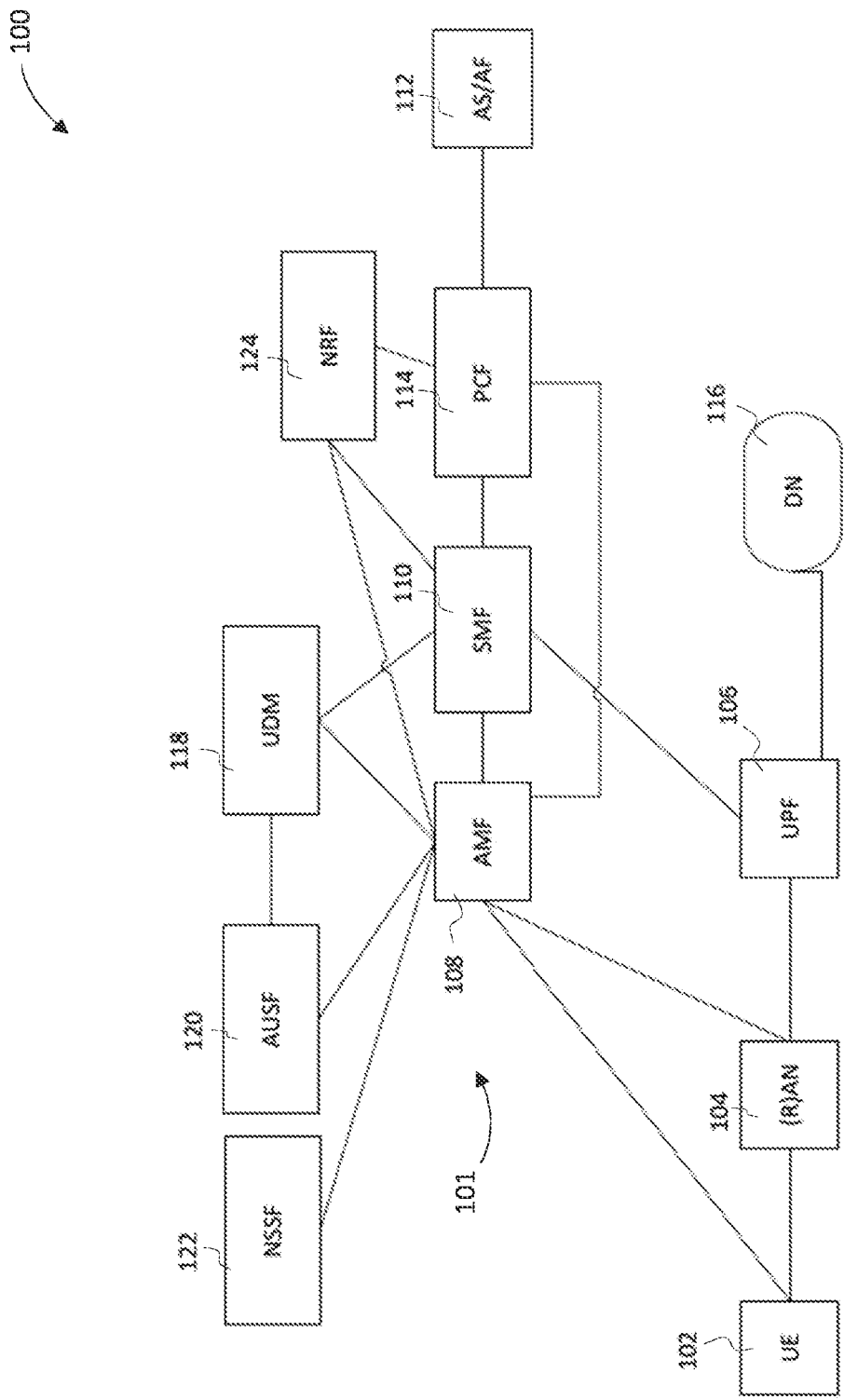
Figure 3:
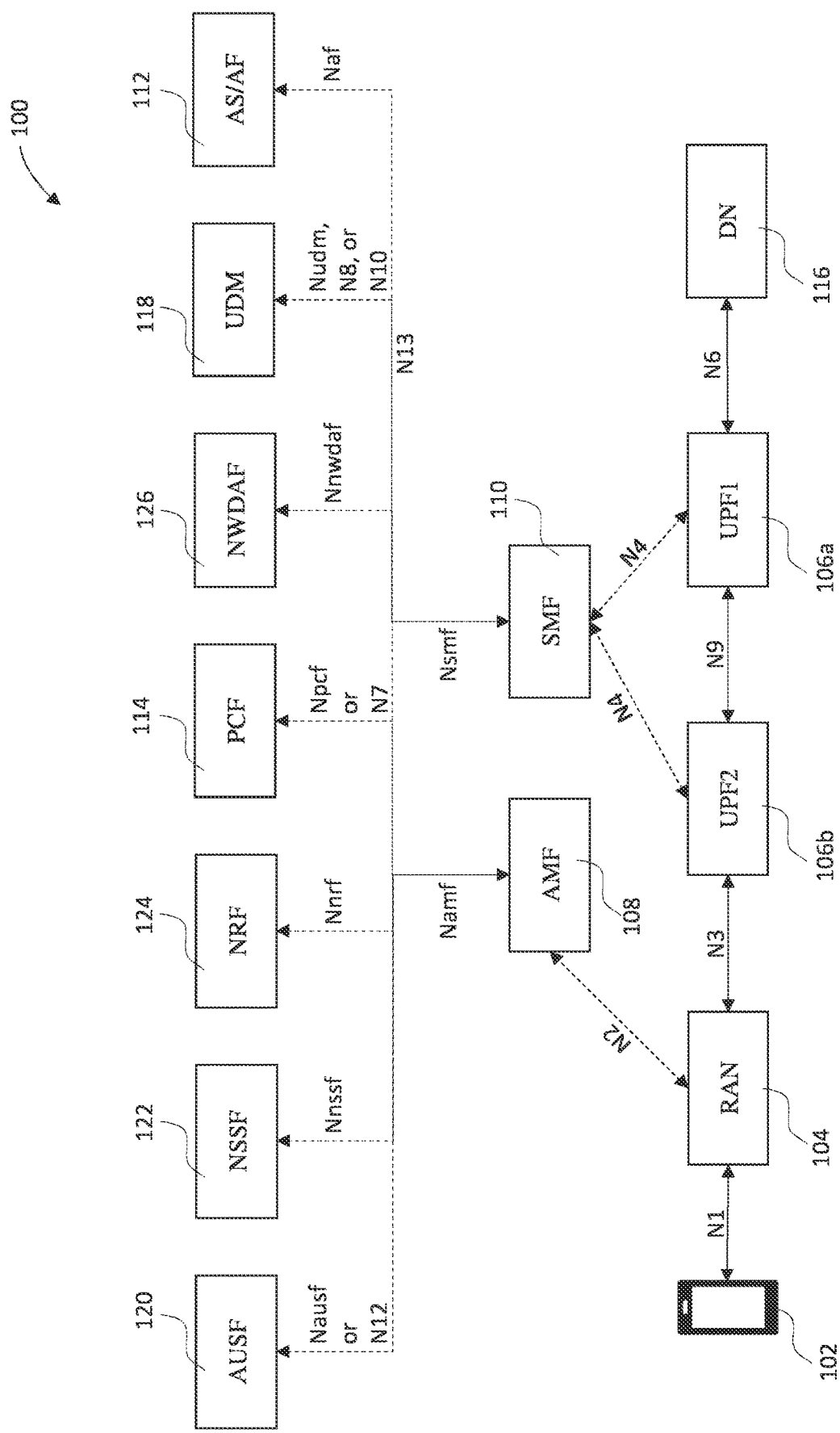
Figure 4:
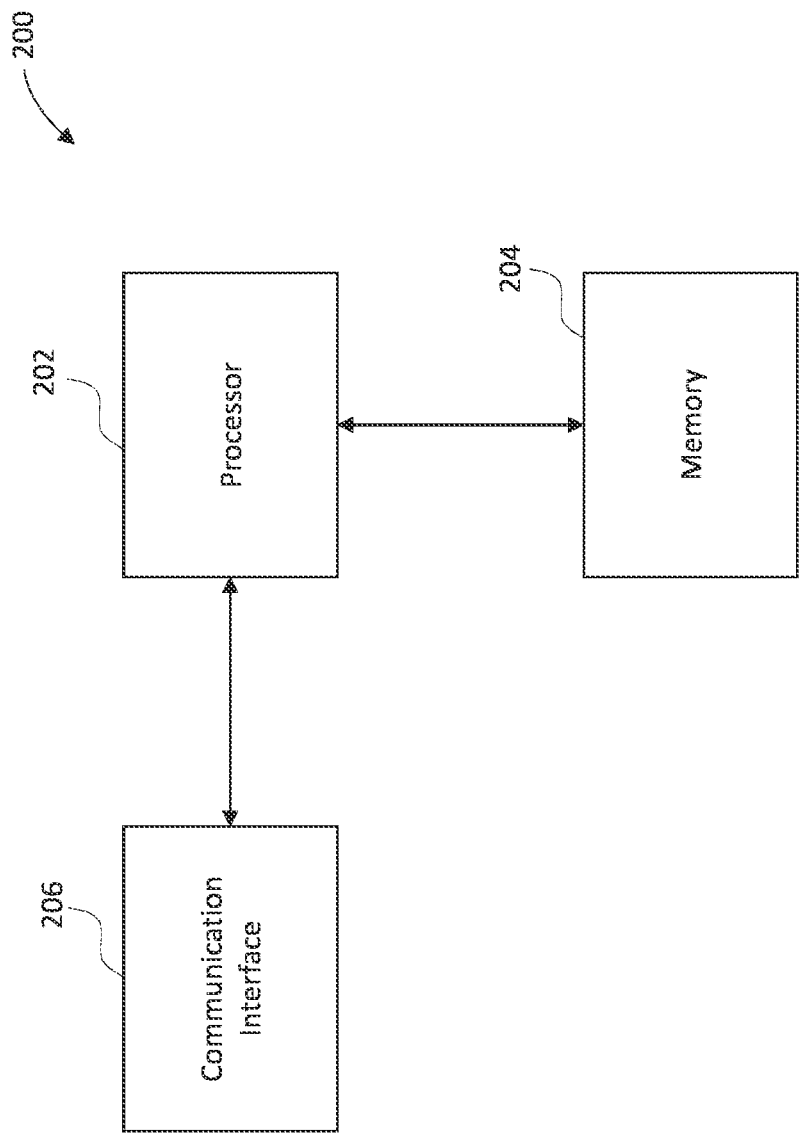
Figure 5:
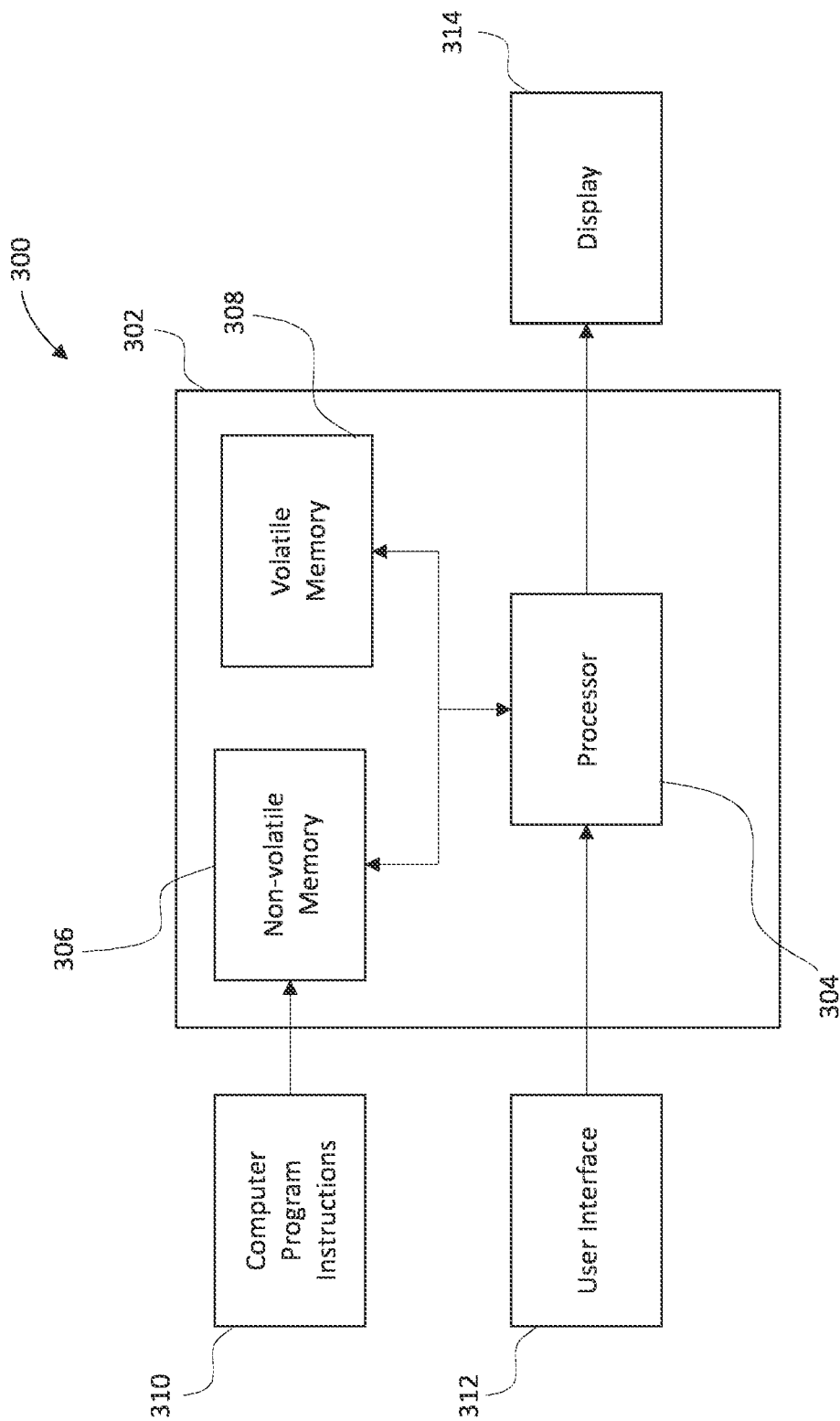
Figure 6:
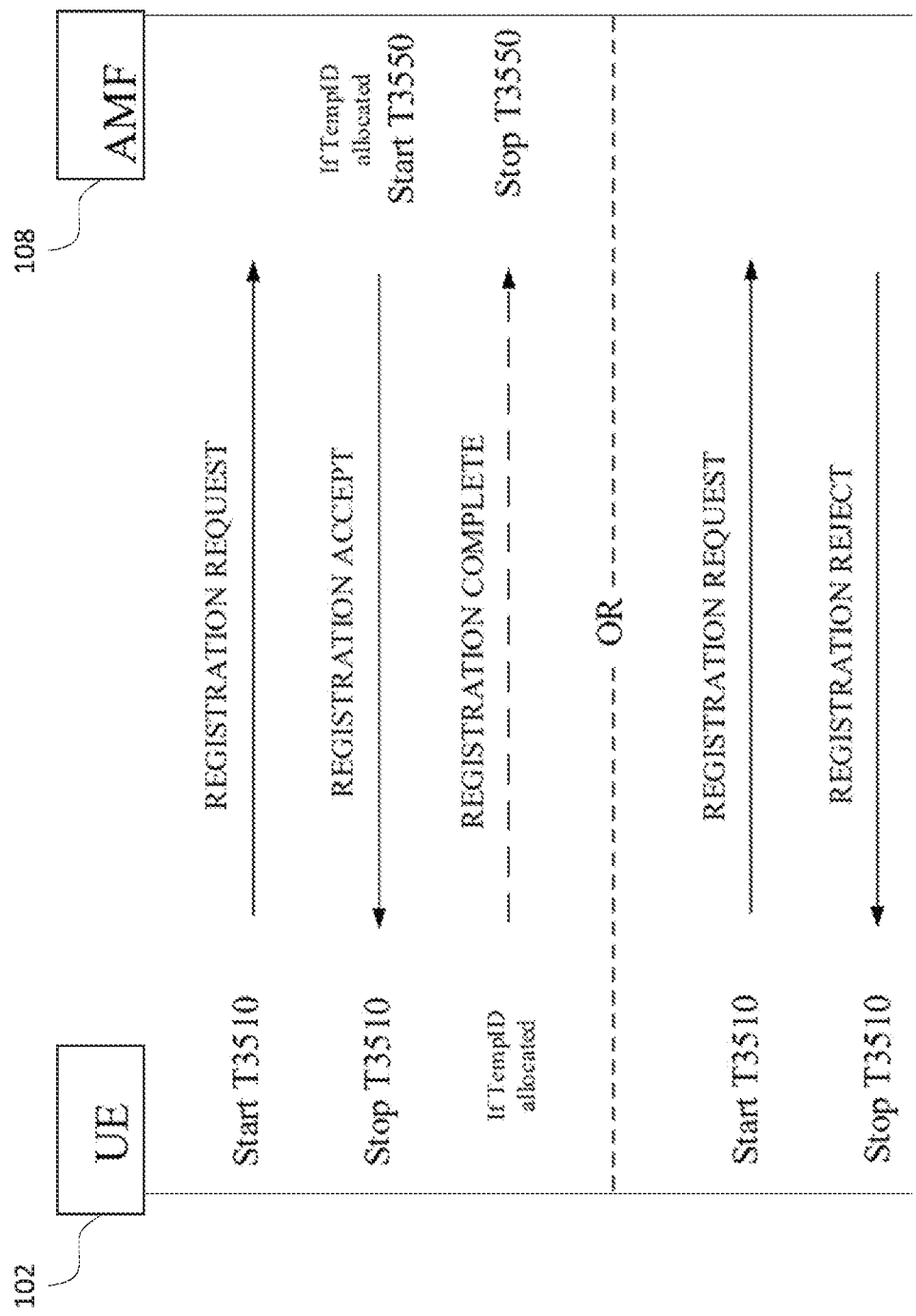
Figure 7:
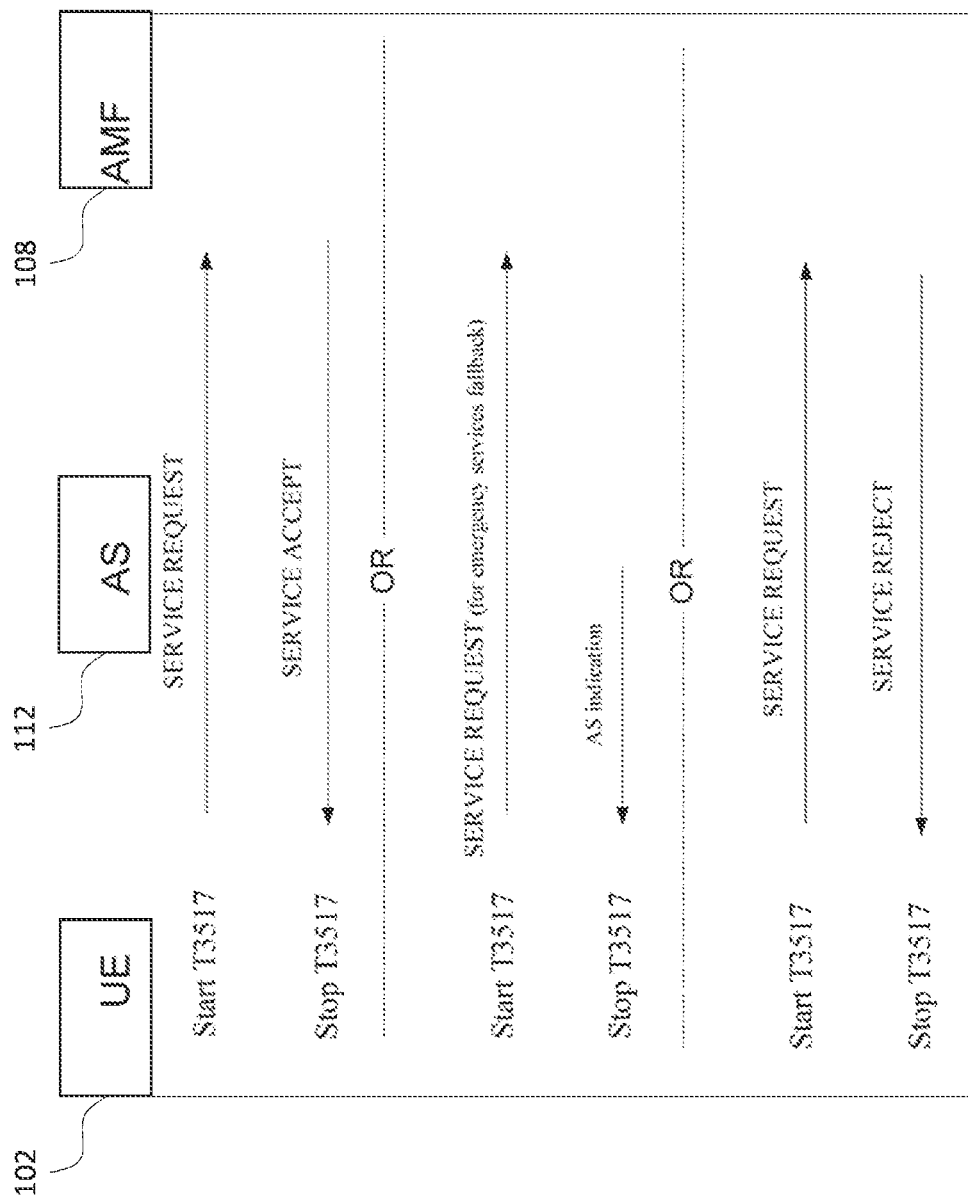
Figure 8:
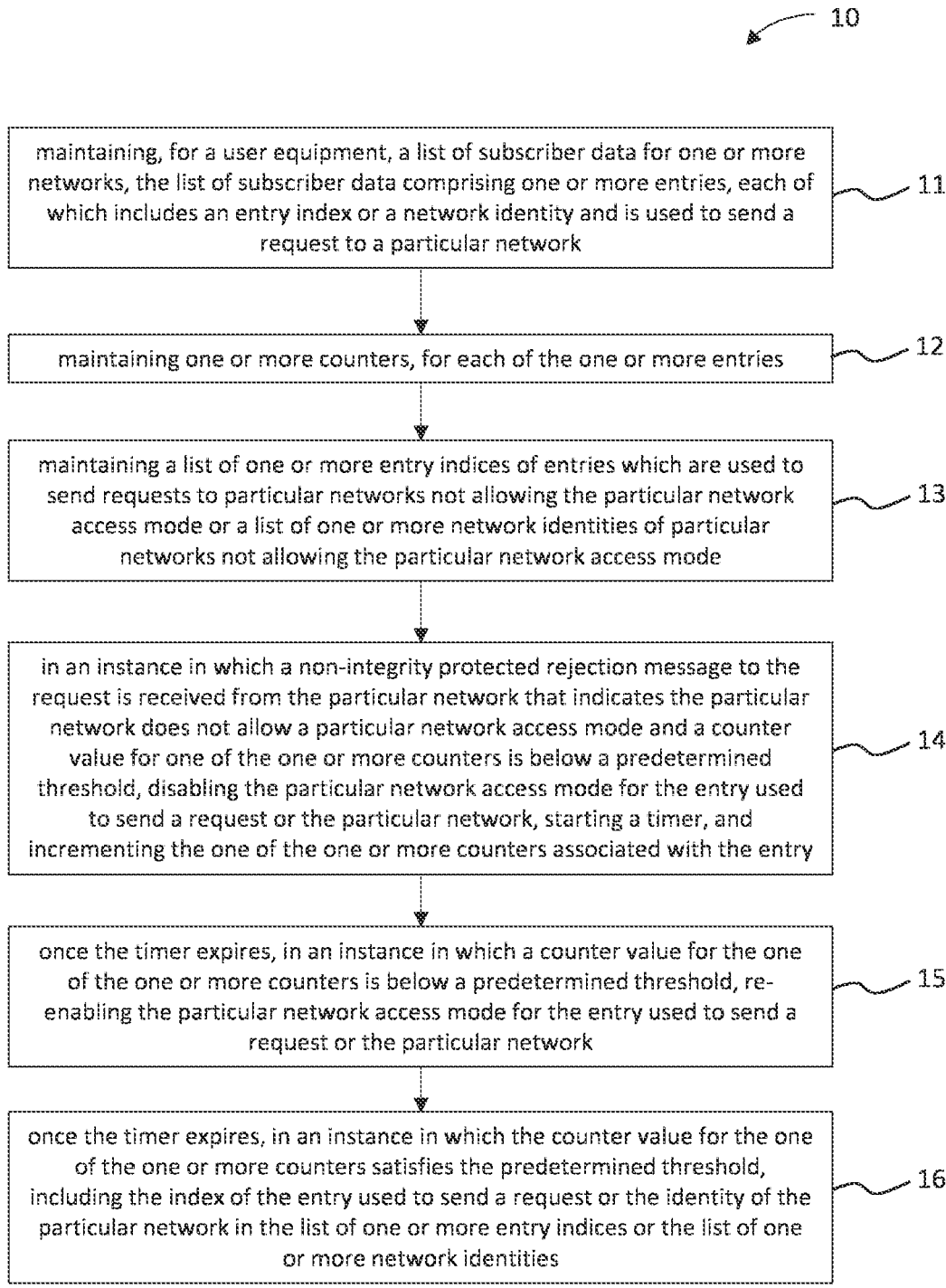
Figure 9:
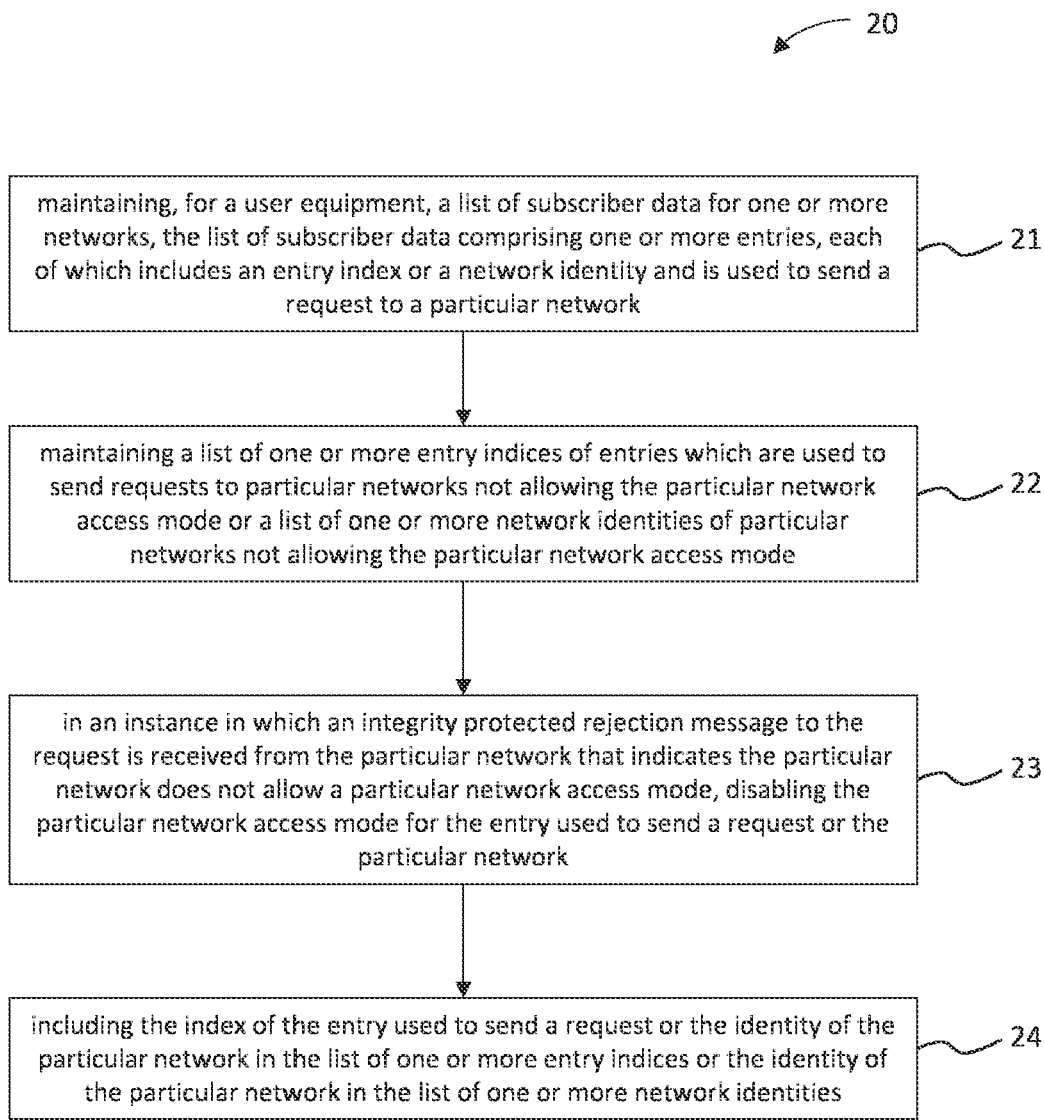
Figure 10:
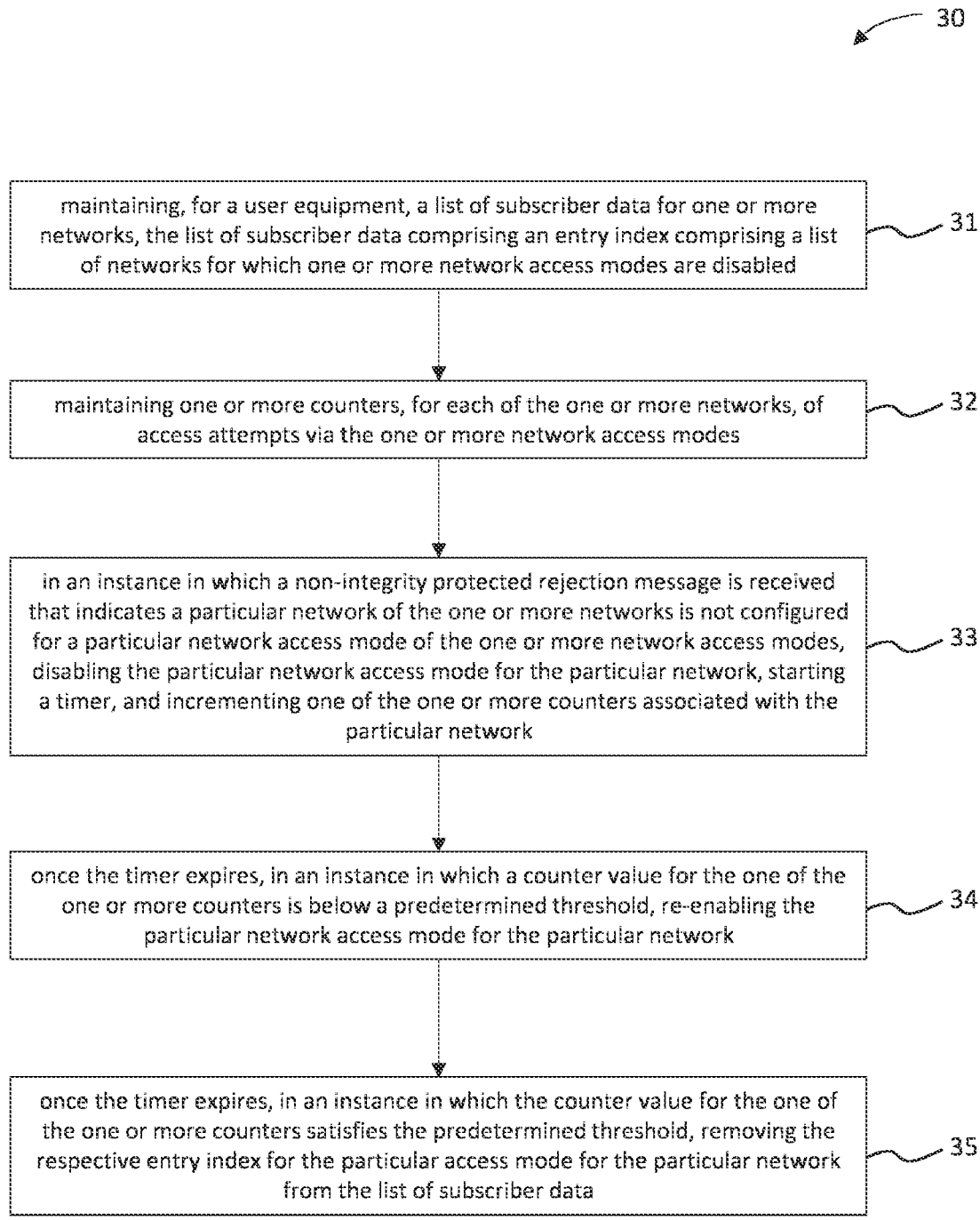
Figure 11:
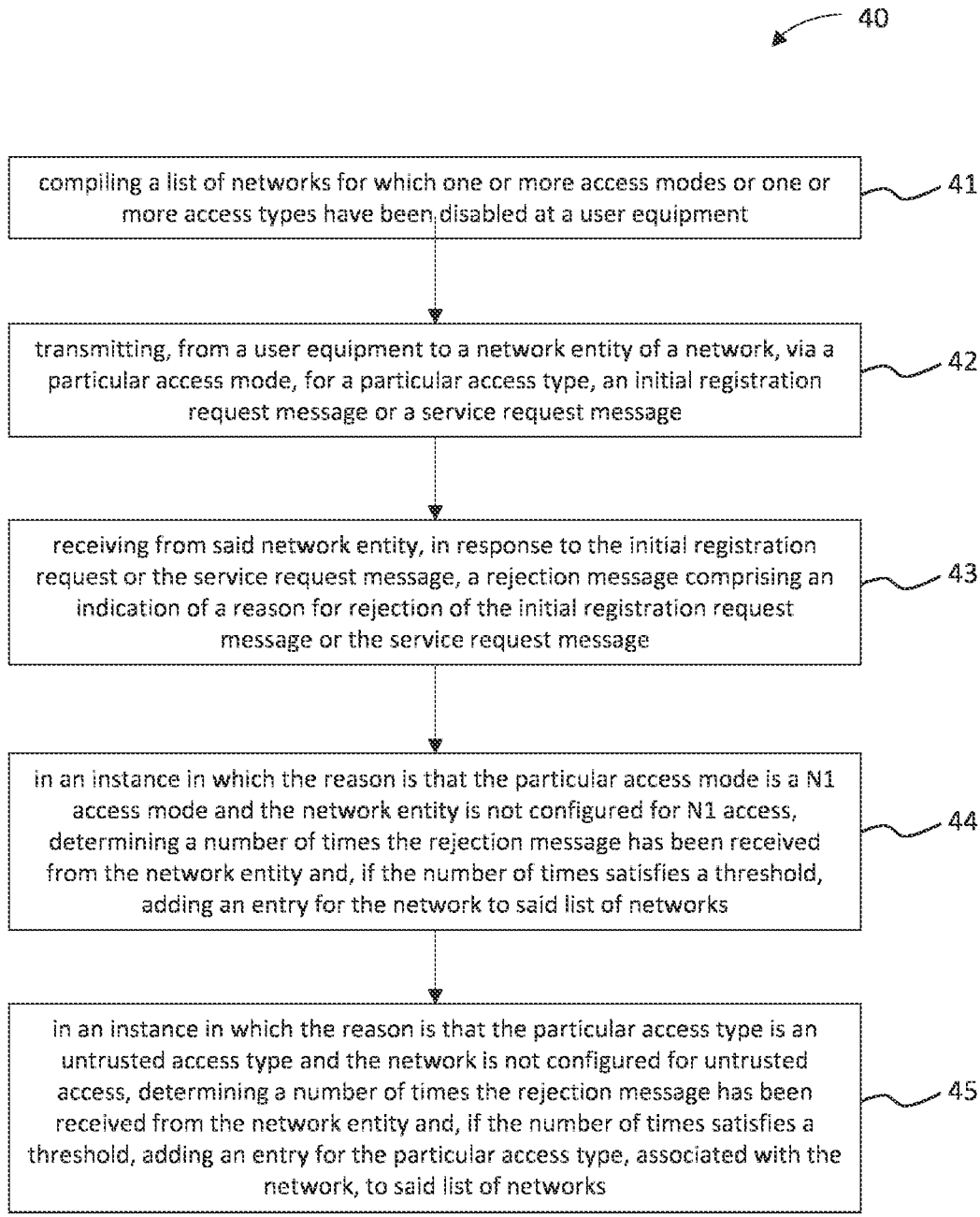
Figure 12:
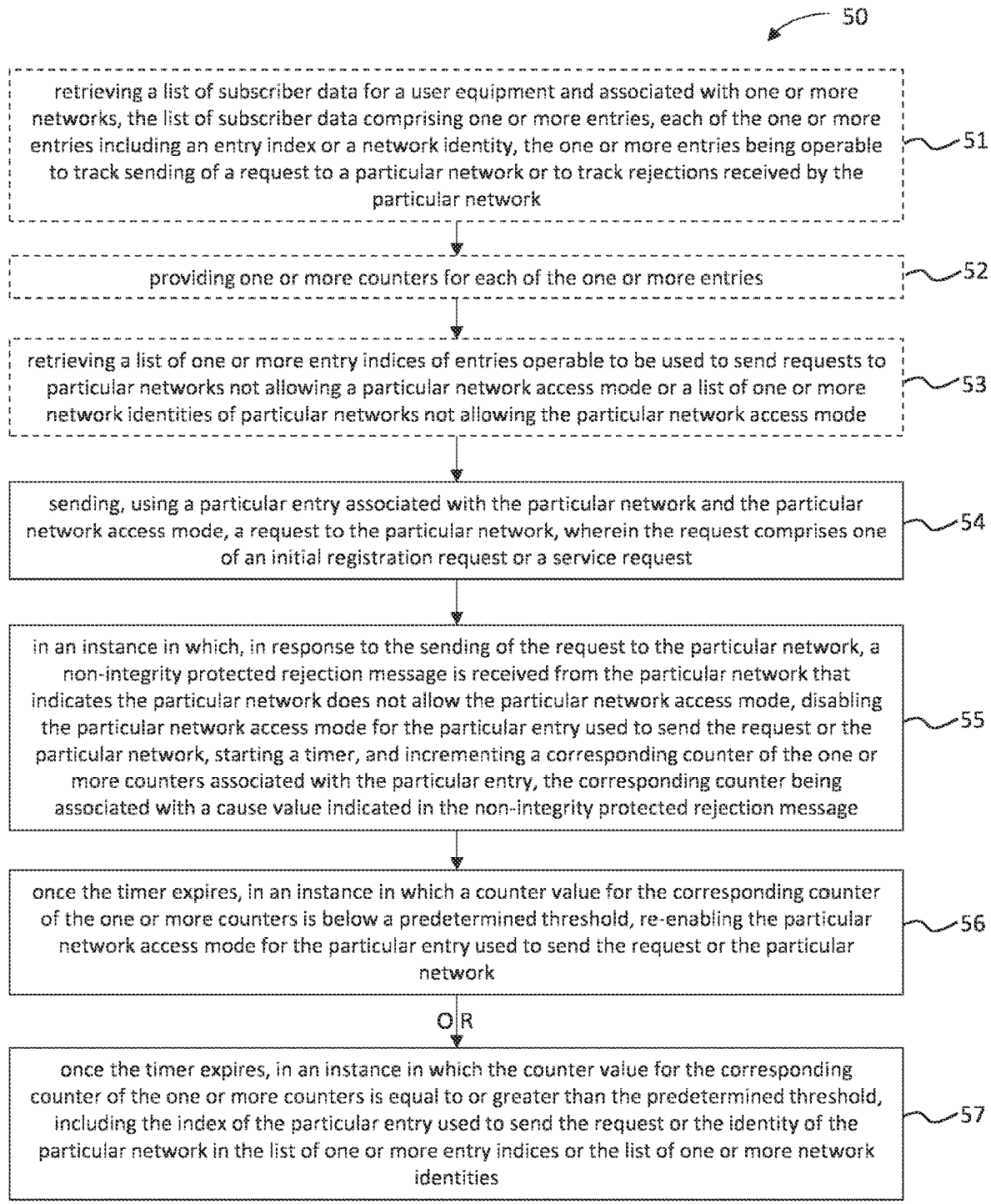

Having thus described embodiments of the disclosure in general terms, reference will now be made to the accompanying drawings, which are not necessarily drawn to scale, and wherein:

FIG. 1 illustrates an exemplary architecture for a communications network, according to some embodiments;

FIG. 2 illustrates an exemplary architecture for a communications network, according to some embodiments;

FIG. 3 illustrates an exemplary architecture for a communications network, according to some embodiments;

FIG. 4 illustrates an exemplary computing device for managing a device's capabilities in a private networks, according to some embodiments;

FIG. 5 illustrates an exemplary computing device for managing user equipment capabilities for private networks, according to some embodiments;

FIG. 6 illustrates an exemplary approach for a user equipment requesting initial registration with a network, according to some embodiments;

FIG. 7 illustrates an exemplary approach for a user equipment requesting provisioning of a service from a network, according to some embodiments;

FIG. 8 is a flow chart illustrating operations performed for for managing user equipment capabilities for private networks, such as by the apparatus of FIG. 4 or FIG. 5, according to an embodiment;

FIG. 9 is a flow chart illustrating operations performed for for managing user equipment capabilities for private networks, such as by the apparatus of FIG. 4 or FIG. 5, according to another embodiment;

FIG. 10 is a flow chart illustrating operations performed for for managing user equipment capabilities for private networks, such as by the apparatus of FIG. 4 or FIG. 5, according to still another embodiment;

FIG. 11 is a flow chart illustrating operations performed for for managing user equipment capabilities for private networks, such as by the apparatus of FIG. 4 or FIG. 5, according to yet another embodiment; and FIG. 12 is a flow chart illustrating operations performed for for managing user equipment capabilities for private networks, such as by the apparatus of FIG. 4 or FIG. 5, according to a further embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal. Such a medium may take many forms, including, but not limited to a non-transitory computer-readable storage medium (e.g., non-volatile media, volatile media), and transmission media.

Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be examples and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

In the following, certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIG. 1-3 to assist in understanding the technology underlying the described examples.

According to some embodiments, a communication device or terminal can be provided for wireless access via cells, base stations or similar wireless transmitter and/or receiver nodes, providing access points for a radio access system.

Access points and hence communications there through are typically controlled by at least one appropriate controller apparatus so as to enable operation thereof and management of mobile communication devices in communication therewith. In some embodiments, a control apparatus for a node may be integrated with, coupled to and/or otherwise provided for controlling the access points. In some embodiments, the control apparatus can be arranged to allow communications between a user equipment and a core network or a network entity of the core network. For this purpose, the control apparatus may comprises at least one memory, at least one data processing unit such as a processor or the like, and an input/output interface. Via the interface, the control apparatus can be coupled to relevant other components of the access point. The control apparatus can be configured to execute an appropriate software code to provide the control functions. It shall be appreciated that similar components can be provided in a control apparatus provided elsewhere in the network system, for example in a core network entity. The control apparatus can be interconnected with other control entities. The control apparatus and functions may be distributed between several control units. In some embodiments, each base station can comprise a control apparatus. In alternative embodiments, two or more base stations may share a control apparatus.

Access points and associated controllers may communicate with each other via a fixed line connection and/or via a radio interface. The logical connection between the base station nodes can be provided for example by an X2 or the like interface. This interface can be used for example for coordination of operation of the stations and performing reselection or handover operations.

The communication device or user equipment may comprise any suitable device capable of at least receiving wireless communication of data. For example, the device can be handheld data processing device equipped with radio receiver, data processing and user interface apparatus. Non-limiting examples include a mobile station (MS) such as a mobile phone or what is known as a 'smart phone', a portable computer such as a laptop or a tablet computer provided with a wireless interface card or other wireless interface facility, personal data assistant (PDA) provided with wireless communication capabilities, or any combinations of these or the like. Further examples include wearable wireless devices such as those integrated with watches or smart watches, eyewear, helmets, hats, clothing, ear pieces with wireless connectivity, jewelry and so on, universal serial bus (USB) sticks with wireless capabilities, modem data cards, machine type devices or any combinations of these or the like.

In some embodiments, a communication device, e.g., configured for communication with the wireless network or a core network entity, may be exemplified by a handheld or otherwise mobile communication device (or user equipment UE). A mobile communication device may be provided with wireless communication capabilities and appropriate electronic control apparatus for enabling operation thereof. Thus, the communication device may be provided with at least one data processing entity, for example a central processing unit and/or a core processor, at least one memory and other possible components such as additional processors and memories for use in software and hardware aided execution of tasks it is designed to perform. The data processing, storage and other relevant control apparatus can be provided on an appropriate circuit board and/or in chipsets. Data processing and memory functions provided by the control apparatus of the communication device are configured to cause control and signalling operations in accordance with certain embodiments as described later in this description. A user may control the operation of the communication device by means of a suitable user interface such as touch sensitive display screen or pad and/or a key pad, one of more actuator buttons, voice commands, combinations of these, or the like. A speaker and a microphone are also typically provided. Furthermore, a mobile communication device may comprise appropriate connectors (either wired or wireless) to other devices and/or for connecting external accessories, for example hands-free equipment, thereto.

In some embodiments, a communication device may communicate wirelessly via appropriate apparatus for receiving and transmitting signals. In some embodiments, a radio unit may be connected to the control apparatus of the device. The radio unit can comprise a radio part and associated antenna arrangement. The antenna arrangement may be arranged internally or externally to the communication device.

FIGS. 1-3 illustrate various exemplary architectures for a communications network 100 in which the various methods, apparatuses, and computer program products can be carried out and/or used. In some embodiments, the communications network 100 can comprise any suitable configuration, number, orientation, positioning, and/or dimensions of components and specialized equipment configured to provide air interface (e.g., New Radio (NR)) communication or connection between a user equipment 102 (UE 102) and a data network 116 (DN 116) via a core network 101 (CN 101) of the communications network 100. As illustrated in FIG. 1, a communications network 100 may be provided in which the UE 102 is in operable communication with the AN 104, such as by way of a transmission tower, a base station, a network node, or the like. In some embodiments, the AN 104 can communicate with the CN 101 or a component or entity thereof. In some embodiments, the CN 101 can facilitate communication between the UE 102 and the DN 116, such as for sending data, messages, requests, or the like. In some embodiments, the DN 116 or the CN 101 can be in communication with an application server or application function 112 (AS/AF 112).

In the context of a fifth-generation (5G) network, such as illustrated in FIGS. 2 and 3, the communications network 100 may comprise a series of connected network devices and specialized hardware that is distributed throughout a service region or country, and one or more network entities, which may be stored at and/or hosted by one or more of the connected network devices or specialized hardware. In some embodiments, the UE 102 may connect to the AN 104, which can then relay the communications between the UE 102 and the CN 101, the CN 101 being connected to the DN 116, which may be in communication with one or more AS/AF 112. In some embodiments, the UE 102 may be in communication with a radio access network 104 (RAN 104 or (R)AN 104), which may act as a relay between the UE 102 and other components or services of the CN 101. For instance, in some embodiments, the UE 102 may communicate with the RAN 104, which may in turn communicate with an Access and Mobility Management Function 108 (AMF 108). In other instance or embodiments, the UE 102 may communicate directly with the AMF 108. In some embodiments, the AMF 108 may be in communication with one or more network functions (NFs), such as an Authentication Server Function 120 (AUSF 120), a Network Slice Selection Function 122 (NSSF 122), a Network Repository Function 124 (NRF 124), a Policy Charging Function 114 (PCF 114), a Network Data Analytics Function 126 (NWDAF 126), a Unified Data Management function 118 (UDM 118), the AS/AF 112, a Session Management Function 110 (SMF 110), and/or the like.

In some embodiments, the SMF 110 may be in communication with one or more User Plane Functions 106 (UPF 106, UPF 106a, UPF 106b, collectively "UPF 106"). By way of example only, in some embodiments, the UPF 106 may be in communication with the RAN 104 and the DN 116. In other embodiments, the DN 116 may be in communication with a first UPF 106a and the RAN 104 may be in communication with a second UPF 106b, while the SMF 110 is in communication with both the first and second UPFs 106a, b and the first and second UPFs 106a, b are in communication each with the other.

In some embodiments, the UE 102 can comprise a single-mode or a dual-mode device such that the UE 102 can be connected to one or more RANs 104. In some embodiments, the RAN 104 may be configured to implement one or more radio access technologies (RATs), such as Bluetooth, Wi-Fi, and GSM, UMTS, LTE or 5G NR, among others, that can be used to connect the UE 102 to the CN 101. In some embodiments, the RAN 104 can comprise or be implemented using a chip, such as a silicon chip, in the UE 102 that can be paired with or otherwise recognized by a similar chip in the CN 101, such that the RAN 104 can establish a connection or line of communication between the UE 102 and the CN 101 by identifying and pairing the chip within the UE 102 with the chip within the CN 101. In some embodiments, the RAN 104 can implement one or more base stations, towers or the like to communicate between the UE 102 and the AMF 108 of the CN 101.

In some embodiments, the communications network 100 or components thereof (e.g., base stations, towers, etc.) can be configured to communicate with a communication device (e.g., the UE 102) such as a cell phone or the like over multiple different frequency bands, e.g., FR1 (below 6 GHz), FR2 (mmWave), other suitable frequency bands, sub-bands thereof, and/or the like. In some embodiments, the communications network 100 can comprise or employ massive multiple input and multiple output (massive MIMO) antennas. In some embodiments, the communications network 100 can comprise multi-user MIMO (MU-MIMO) antennas. In some embodiments, the communications network 100 can employ edge computing whereby the computing servers are communicatively, physically, computationally, and/or temporally closer to the communications device (e.g., UE 102) in order to reduce latency and data traffic congestion. In some embodiments, the communications network 100 can employ other technologies, device, or techniques, such as small cell, low-powered RAN, beam-forming of radio waves, WiFi-cellular convergence, non-orthogonal multiple access (NOMA), channel coding, and the like.

As illustrated in FIG. 3, the UE 102 may be configured to communicate with the RAN 104 in a N1 interface, e.g., according to a non-access stratum (NAS) protocol. In some embodiments, RAN 104 can be configured to communicate with the CN 101 or a component thereof (e.g., the AMF 108) in a N2 interface, e.g., in a control plane between a base station of the RAN 104 and the AMF 108. In some embodiments, the RAN 104 can be configured to communicate with the UPF 106 in a N3 interface, e.g., in a user plane. In some embodiments, the AMF 108 and/or the SMF 110 can be configured to communicate with other services or network entities within the CN 101 in various different interfaces and/or according to various different protocols. For instance, in some embodiments, the AMF 108 and/or the SMF 110 can be configured to communicate with the AUSF 120 in a Nausf interface or an N12 interface. In some embodiments, the AMF 108 and/or the SMF 110 can be configured to communicate with the NSSF 122 in a Nnssf interface. In some embodiments, the AMF 108 and/or the SMF 110 can be configured to communicate with the NRF 124 in a Nnrf interface. In some embodiments, the AMF 108 and/or the SMF 110 can be configured to communicate with the PCF 114 in a Npcf interface or an N7 interface. In some embodiments, the AMF 108 and/or the SMF 110 can be configured to communicate with the NWDAF 126 in a Nnwdaf interface. In some embodiments, the AMF 108 and/or the SMF 110 can be configured to communicate with the UDM 118 in a Nudm interface, an N8 interface, or an N10 interface. In some embodiments, the AMF 108 and/or the SMF 110 can be configured to communicate with the AS/AF 112 in a Naf interface. In some embodiments, the SMF 110 can be configured to communicate with the UPF 106 in a N4 interface, which may act as a bridge between the control plane and the user plane, such as acting as a conduit for a Protocol Data Unit (PDU) session during which information is transitted between, e.g., the UE 102 and the CN 101 or components/services thereof.

It will be appreciated that example embodiments of the invention disclosed and/or otherwise described herein arise in the context of a telecommunications network, including but not limited to a telecommunications network that conforms to and/or otherwise incorporates aspects of a fifth-generation (5G) architecture. While FIGS. 1-3 illustrate various configurations and/or components of an exemplary architecture of the communications network 100, many other systems, system configurations, networks, network entities, and pathways/protocols for communication therein are contemplated and considered within the scope of this present disclosure.

While the methods, devices, and computer program products described herein are described within the context of a fifth-generation (5G) core network and system, such as illustrated in FIGS. 1-3 and described hereinabove, the described methods, devices, and computer program products can nevertheless be applied in a broader context within any suitable telecommunications system, network, standard, or protocol.

In the context of communications systems, e.g., fifth-generation (5G) networks, a user equipment (UE) may request access to the network or request services from the network. Non-standalone Non-Public Networks are Non-Public Networks (NPNs) which are deployed with the support of public PLMNs using a CAG and/or network slicing. When an NPN is made available via a PLMN, then the UE 102 has a subscription for the PLMN to access the network and obtain the services provided by the network. A CAG identifies a group of subscribers who are permitted to access one or more CAG cells. When a UE 102 requests access to a network or requests provisioning of services from a network, the network needs to verify whether the UE 102 is allowed to access the network, whether the network is configured for communication via the requested access mode, and whether the requested access is via a trusted or non-trusted connection, among other considerations.

In some embodiments, for the network to verify a UE's 102 access, the network may need to know the UE's 102 Subscription Permanent Identifier (SUPI). As per TS 33.501, during initial Non-Access Stratum (NAS) procedure (Registration Procedure), the UE 102 can send the Subscription Concealed Identifier (SUCI) to the network. The serving network receives the UE's 102 SUPI from the Authentication Server Function (AUSF), only after successful primary authentication. Therefore, if the serving network needs to perform an access control procedure, such as described herein, on the UE during an initial registration procedure, then the AMF 108 may or will have to wait until successful completion of the primary authentication procedure.

In some embodiments, when the UE 102 wants to access the system or network (e.g., 5GS), the UE 102 may first perform an access control check to determine if access to the network is allowed. In some embodiments, an access control check can be performed for access attempts defined by the following list of events:

a) the UE 102 is in an idle mode (e.g., 5G mobility management [5GMM]-IDLE mode) over 3GPP access and an event that requires a transition to a connected mode (e.g., 5GMM-CONNECTED mode) occurs; and b) the UE 102 is in a connected mode (e.g., 5GMM-CONNECTED mode) over 3GPP access or a connected mode (e.g., 5GMM-CONNECTED mode) with Radio Resource Control (RRC) inactive indication and one of the following events occurs:

1) 5GMM receives a Management Object-Multi Media Telephone (MO-MMTEL)-voice-call-started indication, an MO-MMTEL-video-call-started indication, or an MO-SMS-over-IP (SMSoIP)-attempt-started indication from upper layers;

2) 5GMM receives a request from upper layers to send a mobile originated SMS over NAS unless the request triggered a service request procedure to transition the UE 102 from 5GMM-IDLE mode to 5GMMCONNECTED mode;

3) 5GMM receives a request from upper layers to send an UL NAS TRANSPORT message for the purpose of PDU session establishment unless the request triggered a service request procedure to transition the UE 102 from 5GMM-IDLE mode to 5GMM-CONNECTED mode;

4) 5GMM receives a request from upper layers to send an UL NAS TRANSPORT message for the purpose of PDU session modification unless the request triggered a service request procedure to transition the UE 102 from 5GMM-IDLE mode to 5GMM-CONNECTED mode; and 5) 5GMM receives a request to re-establish the user-plane resources for an existing PDU session.

In some embodiments, 5GMM specific procedures initiated by NAS in 5GMM-CONNECTED mode may not be subject to access control, e.g., a registration procedure after PS handover will not be prevented by access control. In some embodiments, when the NAS detects one of the above events, the NAS needs to perform the mapping of the kind of request to one or more access identities and one access category and lower layers will perform access barring checks for that request based on the determined access identities and access category. In some embodiments, the NAS may be aware of the above events through indications provided by upper layers or when determining the need to start 5GMM procedures through normal NAS behavior, or both.

In some embodiments, to determine the access identities and the access category for a request, the NAS checks the reason for access, types of service requested and profile of the UE 102 including UE configurations, against a set of access identities and access categories defined in 3GPP TS 22.261, namely: a) a set of standardized access identities; b) a set of standardized access categories; and c) a set of operator-defined access categories, if available. For the purpose of determining the applicable access identities from the set of standardized access identities defined in 3GPP TS 22.261, the NAS can or shall follow the requirements, rules, actions or otherwise described herein and/or in 3GPP TS 22.261.

In some embodiments, for the purpose of determining the applicable access category from the set of standardized access categories and operator-defined access categories defined in 3GPP TS 22.261.

Turning now to FIG. 4, examples of a core network apparatus (CNA) (including the core network services: UPF 106, AMF 108, SMF 110, PCF 114, and/or another NF and/or NRF) may be embodied as a core network apparatus 200 as configured in accordance with an example embodiment of the present disclosure. As described below in conjunction with the flowcharts of FIGS. 8-12, the CNA 200 of an example embodiment may be configured to perform the functions described herein. In any instance, the CNA 200 may more generally be embodied by a computing device, such as a server, a personal computer, a computer workstation or other type of computing device including those functioning as a user equipment and/or a wireless local area network. Regardless of the manner in which the CNA 200 is embodied, the apparatus of an example embodiment may be configured as shown in FIG. 4 so as to include, be associated with or otherwise be in communication with processing circuitry 208 including, for example, a processor 202 and a memory device 204 and, in some embodiments, and/or a communication interface 206. In some embodiments, the UE 102 or other elements of the system 100 can be embodied by an apparatus such as the CNA 200 of FIG. 4.

In the processing circuitry 208, the processor 202 (and/or co-processors or any other circuitry assisting or otherwise associated with the processor) may be in communication with the memory device 204 via a bus for passing information among components of the CNA 200. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The CNA 200 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an encoder and/or a decoder) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In embodiments that include a communication interface 206, the communication interface may be any means such as a device or circuitry embodied in either hardware or a combination of hardware and software that is configured to receive and/or transmit data from/to a network and/or any other device or module in communication with the CNA 200, such as NF, NRF, UE 102, radio access network, core network services, an application server/function, a database or other storage device, etc. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms. In some embodiments, a session management function can comprise a 5GC session management function for any suitable CUPS architecture, such as for the gateway GPRS support node (GGSN-C), TWAG-C, BNG-CUPS, N4, Sxa, Sxb, Sxc, evolved packet core (EPC) SWG-C, EPC PGW-C, EPC TDF-C, and/or the like.

In some embodiments, the CNA 200 may represent a user equipment that is configured to be connected to other core network entities or network equipment. In some embodiments, user equipment can comprise a mobile telephone (cell phone) or the like.

As illustrated, the CNA 200 can include a processor 202 in communication with a memory 204 and configured to provide signals to and receive signals from a communication interface 206. In some embodiments, the communication interface 206 can include a transmitter and a receiver. In some embodiments, the processor 202 can be configured to control the functioning of the CNA 200, at least in part. In some embodiments, the processor 202 may be configured to control the functioning of the transmitter and receiver by effecting control signalling via electrical leads to the transmitter and receiver. Likewise, the processor 202 may be configured to control other elements of CNA 200 by effecting control signalling via electrical leads connecting the processor 202 to the other elements, such as a display or the memory 204. The processor 202 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 4 as a single processor, in some example embodiments the processor 202 may comprise a plurality of processors or processing cores.

The CNA 200 may be capable of operating with one or more air interface standards, communication protocols, modulation types, access types, and/or the like. Signals sent and received by the processor 202 may include signalling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the CNA 200 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the CNA 200 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The CNA 200 may be additionally capable of operating in accordance with 3.9G wireless communication protocols, such as Long Term Evolution (LTE), Evolved Universal Terrestrial Radio Access Network (E-UTRAN), and/or the like. Additionally, for example, the CNA 200 may be capable of operating in accordance with 4G wireless communication protocols, such as LTE Advanced, 5G, and/or the like as well as similar wireless communication protocols that may be subsequently developed. In some embodiments, the CNA 200 may be capable of operating according to or within the framework of any suitable control and user plane separation (CUPS) architecture, such as for the gateway GPRS support node (GGSN-C), trusted wireless access gateway (TWAG-C), broadband network gateways (BNGs), N4, Sxa, Sxb, Sxc, evolved packet core (EPC) SWG-C, EPC PGW-C, EPC TDF-C, and/or the like.

It is understood that the processor 202 may include circuitry for implementing audio/video and logic functions of the CNA 200. For example, the processor 202 may comprise a digital signal processor device, a microprocessor device, an analog-to-digital converter, a digital-to-analog converter, and/or the like. Control and signal processing functions of the CNA 200 may be allocated between these devices according to their respective capabilities. The processor 202 may additionally comprise an internal voice coder (VC), an internal data modem (DM), and/or the like. Further, the processor 202 may include functionality to operate one or more software programs, which may be stored in memory 204. In general, the processor 202 and software instructions stored in memory 206 may be configured to cause the CNA 200 to perform actions. For example, the processor 202 may be capable of operating a connectivity program, such as a web browser. The connectivity program may allow the CNA 200 to transmit and receive web content, such as location-based content, according to a protocol, such as wireless application protocol, WAP, hypertext transfer protocol, HTTP, and/or the like.

In some embodiments, the CNA 200 may also comprise a user interface including, for example, an earphone or speaker, a ringer, a microphone, a display, a user input interface, and/or the like, which may be operationally coupled to the processor 202. The display may, as noted above, include a touch sensitive display, where a user may touch and/or gesture to make selections, enter values, and/or the like. The processor 202 may also include user interface circuitry configured to control at least some functions of one or more elements of the user interface, such as the speaker, the ringer, the microphone, the display, and/or the like. The processor 202 and/or user interface circuitry comprising the processor 202 may be configured to control one or more functions of one or more elements of the user interface through computer program instructions, for example, software and/or firmware, stored on the memory 204 accessible to the processor 202, for example, a volatile memory, a non-volatile memory, devices comprising the same, and/or the like. The CNA 200 may include a battery for powering various circuits related to the mobile terminal, for example, a circuit to provide mechanical vibration as a detectable output. The user input interface may comprise devices allowing the CNA 200 to receive data, such as a keypad (e.g., a virtual keyboard presented on a display or an externally coupled keyboard) and/or the like.

As shown in FIG. 4, CNA 200 may also include one or more mechanisms for sharing and/or obtaining data, illustrated as the communication interface 206. For example, the communication interface 206 of the CNA 200 may include a short-range radio frequency (RF) transceiver and/or interrogator, so data may be shared with and/or obtained from electronic devices in accordance with RF techniques. The CNA 200 may include other short-range transceivers, such as an infrared (IR) transceiver, a Bluetooth™ (BT) transceiver operating using Bluetooth™ wireless technology, a wireless universal serial bus (USB) transceiver, a Bluetooth™ Low Energy transceiver, a ZigBee transceiver, an ANT transceiver, a cellular device-to-device transceiver, a wireless local area link transceiver, and/or any other short-range radio technology. In some embodiments, the CNA 200 and, in particular, the short-range transceiver may be capable of transmitting data to and/or receiving data from electronic devices within the proximity of the apparatus, such as within about 10 meters, for example. The CNA 200 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The CNA 200 may comprise other memory, such as a subscriber identity module (SIM), a removable user identity module (R-UIM), an eUICC, an UICC, and/or the like, which may store information elements related to a mobile subscriber. In addition to the SIM, the CNA 200 may include other removable and/or fixed memory. The CNA 200 may include volatile memory and/or non-volatile memory, which can comprise some or all of the memory 204 or can alternatively be a separate memory within or connected to the CNA 200. For example, volatile memory may include Random Access Memory (RAM) including dynamic and/or static RAM, on-chip or off-chip cache memory, and/or the like. Non-volatile memory, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory, non-volatile memory may include a cache area for temporary storage of data. At least part of the volatile and/or non-volatile memory may be embedded in processor 202. The memories may store one or more software programs, instructions, pieces of information, data, and/or the like which may be used by the apparatus for performing operations disclosed herein. Alternatively or additionally, the CNA 200 may be configured to cause operations disclosed herein with respect to base stations, WLAN access points, network nodes, one or more UEs 102, and/or the like.

The memories may comprise an identifier, such as an international mobile equipment identification (IMEI) code, capable of uniquely identifying CNA 200. The memories may comprise an identifier, such as an international mobile equipment identification (IMEI) code, capable of uniquely identifying CNA 200. In the example embodiment, the processor 202 may be configured using computer code stored at memory and/or to the provide operations disclosed herein with respect to the base stations, WLAN access points, network nodes, one or more UEs 102, and/or the like. Likewise, the CNA 200 can be configured to be any other component or network equipment from the core network.

Some of the embodiments disclosed herein may be implemented in software, hardware, application logic, or a combination of software, hardware, and application logic. The software, application logic, and/or hardware may reside on memory 204, the control apparatus 202, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 4, computer-readable medium may comprise a non-transitory computer-readable storage medium that may be any media that can contain or store the instructions for use by or in connection with an instruction execution system, apparatus, or device, such as a computer.

FIG. 5 illustrates another example of an apparatus 300 (e.g., comprising or embodying a core network entity, such as the CAN 200, the UE 102, and/or participating in or communicating with the core network services: UPF 106, AMF 108, SMF 110, PCF 114, and/or another network function (NF) and/or network resource function (NRF)), which may be configured in accordance with an example embodiment of the present disclosure. As described below in conjunction with the flowcharts of FIGS. 8-12, the apparatus 300 of an example embodiment may be configured to perform the functions, processes, and methods described herein, combinations thereof, variations thereof, or parts thereof.

In some embodiments, the apparatus 300 is or comprises exemplary specialized hardware particularly dimensioned and configured to carry out any of the methods, processes, and approaches described herein. In some embodiments, the apparatus 300 can be a part of the system 100 or in communication with a component thereof. It will be appreciated that the apparatus 300 is provided as an example of one embodiment and should not be construed to narrow the scope or spirit of the invention in any way. In this regard, the scope of the disclosure encompasses many potential embodiments in addition to those illustrated and described herein. As such, while FIG. 5 illustrates one example of a configuration of an apparatus for handling emergency services in a private network or other wireless communication system, such as a 5G system, other configurations may also be used to implement certain embodiments of the present disclosure.

The apparatus 300 may be embodied as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In some example embodiments, the apparatus 300 is embodied as a mobile computing device, such as mobile telephones, mobile computers, personal digital assistants (PDAs), pagers, laptop computers, desktop computers, gaming devices, televisions, e-papers, and other types of electronic systems, which may employ various embodiments of the invention.

The apparatus 300 can include a computing device 302 including a processor 304, and storage, such as a non-volatile memory 306 and/or volatile memory 308. In some embodiments, the processor 304 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 5 as a single processor, in some embodiments the processor 304 comprises a plurality of processors. These signals sent and received by the processor 304 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, fifth-generation (5G), any band, frequency or protocol thereof, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

In addition to broad-band systems, some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the apparatus 300 or a component thereof may be capable of operating according to Wi-Fi or Worldwide Interoperability for Microwave Access (WiMAX) protocols.

It is understood that the processor 304 may comprise circuitry for implementing audio/video and logic functions of the apparatus 300. For example, the processor 304 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC), an internal data modem (DM), and/or the like. Further, the processor may comprise functionality to operate one or more software programs, which may be stored in memory. For example, the processor 304 may be capable of operating a connectivity program, such as a web browser. The connectivity program may allow the apparatus 300 to transmit and receive web content, such as location-based content, according to a protocol, such as Wireless Application Protocol (WAP), hypertext transfer protocol (HTTP), and/or the like. The apparatus 300 may be capable of using a Transmission Control Protocol/Internet Protocol (TCP/IP) to transmit and receive web content across the internet or other networks.

The apparatus 300 may also comprise a user interface 312 including, for example, an earphone or speaker, a ringer, a microphone, a user display, a user input interface, and/or the like, which may be operationally coupled to the processor 304. In this regard, the processor 304 may comprise user interface circuitry configured to control at least some functions of one or more elements of the user interface, such as, for example, the speaker, the ringer, the microphone, the display, and/or the like. The processor 304 and/or user interface circuitry comprising the processor 304 may be configured to control one or more functions of one or more elements of the user interface through computer program instructions (e.g., software and/or firmware) stored on a memory accessible to the processor 304 (e.g., non-volatile memory 306, volatile memory 308, and/or the like). Although not shown, the apparatus 300 may comprise a battery for powering various circuits related to the apparatus 300, for example, a circuit to provide mechanical vibration as a detectable output. The apparatus 300 can further comprise a display 314. In some embodiments, the display 314 may be of any type appropriate for the electronic device in question with some examples including a plasma display panel (PDP), a liquid crystal display (LCD), a light-emitting diode (LED), an organic light-emitting diode display (OLED), a projector, a holographic display, or the like. The user interface 312 may comprise devices allowing the apparatus 300 to receive data, such as a keypad, a touch display (e.g., some example embodiments wherein the display 314 is configured as a touch display), a joystick (not shown), and/or other input device. In embodiments including a keypad, the keypad may comprise numeric (0-9) and related keys (#, *), and/or other keys for operating the apparatus 300.

The apparatus 300 may comprise memory, such as the non-volatile memory 306 and/or the volatile memory 308, such as RAM, read only memory (ROM), non-volatile RAM (NVRAM), a subscriber identity module (SIM), a removable user identity module (R-UIM), and/or the like. In addition to the memory, the apparatus 300 may comprise other removable and/or fixed memory. In some embodiments, the volatile memory 308 may include Random Access Memory (RAM) including dynamic and/or static RAM, on-chip or off-chip cache memory, and/or the like. In some embodiments, the non-volatile memory 306, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like the volatile memory 308, the non-volatile memory 306 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the apparatus 300.

In some example embodiments, the apparatus 300 includes various means for performing the various functions herein described. These means may comprise one or more of the processor 304, the non-volatile memory 306, the volatile memory 308, the user interface 312, or the display 314. The means of the apparatus 300 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g., storage 306 or 308) that is executable by a suitably configured processing device (e.g., the processor 304), or some combination thereof.

In some example embodiments, one or more of the means illustrated in FIG. 5 may be embodied as a chip or chip set. In other words, the apparatus 300 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 304, the memory 306 and/or 308, the user interface 312, and/or the display 314 may be embodied as a chip or chip set. The apparatus 300 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein.

The processor 304 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other types of hardware processors, or some combination thereof. Accordingly, although illustrated in FIG. 5 as a single processor, in some embodiments the processor 304 comprises a plurality of processors. The plurality of processors may be in operative communication with each other and may be collectively configured to perform one or more functionalities of the apparatus 100 as described herein. The plurality of processors may be embodied on a single computing device or distributed across a plurality of computing devices collectively configured to function as the apparatus 300. In some embodiments, e.g., wherein the apparatus is embodied as an apparatus 300, the processor 304 may be embodied as or comprise the processor 304 (shown in FIG. 5). In some example embodiments, the processor 304 is configured to execute instructions stored in the memory 306 and/or 308 or otherwise accessible to the processor 304. These instructions, when executed by the processor 304, may cause the apparatus 300 to perform one or more of the functionalities of the apparatus 300 as described herein. As such, whether configured by hardware or software methods, or by a combination thereof, the processor 304 may comprise an entity capable of performing operations according to embodiments of the present invention while configured accordingly. Thus, for example, when the processor 304 is embodied as an ASIC, FPGA or the like, the processor 304 may comprise specifically configured hardware for conducting one or more operations described herein. Alternatively, as another example, when the processor 304 is embodied as an executor of instructions, such as may be stored in the memory 306 and/or 308, the instructions may specifically configure the processor 304 to perform one or more algorithms and operations described herein.

The memory 306 and/or 308 may comprise, for example, volatile memory, non-volatile memory, or some combination thereof. In this regard, the memory 306 and/or 308 may comprise a non-transitory computer-readable storage medium. Although illustrated in FIG. 5 as a single memory, the memory 306 and/or 308 may comprise a plurality of memories. The plurality of memories may be embodied on a single computing device or may be distributed across a plurality of computing devices collectively configured to function as the apparatus 300. In various example embodiments, the memory 306 and/or 308 may comprise a hard disk, random access memory, cache memory, flash memory, a compact disc read only memory (CD-ROM), digital versatile disc read only memory (DVD-ROM), an optical disc, circuitry configured to store information, or some combination thereof. In some embodiments, the memory 306 and/or 308 may comprise the volatile memory 308 and/or the non-volatile memory 306 (shown in FIG. 5). The memory 306 and/or 308 may be configured to store information, data, applications, instructions, or the like for enabling the apparatus 300 to carry out various functions in accordance with various example embodiments. For example, in some example embodiments, the memory 306 and/or 308 is configured to buffer input data for processing by the processor 304. Additionally or alternatively, the memory 306 and/or 308 may be configured to store program instructions for execution by the processor 304. The memory 306 and/or 308 may store information in the form of static and/or dynamic information. The stored information may include, for example, images, content, media content, user data, application data, and/or the like. This stored information may be stored and/or used by the processor 304 during the course of performing its functionalities.

In some embodiments, the apparatus 300 can further comprise a communication interface (not shown) that may be embodied as any device or means embodied in circuitry, hardware, a computer program product comprising computer readable program instructions stored on a computer readable medium (e.g., the memory 306 and/or 308) and executed by a processing device (e.g., the processor 304), or a combination thereof that is configured to receive and/or transmit data from/to another computing device. In some example embodiments, the communication interface is at least partially embodied as or otherwise controlled by the processor 304. In this regard, the communication interface may be in communication with the processor 304, such as via a bus. The communication interface may include, for example, an antenna, a transmitter, a receiver, a transceiver and/or supporting hardware or software for enabling communications with one or more remote computing devices. In some embodiments, e.g., wherein the apparatus is embodied as an apparatus 300, the communication interface may be embodied as or comprise the transmitter and the receiver. The communication interface may be configured to receive and/or transmit data using any protocol that may be used for communications between computing devices. In this regard, the communication interface may be configured to receive and/or transmit data using any protocol that may be used for transmission of data over a wireless network, wireline network, some combination thereof, or the like by which the apparatus 300 and one or more computing devices may be in communication. As an example, the communication interface may be configured to receive and/or otherwise access content (e.g., web page content, streaming media content, and/or the like) over a network from a server or other content source. The communication interface may additionally be in communication with the memory 306 and/or 308, user interface 312 and/or the processor 304, such as via a bus.

The user interface 312 may be in communication with the processor 304 and configured to receive an indication of a user input and/or to provide an audible, visual, mechanical, or other output to a user. As such, the user interface 312 may include, for example, a keyboard, a mouse, a joystick, a display, a touch screen display, a microphone, a speaker, and/or other input/output mechanisms. In embodiments in which the apparatus 300 is embodied as an apparatus 300, the user interface 312 may be embodied as or comprise the user input interface, such as the display 314 (shown in FIG. 5), and other components such as a keypad, mouse, etc. The user interface 312 may be in communication with the memory 306 and/or 308, communication interface, a sensor, a speaker, and/or the processor 304, such as via a bus. In some example embodiments, the user interface 312 may comprise a single input/output mechanism. In other embodiments, the user interface 312 may comprise a content display and touch display, such as the display 314. In some embodiments, the user interface 312 may comprise a touch display user interface with a content display portion and a dedicated user input portion, such as a virtual keyboard, virtual piano, or an application with a designated key for user input.

The processor 304 may be embodied as various means, such as circuitry, hardware, a computer program product comprising computer readable program instructions stored on a computer readable medium (e.g., the memory 306 and/or 308) and executed by a processing device (e.g., the processor 304), or some combination thereof and, in some embodiments, is embodied as or otherwise controlled by the processor 304. The processor 304 may further be in communication with one or more of the memory 306 and/or 308, or user interface 312, such as via a bus.

The processor 304 may be configured to receive a user input from a user interface 312, such as a touch display. The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the processor 304 may determine an element/instruction/command that corresponds with a key, or image, displayed on the touch display user interface at the determined position or within a predefined proximity (e.g., within a predefined tolerance range) of the determined position. The processor 304 may be further configured to perform a function or action related to the key corresponding to the element/instruction/command determined by the processor 304 based on the position of the touch or other user input.

Without in any way limiting the scope, interpretation, or application of the claims appearing below, a technical effect of one or more of the example embodiments disclosed herein may be improved user equipment or network equipment configuration. As such, any embodiment of a method, system, approach, device, apparatus, or computer program described or illustrated herein is understood to comprise any or all of the components, functionalities, elements, or steps of any other embodiment such that any method can be carried out by the CNA 200, the apparatus 300, or by any other suitable system or device, and likewise can be carried out according to a computer program code envisioned within the scope of this disclosure.

Referring now to FIGS. 6 and 7, in the context of a communications system, e.g., the system 100, network access or provisioning of services from the network can be requested, such as by the UE 102, by sending a registration request, an access request message, a service request, a session request message, or the like to the AMF 108.

Generally, the procedure for initial registration can be carried out by the UE 102 for initial registration with a particular network entity (e.g., AMF 108) for 5GS services. In some embodiments, when the UE 102 initiates the registration procedure for initial registration, the UE 102 can or shall indicate "initial registration" in the 5GS registration type IE. In some embodiments, when the UE 102 initiates the registration procedure for emergency services, the UE 102 can or shall indicate "emergency registration" in the 5GS registration type IE.

In some embodiments, a UE 102 in the state "5GMM-DEREGISTERED" can or shall initiate the registration procedure for initial registration by sending a REGISTRATION REQUEST message to the AMF 108,
  a) when the UE 102 performs initial registration for 5GS services;
  b) when the UE 102 performs initial registration for emergency services;
  c) when the UE 102 performs initial registration for SMS over NAS; and
  d) when the UE 102 moves from GERAN to NG-RAN coverage or the UE 102 moves from a UTRAN to NG-RAN coverage.

In some embodiments, the UE 102 can initiate the registration procedure for initial registration by sending a REGISTRATION REQUEST message to the AMF 108, and starting timer T3510. If timer T3502 is currently running, the UE 102 can or shall stop timer T3502. If timer T3511 is currently running, the UE 102 can or shall stop timer T3511.

In some embodiments, if the UE 102 holds a valid 5G-GUTI, the UE 102 can or shall indicate the 5G-GUTI in the 5GS mobile identity IE. Otherwise, if a SUCI is available, the UE 102 can or shall include the SUCI in the 5GS mobile identity IE. If the UE 102 is initiating the registration procedure for emergency services and does not hold a valid 5G-GUTI or SUCI, the PEI can or shall be included in the 5GS mobile identity IE.

In some embodiments, if the UE 102 is operating in the dual-registration mode and it is in EMM state EMM-REGISTERED, the UE 102 can or shall include the UE 102 status IE with the EMM registration status set to "UE is in EMM-REGISTERED state".

In some embodiments, inclusion of the UE status IE with this setting corresponds to the indication that the UE 102 is "moving from EPC" as specified in 3GPP TS 23.502.

In some embodiments, if the last visited registered TAI is available, the UE 102 can or shall include the last visited registered TAI in the REGISTRATION REQUEST message.

In some embodiments, if the UE 102 requests the use of SMS over NAS, the UE 102 can or shall include the SMS requested IE in the REGISTRATION REQUEST message and set the SMS requested bit of the SMS requested IE to "SMS over NAS supported".

In some embodiments, if the UE 102 supports MICO mode and requests the use of MICO mode, then the UE 102 can or shall include the MICO indication IE in the REGISTRATION REQUEST message.

In some embodiments, if the UE 102 wants to use the UE specific DRX parameters, the UE 102 can or shall include the Requested DRX parameters IE in the REGISTRATION REQUEST message.

In some embodiments, the UE 102 can or shall include the requested NSSAI containing the S-NSSAI(s) corresponding to the slice(s) to which the UE 102 wants to register and may include the mapping of the requested NSSAI which is the mapping of each S-NSSAI of the requested NSSAI to the S-NSSAI(s) of the configured NSSAI for the HPLMN, if available, in the REGISTRATION REQUEST message. If the UE 102 has allowed NSSAI or configured NSSAI for the current PLMN, the requested NSSAI can or shall be either:

a) the configured NSSAI for the current PLMN, or a subset thereof as described below, if the UE 102 has no allowed NSSAI for the current PLMN;

b) the allowed NSSAI for the current PLMN, or a subset thereof as described below, if the UE 102 has an allowed NSSAI for the current PLMN; or c) the allowed NSSAI for the current PLMN, or a subset thereof as described below, plus one or more S-NSSAIs from the configured NSSAI for which no corresponding S-NSSAI is present in the allowed NSSAI and those are neither in the rejected NSSAI for the current PLMN nor in the rejected NSSAI for the current PLMN and registration area combination.

In some embodiments, if the UE 102 has neither allowed NSSAI for the current PLMN nor configured NSSAI for the current PLMN and has a configured NSSAI not associated with a PLMN, the UE 102 can or shall include the S-NSSAI(s) in the Requested NSSAI IE of the REGISTRATION REQUEST message using the configured NSSAI not associated with a PLMN. If the UE 102 has no allowed NSSAI for the current PLMN, no configured NSSAI for the current PLMN, and no configured NSSAI not associated with a PLMN, the UE 102 can or shall not include a requested NSSAI in the REGISTRATION message.

The subset of configured NSSAI provided in the requested NSSAI consists of one or more S-NSSAIs in the configured NSSAI applicable to the current PLMN, if the S-NSSAI is neither in the rejected NSSAI for the current PLMN nor in the rejected NSSAI for the current PLMN and registration area combination.

The subset of allowed NSSAI provided in the requested NSSAI consists of one or more S-NSSAIs in the allowed NSSAI for the current PLMN, if the rejected S-NSSAI(s) is added by the configuration update procedure and the SNS-SAI is neither in the rejected NSSAI for the current PLMN nor in the rejected NSSAI for the current PLMN and registration area combination.

In some embodiments, how the UE 102 selects the subset of configured NSSAI or allowed NSSAI to be provided in the requested NSSAI can be considered the "implementation." In some embodiments, the number of S-NSSAI(s) included in the requested NSSAI cannot or may not exceed a particular number, such as twenty, ten, eight, etc.

If the UE 102 initiates an initial registration for emergency services or needs to prolong the established NAS signaling connection after the completion of the initial registration procedure (e.g. due to uplink signalling pending), it can or shall set the "follow-on request pending" indication to 1.

If the UE 102 supports S1 mode, the UE 102 can or shall:
set the S1 mode bit to "S1 mode supported" in the 5GMM capability IE of the REGISTRATION REQUEST message;
include the S1 UE network capability IE in the REGISTRATION REQUEST message; and
if the UE 102 supports sending an ATTACH REQUEST message containing a PDN CONNECTIVITY REQUEST message with request type set to "handover" to transfer a PDU session from N1 mode to S1 mode, set the HO attach bit to "attach request message containing PDN connectivity request with request type set to handover to transfer PDU session from N1 mode to S1 mode supported" in the 5GMM capability IE of the REGISTRATION REQUEST message.

If the UE 102 has one or more stored UE policy sections, the UE 102 can or shall include the UPSI LIST TRANSPORT message in the Payload container IE of the REGISTRATION REQUEST message.

Generally, if the initial registration request is accepted by the network, the AMF 108 can or shall send a REGISTRATION ACCEPT message to the UE 102. The AMF 108 can or shall assign and include a TAI list as a registration area the UE 102 is registered to in the REGISTRATION ACCEPT message. The UE 102, upon receiving a REGISTRATION ACCEPT message, can or shall delete its old TAI list and store the received TAI list. If the REGISTRATION REQUEST message was received over non-3GPP access, the AMF 108 can or shall include only the N3GPP TAI in the TAI list.

In some embodiments, a request, e.g., an initial registration request, from the UE 102 may not be accepted by the network. In such cases, the network (e.g., the AMF 108) may send back to the UE 102 a reject message (e.g., a registration reject message) including an approapriate 5GMM cause value. If the initial registration request is rejected due to general NAS level mobility management congestion control, the network can or shall set the 5GMM cause value to #22 "congestion" and assign a back-off timer T3346. Two other such cause values "cause #27" and "cause #72", which refer, respectively, to "N1 mode not allowed" and "Non-3GPP access to 5GCN not allowed."

In some embodiments, in response to receiving a requestion rejection message including cause value #27 (e.g., "N1 mode not allowed"), the UE 102 can or shall set the 5GS update status to 5U3 ROAMING NOT ALLOWED (and can or shall store it according to subclause 5.1.3.2.2 of 3GPP TS 24.501) and can or shall delete any 5G-GUTI, last visited registered TAI, TAI list, and/or ngKSI. Also, the UE 102 can or shall reset the registration attempt counter and can or shall enter the state "5GMM-DEREGISTERED.LIMITED-SERVICE." In some embodiments, if the message has been successfully integrity checked by the NAS, the UE 102 can or shall set:

1) the PLMN-specific N1 mode attempt counter for 3GPP access and the PLMN-specific N1 mode attempt counter for non-3GPP access for that PLMN in case of PLMN; or
2) the SNPN-specific attempt counter for 3GPP access for the current SNPN in case of SNPN;
to the UE implementation-specific maximum value (also known herein as "a threshold" or "a predetermined threshold").

In some embodiments, the UE 102 can or shall then disable the N1 mode capability for the specific access type for which the message was received.

If the message has been successfully integrity checked by the NAS, the UE 102 can or shall disable the N1 mode capability also for the other access type.

If the message was received via 3GPP access and the UE 102 is operating in single-registration mode, the UE 102 can or shall in addition set the EPS update status to "EU3 ROAMING NOT ALLOWED" and can or shall delete any 4G-GUTI, last visited registered TAI, TAI list, and/or eKSI. Additionally, the UE 102 can or shall reset the attach attempt counter and enter the state "EMM-DEREGISTERED."

In some embodiments, in response to receiving a requestion rejection message including cause value #72 (e.g., "Non-3GPP access to 5GCN not allowed"), e.g., when received over non-3GPP access, the UE 102 can or shall set the 5GS update status to 5U3 ROAMING NOT ALLOWED (and can or shall store it according to subclause 5.1.3.2.2 of 3GPP TS 24.501) and can or shall delete 5G-GUTI, last visited registered TAI, TAI list, and/or ngKSI. Additionally, the UE 102 can or shall reset the registration attempt counter and enter the state "5GMM-DEREGISTERED." If the message has been successfully integrity checked by the NAS, the UE 102 can or shall set the PLMN-specific N1 mode attempt counter for non-3GPP access for that PLMN to the UE implementation-specific maximum value.

In some embodiments, the 5GMM sublayer states, the 5GMM parameters and the registration status can be managed per access type independently, e.g., 3GPP access or non-3GPP access.

In some embodiments, the UE 102 can or shall disable the N1 mode capability for non-3GPP access.

As an implementation option, the UE 102 may enter the state "5GMM-DEREGISTERED.PLMN-SEARCH" in order to perform a PLMN selection according to 3GPP TS 23.122.

In some embodiments, if received over 3GPP access, the cause can or shall be considered an abnormal case and the behavior of the UE 102 in those cases is specified in subclause 5.5.1.2.7 of 3GPP TS 24.501.

In some embodiments, a mobility update and/or periodic registration update may be requested of the network, e.g., by way of the AMF 108, by the UE 102. When such mobility updates or periodic registration updates are not allowed by the network, the network or AMF 108 may respond to the UE 102 request with a rejection message. In some embodiments, the rejection message can be similar to that described above with regard to rejection messages received in response to the UE 102 transmitting an initial registration request to a incapable/non-configured or otherwise disallowing network.

When such a rejection message, in response to a request from the UE 102 for a mobility update and/or periodic registration update, is received from the AMF 108 and includes a cause value of #27 ("N1 mode not allowed"), the UE 102 can or shall set the 5GS update status to "5U3 ROAMING NOT ALLOWED" (and can or shall store it according to subclause 5.1.3.2.2 of 3GPP TS 24.501). Additionally, the UE 102 can or shall reset the registration attempt counter and can or shall enter the state "5GMM-REGISTERED.LIMITED-SERVICE." If the message has been successfully integrity checked by the NAS, the UE 102 can or shall set:
1) the PLMN-specific N1 mode attempt counter for 3GPP access and the PLMN-specific N1 mode attempt counter for non-3GPP access for that PLMN in case of PLMN; or
2) the SNPN-specific attempt counter for 3GPP access for the current SNPN in case of SNPN;
to the UE implementation-specific maximum value.

In some embodiments, the UE 102 can or shall disable the N1 mode capability or the specific access type for which the message was received.

In some embodiments, if the rejection message has been successfully integrity checked by the NAS, the UE 102 can or shall disable the N1 mode capability also for the other access type(s).

In some embodiments, if the message was received via 3GPP access and the UE 102 is operating in single-registration mode, the UE 102 can or shall in addition set the EPS update status to "EU3 ROAMING NOT ALLOWED." Additionally, the UE 102 can or shall reset the tracking area updating attempt counter and enter the state "EMM-REGISTERED."

In some embodiments, when a rejection message, in response to a request from the UE 102 for a mobility update and/or periodic registration update, is received from the AMF 108 and includes a cause value of #72 ("Non-3GPP access to 5GCN not allowed"), the UE 102 may change its settings with regard to the access type (trusted vs. un-trusted; 3GPP access vs. non-3GPP access) for the particular network from which the UE 102 received the rejection message.

In some embodiments, when the rejection message is received over non-3GPP access the UE 102 can or shall set the 5GS update status to "5U3 ROAMING NOT ALLOWED" (and can or shall store it according to subclause 5.1.3.2.2 of 3GPP TS 24.501) and can or shall delete 5G-GUTI, last visited registered TAI, TAI list, and/or ngKSI. Additionally, the UE 102 can or shall reset the registration attempt counter and enter the state "5GMM-DEREGISTERED." If the message has been successfully integrity checked by the NAS, the can or UE 102 can or shall set the PLMN-specific N1 mode attempt counter for non-3GPP access for that PLMN to the UE implementation-specific maximum value.

In some embodiments, the 5GMM sublayer states, the 5GMM parameters and the registration status can be managed per access type independently, e.g., 3GPP access or non-3GPP access.

In some embodiments, the UE 102 can or shall disable the N1 mode capability for non-3GPP access. In some embodiments, the UE 102 can or shall disable the N1 mode capability for the specific access type for which the rejection message was received.

As an implementation option, the UE 102 may enter the state "5GMM-DEREGISTERED.PLMN-SEARCH" in order to perform a PLMN selection according to 3GPP TS 23.122.

If received over 3GPP access, the cause can or shall be considered as an abnormal case and the behavior of the UE 102 in those cases is specified in subclause 5.5.1.2.7 of 3GPP TS 24.501.

In some embodiments, a service request may be requested of the network, e.g., by way of the AMF 108, by the UE 102. When such services requests or the provisioning of requested services are not allowed by the network, the network or AMF 108 may respond to the UE 102 request with a rejection message. In some embodiments, the rejection message can be similar to that described above with regard to rejection messages received in response to the UE 102 transmitting an initial registration request to an incapable/non-configured or otherwise disallowing network.

In some embodiments, such a rejection message, received in response to a request from the UE 102 for provisioning of services (e.g., a service request), from the AMF 108, may include a cause value of #27 ("N1 mode not allowed").

In some embodiments, the UE 102 can or shall set the 5GS update status to "5U3 ROAMING NOT ALLOWED" (and can or shall store it according to subclause 5.1.3.2.2 of 3GPP TS 24.501) and can or shall enter the state "5GMM-REGISTERED.LIMITED-SERVICE." If the message has been successfully integrity checked by the NAS, the UE 102 can or shall set:

1) the PLMN-specific N1 mode attempt counter for 3GPP access and the PLMN-specific N1 mode attempt counter for non-3GPP access for that PLMN in case of PLMN; or
2) the SNPN-specific attempt counter for 3GPP access for the current SNPN in case of SNPN to the UE implementation-specific maximum value.

In some embodiments, the UE 102 can or shall disable the N1 mode capability or the specific access type for which the message was received.

In some embodiments, if the rejection message has been successfully integrity checked by the NAS, the UE 102 can or shall disable the N1 mode capability also for the other access type(s).

In some embodiments, if the message was received via 3GPP access and the UE 102 is operating in single-registration mode, the UE 102 can or shall in addition set the EPS update status to "EU3 ROAMING NOT ALLOWED" and enter the state "EMM-REGISTERED."

In some embodiments, such a rejection message, received in response to a request from the UE 102 for provisioning of services (e.g., a service request), from the AMF 108, may include a cause value of #72 ("Non-3GPP access to 5GCN not allowed").

In some embodiments, if the UE initiated the service request procedure over non-3GPP access, the UE 102 can or shall set the 5GS update status to "5U3 ROAMING NOT ALLOWED" (and can or shall store it according to subclause 5.1.3.2.2 of 3GPP TS 24.501) and can or shall delete 5G-GUTI, last visited registered TAI, TAI list, and/or ngKSI for non-3GPP access. Additionally, the UE 102 can or shall enter the state "5GMM-DEREGISTERED" for non-3GPP access. If the message has been successfully integrity checked by the NAS, the UE 102 can or shall set the PLMN-specific N1 mode attempt counter for non-3GPP access for that PLMN to the UE implementation-specific maximum value.

In some embodiments, the UE 102 can or shall disable the N1 mode capability or the specific access type for which the message was received.

In some embodiments, if the rejection message has been successfully integrity checked by the NAS, the UE 102 can or shall disable the N1 mode capability also for the other access type(s).

As an implementation option, if the UE 102 is not currently registered over 3GPP access, the UE 102 may enter the state "5GMM-DEREGISTERED.PLMN-SEARCH" in order to perform a PLMN selection according to 3GPP TS 23.122.

In some embodiments, if received over 3GPP access, the cause can or shall be considered as an abnormal case and the behavior of the UE 102 in those cases is specified in subclause 5.5.1.2.7 of 3GPP TS 24.501.

In some embodiments, the purpose of the service request procedure may be to change the 5GMM mode from 5GMM-IDLE to 5GMMCONNECTED mode, and/or to request the establishment of user-plane resources for PDU sessions which are activated without user-plane resources. In latter case, the 5GMM mode can be the 5GMM-IDLE mode or the 5GMMCONNECTED mode if the UE 102 requires to activate user-plane resources for PDU sessions. This procedure is used when:

- the network has downlink signalling pending over 3GPP access and the UE 102 is in 5GMM-IDLE mode over 3GPP access;
- the network has downlink signalling pending over non-3GPP access, the UE 102 is in 5GMM-IDLE mode over non3GPP access and in 5GMM-IDLE or 5GMM-CONNECTED mode over 3GPP access;
- the UE 102 has uplink signalling pending over 3GPP access and the UE 102 is in 5GMM-IDLE mode over 3GPP access;
- the network has downlink user data pending over 3GPP access and the UE 102 is in 5GMM-IDLE mode over 3GPP access;
- the network has downlink user data pending over non-3GPP access, the UE 102 is in 5GMM-IDLE mode over non3GPP access and in 5GMM-IDLE or 5GMM-CONNECTED mode over 3GPP access;
- the UE 102 has user data pending over 3GPP access and the UE 102 is in 5GMM-IDLE or 5GMM-CONNECTED mode over 3GPP access;
- the UE 102 has user data pending over non-3GPP access and the UE 102 is in 5GMM-CONNECTED mode over non3GPP access;
- the UE 102 in 5GMM-IDLE mode over non-3GPP access, receives an indication from the lower layers of non-3GPP access, that the access stratum connection is established between UE 102 and network; or
- the UE 102 in 5GMM-IDLE or 5GMM-CONNECTED mode over 3GPP access receives a request for emergency service from the upper layer and performs emergency services fallback as specified in subclause 4.13.4.2 of 3GPP TS 23.502.

In some embodiments, this procedure may not, often may not, or may only sometimes be used for initiating user data transfer or PDU session related signalling related to a PDU session for LADN when the UE 102 is located outside the LADN service area.

The service request procedure is initiated by the UE 102, however, it can be triggered by the network by means of:

- the paging procedure (see subclause 5.6.2) for the transfer of downlink signalling or user data pending over 3GPP access to a UE 102 in 5GMM-IDLE mode over 3GPP access;
- the paging procedure (see subclause 5.6.2) for the transfer of downlink signalling or user data pending over non3GPP access to a UE 102 in 5GMM-IDLE mode over 3GPP access and in 5GMM-IDLE mode over non-3GPP access;
- the notification procedure (see subclause 5.6.3) for the transfer of downlink signalling or user data pending over non-3GPP access to a UE 102 in 5GMM-CON- NECTED mode over 3GPP access and in 5GMM-IDLE mode over non-3GPP access; or the notification procedure (see subclause 5.6.3) for the transfer of downlink signalling or user data pending over 3GPP access to a UE 102 in 5GMM-IDLE mode over 3GPP access and in 5GMM-CONNECTED mode over non3GPP access.

In some embodiments, in an instance in which the UE 102 is in 5GMM-IDLE mode over 3GPP access and in 5GMM-CONNECTED mode over non3GPP access and downlink signalling or user data pending over 3GPP access needs to be transferred, the AMF 108 can trigger either the notification procedure or the paging procedure based on implementation.

The UE 102 can or shall invoke the service request procedure when:

a) the UE 102, in 5GMM-IDLE mode over 3GPP access, receives a paging request from the network;

b) the UE 102, in 5GMM-CONNECTED mode over 3GPP access, receives a notification from the network with access type indicating non-3GPP access;

c) the UE 102, in 5GMM-IDLE mode over 3GPP access, has uplink signalling pending;

d) the UE 102, in 5GMM-IDLE mode over 3GPP access, has uplink user data pending;

e) the UE 102, in 5GMM-CONNECTED mode, has user data pending due to no user-plane resources established for PDU session(s) used for user data transport;

f) the UE 102 in 5GMM-IDLE mode over non-3GPP access, receives an indication from the lower layers of non-3GPP access, that the access stratum connection is established between UE 102 and network;

g) the UE 102, in 5GMM-IDLE mode over 3GPP access, receives a notification from the network with access type indicating 3GPP access when the UE 102 is in 5GMM-CONNECTED mode over non-3GPP access; or h) the UE 102 in 5GMM-IDLE or 5GMM-CONNECTED mode over 3GPP access receives a request for emergency service from the upper layer and performs emergency services fallback as specified in subclause 4.13.4.2 of 3GPP TS 23.502.

The UE 102 can or shall not invoke the service request procedure when the UE 102 is in the state "5GMM-SERVICE-REQUESTINITIATED."

In some embodiments and for various reasons, a service request procedure may not be accepted by the network. If the service request cannot be accepted, the network can or shall return a SERVICE REJECT message to the UE 102 including an appropriate 5GMM cause value and stop timer T3517.

If the AMF 108 needs to initiate PDU session status synchronisation or a PDU session status IE was included in the SERVICE REQUEST message, the AMF 108 can or shall include a PDU session status IE in the SERVICE REJECT message to indicate which PDU sessions associated with the access type the SERVICE REJECT message is sent over are active in the AMF 108. If the PDU session status IE is included in the SERVICE REJECT message, then the UE 102 can or shall release all those PDU sessions locally (without peer-to-peer signalling between the network and the UE 102) which are active on the UE 102 side associated with the access type the SERVICE REJECT message is sent over, but are indicated by the AMF 108 as being inactive.

On receipt of the SERVICE REJECT message, if the message is integrity protected, the UE 102 can or shall stop timer T3517 if running.

If the service request for mobile originated services is rejected due to general NAS level mobility management congestion control, the network can or shall set the 5GMM cause value to #22 "congestion" and assign a value for back-off timer T3346.

If the AMF 108 determines that the UE 102 is in a non-allowed area or is not in an allowed area, then:

a) if the service type IE in the SERVICE REQUEST message is set to "signalling" or "data", the AMF 108 can or shall send a SERVICE REJECT message with the 5GMM cause value set to #28 "Restricted service area";

b) otherwise, if the service type IE in the SERVICE REQUEST message is set to "mobile terminated services", "emergency services", "emergency services fallback" or "high priority access", the AMF 108 can or shall continue the process unless for other reasons the service request cannot be accepted.

The UE 102 can or shall take the following actions depending on the 5GMM cause value received in the SERVICE REJECT message.

3 (Illegal UE);

6 (Illegal ME); or

7 (5GS services not allowed). In such an instance, the UE 102 can or shall set the 5GS update status to 5U3 ROAMING NOT ALLOWED (and can or shall store it according to subclause 5.1.3.2.2 of 3GPP TS 24.501) and can or shall delete any 5G-GUTI, last visited registered TAI, TAI list and ngKSI. The UE 102 can or shall consider the USIM as invalid for 5GS services until switching off or the UICC containing the USIM is removed.

The UE 102 can or shall enter the state 5GMM-DEREGISTERED.

If S1 mode is supported by the UE 102, the UE 102 can or shall handle the EMM parameters EMM state, GUTI, last visited registered TAI, TAI list and eKSI as specified in 3GPP TS 24.301 for the case when the service request procedure is rejected with the EMM cause with the same value. The USIM can or shall be considered as invalid also for non-EPS services until switching off or the UICC containing the USIM is removed.

9 (UE identity cannot be derived by the network).

The UE 102 can or shall set the 5GS update status to 5U2 NOT UPDATED (and can or shall store it according to subclause 5.1.3.2.2) and can or shall delete any 5G-GUTI, last visited registered TAI, TAI list and ngKSI. The UE 102 can or shall enter the state 5GMM-DEREGISTERED.

If the service request was initiated for emergency services fallback, the UE 102 can or shall attempt to select an E-UTRA cell connected to EPC or 5GCN according to the emergency services support indicator. If the UE 102 finds a suitable E-UTRA cell, it then proceeds with the appropriate EMM or 5GMM procedures.

If the service request was initiated for any reason other than emergency services fallback or initiating a PDU session for emergency services, the UE 102 can or shall perform a new initial registration procedure.

In some embodiments, it may be necessary for a user of the UE 102 to intervene in instances in which the UE 102 cannot re-activate the PDU session(s) automatically.

If the UE 102 is operating in the single-registration mode, the UE 102 can or shall handle the EMM parameters EMM state, GUTI, last visited registered TAI, TAI list and eKSI as specified in 3GPP TS 24.301 for the case when the service request procedure is rejected with the EMM cause with the same value.

10 (Implicitly de-registered).

The UE 102 can or shall enter the state 5GMM-DEREGISTERED.NORMAL-SERVICE. The UE 102 can or shall delete any mapped 5G NAS security context or partial native 5G NAS security context.

If the rejected request was not for initiating a PDU session for emergency services, the UE 102 can or shall perform a new initial registration procedure.

If S1 mode is supported by the UE 102, the UE 102 can or shall handle the EMM state as specified in 3GPP TS 24.301 for the case when the service request procedure is rejected with the EMM cause with the same value.

22 (Congestion).

If the T3346 value IE is present in the SERVICE REJECT message and the value indicates that this timer is neither zero nor deactivated, the UE 102 can or shall proceed as described below, otherwise it can or shall be considered as an abnormal case and the behaviour of the UE 102 for this case is specified in subclause 5.6.1.6 of 3GPP TS 24.501.

If the rejected request was not for initiating a PDU session for emergency services, the UE 102 can or shall abort the service request procedure and enter state 5GMM-REGISTERED, and stop timer T3517 if still running.

The UE 102 can or shall stop timer T3346 if it is running.

If the SERVICE REJECT message is integrity protected, the UE 102 can or shall start timer T3346 with the value provided in the T3346 value IE.

If the SERVICE REJECT message is not integrity protected, the UE 102 can or shall start timer T3346 with a random value from the default range specified in 3GPP TS 24.008.

For all other cases the UE 102 stays in the current serving cell and applies normal cell reselection process. The service request procedure is started, if still necessary, when timer T3346 expires or is stopped.

27 (N1 mode not allowed).

The UE capable of S1 mode can or shall disable the N1 mode capability for both 3GPP access and non-3GPP access (see subclause 4.9).

28 (Restricted service area).

The UE 102 can or shall perform the registration procedure for mobility and periodic registration update (see subclause 5.5.1.3).

In some embodiments, the N1 mode capability may refer to a UE's 102 capability to access a network. If the N1 mode capability is disabled for a particular network (e.g., a 5G system (5GS)), a UE 102 typically cannot access the 5GS and if the N1 mode capability is enabled and there is an available 5GS, a UE 102 can typically access the 5GS. In addition, the N1 mode capability is access-specific, e.g., there are currently two types of N1 mode capability: N1 mode capability for 3GPP access and N1 mode capability for non-3GPP access. For example, if N1 mode capability for non-3GPP access is disabled and N1 mode capability for 3GPP access is enabled, a UE 102 can access a 5GS via 3GPP access only.

When a 5GS sends 5GMM cause value #27 "N1 mode not allowed" or #72 "Non-3GPP access to 5GCN not allowed", the UE's 102 N1 mode capability is impacted. For example, during the service request procedure, if the UE's 102 service request is rejected with 5GMM cause value #27 "N1 mode not allowed" or #72 "Non-3GPP access to 5GCN not allowed", the UE 102 behaves as follows (see 3GPP TS 24.501):

27 (N1 mode not allowed).

The UE 102 can or shall set the 5GS update status to 5U3 ROAMING NOT ALLOWED (and can or shall store it according to subclause 5.1.3.2.2) and can or shall enter the state 5GMM-REGISTERED.LIMITED-SERVICE. If the message has been successfully integrity checked by the NAS, the UE 102 can or shall set:

the PLMN-specific N1 mode attempt counter for 3GPP access and the PLMN-specific N1 mode attempt counter for non-3GPP access for that PLMN in case of PLMN; or the SNPN-specific attempt counter for 3GPP access for the current SNPN in case of SNPN to the UE implementation-specific maximum value.

If the message has been successfully integrity checked by the NAS, the UE 102 can or shall disable the N1 mode capability for both 3GPP access and non-3GPP access (see subclause 4.9).

If the message was received via 3GPP access and the UE 102 is operating in single-registration mode, the UE 102 can or shall in addition set the EPS update status to EU3 ROAMING NOT ALLOWED and enter the state EMM-REGISTERED.

72 (Non-3GPP access to 5GCN not allowed).

If the UE initiated the service request procedure over non-3GPP access, the UE 102 can or shall set the 5GS update status to 5U3 ROAMING NOT ALLOWED (and can or shall store it according to subclause 5.1.3.2.2 of 3GPP TS 24.501) and can or shall delete 5G-GUTI, last visited registered TAI, TAI list and ngKSI for non-3GPP access. Additionally, the UE 102 can or shall enter the state 5GMM-DEREGISTERED for non-3GPP access. If the message has been successfully integrity checked by the NAS, the UE 102 can or shall set the PLMN-specific N1 mode attempt counter for non-3GPP access for that PLMN to the UE implementation-specific maximum value.

In some embodiments, the 5GMM sublayer states, the 5GMM parameters, and the registration status are managed per access type independently, e.g., 3GPP access or non-3GPP access. In some embodiments, the UE 102 can or shall disable the N1 mode capability for non-3GPP access. In some embodiments, the UE 102 can or shall disable the N1 mode capability for a particular network for non-3GPP access in response to a rejection message received from the particular network that indicates that N1 mode is not allowed or that the UE 102 may only access the network via 3GPP (trusted) access.

As an implementation option, if the UE 102 is not currently registered over 3GPP access, the UE 102 may enter the state 5GMM-DEREGISTERED.PLMN-SEARCH in order to perform a PLMN selection according to 3GPP TS 23.122.

If received over 3GPP access, the cause can or shall be considered as an abnormal case and the behavior of the UE 102 in those cases is specified in subclause 5.5.1.2.7 of 3GPP TS 24.501

In some embodiments, the UE 102 should remember the identity of the PLMN where N1 mode capability for 3GPP access was disabled and should use that stored information in subsequent PLMN selections. More specifically, according to 3GPP TS 23.122, the UE 102 should maintain a list of PLMNs where the N1 mode capability was disabled due to receipt of a reject from the network with 5GMM cause #27 "N1 mode not allowed": When the UE 102 disables its N1 mode capability due to receipt of a reject from the network with 5GMM cause #27 "N1 mode not allowed":

the UE 102 should add the identity of the PLMN to the list of PLMNs where N1 mode is not allowed and should start timer TG if timer TG is not already running. The number of PLMNs that the MS can store where N1 mode is not allowed is implementation specific, but it can or shall be at least one. In some embodiments, the value of timer TG is MS implementation specific, but may not, cannot, or shall not exceed the maximum possible value of background scanning timer T;

in automatic PLMN selection the MS may not, cannot, or shall not consider PLMNs where N1 mode is not allowed as PLMN selection candidates for NG-RAN access technology, unless no other PLMN is available. This does not prevent selection of such a PLMN if it is available in another RAT; and the MS can or shall delete stored information on PLMNs where N1 mode is not allowed when the MS is switched off, the USIM is removed or timer TG expires.

According to conventional approaches and protocols, a UE 102 may disables N1 mode capability for all networks if the UE 102 receives 5GMM cause value #27 from an SNPN. This is problematic because the UE 102 can have multiple sets of subscriber data for multiple SNPNs and one SNPN's sending 5GMM cause value #27 can cause the UE 102 to not be able to access other SNPNs because the UE 102 disabled the UE's 102 N1 mode capability.

As such, embodiments described herein provide methods, systems, apparatuses, and computer program products for managing network capabilities for a UE 102 with regard to private network (e.g., SNPN) selection processes following receipt of a rejection message in response to, e.g., an initial registration request, mobility update request, period registration update request, service request, etc., the rejection message comprising a 5GMM cause value, e.g., #27 or #72 or the like.

According to some embodiments, N1 mode disabling and re-enabling by the UE 102 can be managed for a network using an entry in the "list of subscriber data." In some embodiments, the UE 102 can maintain a list of entries for which the N1 mode capability for 3GPP access was disabled. In some embodiments, an entry in the "list of subscriber data" may have a "entry index" parameter. In some embodiments, in PLMN access mode, the UE 102 may maintain a list of PLMNs, e.g., PLMNs IDs.

In some embodiments, the UE 102 can maintain, for each of the entries in the "list of subscriber data," one SNPN-specific N1 mode attempt counter for 3GPP access. The maximum number of possible entries in the list is implementation dependent. This list is applicable to access attempts via 3GPP access only; and one SNPN-specific N1 mode attempt counter for non-3GPP access. In some embodiments, the maximum number of possible entries in the list may be implementation dependent. In some embodiments, this list can be referenced, implemented, or used to access a network, when requesting registration or mobility updates, when requesting a service, or the like, e.g., when requesting SNPN services via a PLMN only.

In some embodiments, e.g., in the case of a PLMN, the UE 102 may maintain one list of PLMN-specific N1 mode attempt counters for 3GPP access and one list of PLMN-specific N1 mode attempt counters for non-3GPP access.

In some embodiments, if the UE 102 receives a non-integrity protected reject message including 5GMM cause value #27 (or #72), the UE 102 disables N1 mode capability for {the entry, the respective access type (or non-3GPP access)} and starts T3247. In addition, if the SNPN-specific N1 mode attempt counter for the respective access type (or non-3GPP access) and for the current SNPN has a value less than a UE implementation-specific maximum value, the UE 102 can or shall increment this counter for the entry.

Upon expiry of timer T3247, the UE 102 re-enables the N1 mode capability for 3GPP access/non-3GPP access for the entry and, if the SNPN-specific N1 mode attempt counter for 3GPP access has a value greater than zero and less than a UE implementation-specific maximum value, remove the respective entry index from the list of entries for which N1 mode is not allowed for 3GPP access/non-3GPP access.

In some embodiments, in the UE 102, the ME is configured with a "list of subscriber data" containing zero or more entries. Each entry of the "list of subscriber data" consists of:

a) entry index; and
b) other parameters available in TS 23.122 (e.g. subscriber ID, credentials, SNPN identity).

In some embodiments, The "list of subscriber data" is information configured in the ME of a UE 102 containing zero or more entries. Each entry of the "list of subscriber data" consists of (the list below is according to the current version of TS 23.122, which is subject to change):

a) (optional) a subscriber identifier;
b) (optional) credentials;
c) an SNPN identity; and
d) (optional) the unified access control configuration.

The UE 102 should maintain a list of entries for which the N1 mode capability was disabled due to receipt of a reject from the network with 5GMM cause #27 "N1 mode not allowed". When the UE 102 disables its N1 mode capability due to receipt of a reject from the network with 5GMM cause #27 "N1 mode not allowed" for an entry:

the UE 102 should add the index of the entry used for accessing the SNPN which sent a reject with 5GMM cause #27 "N1 mode not allowed" to the list of entries for which N1 mode is disabled (or add the SNPN identity of the SNPN which sent a reject with 5GMM cause #27 "N1 mode not allowed" to the list of SNPNs for which N1 mode is disabled) and should start timer TG if timer TG is not already running. The number of entries (or SNPNs) that the MS can store for which N1 mode is not allowed is implementation specific, but it can or shall be at least one. The value of timer TG is UE implementation specific;

in automatic SNPN selection, the UE 102 can or shall not use entries (or SNPNs) for which N1 mode is not allowed as SNPN selection candidates for NG-RAN access technology, unless no other SNPN is available; and the UE 102 can or shall delete stored information on entries (or SNPNs) for which N1 mode is not allowed when the UE is switched off, the USIM is removed or timer TG expires.

If the UE 102 is operating in SNPN access mode, the UE 102 can or shall maintain, for each of the entries in the "list of subscriber data":

one SNPN-specific N1 mode attempt counter for 3GPP access. The maximum number of possible entries in the list is implementation dependent. This list is applicable to access attempts via 3GPP access only; and one SNPN-specific N1 mode attempt counter for non-3GPP access. The maximum number of possible entries in the list is implementation dependent. This list is applicable in case of accessing SNPN services via a PLMN only.

If the UE 102 receives a REGISTRATION REJECT or SERVICE REJECT message without integrity protection with 5GMM cause value #27 or #72 before the network has established secure exchange of NAS messages for the N1 NAS signalling connection, the UE 102 can or shall stop timer T3510 or T3517, if running, and start timer T3247 with a random value uniformly drawn from the range between 30 minutes and 60 minutes if the timer is not running, and take the following actions:

a) if the 5GMM cause value received is #27, the UE 102 can or shall proceed as specified in subclauses 5.5.1 and 5.6.1 of 3GPP TS 24.501. Additionally, if the SNPN-specific N1 mode attempt counter for the respective access type and for the current SNPN has a value less than a UE implementation-specific maximum value, the UE 102 can or shall increment this counter for the entry (or for the SNPN); and
  b) if the 5GMM cause value received is #72, the UE 102 can or shall proceed as specified in subclauses 5.5.1 and 5.6.1 of 3GPP TS 24.501. Additionally, if the SNPN-specific N1 mode attempt counter for non-3GPP access for the current SNPN has a value less than a UE implementation-specific maximum value, the UE 102 can or shall increment this counter for the entry (or for the SNPN).

Upon expiry of timer T3247, the UE 102 can or shall:
  re-enable the N1 mode capability for 3GPP access for the entry and, if the SNPN-specific N1 mode attempt counter for 3GPP access has a value greater than zero and less than a UE implementation-specific maximum value, remove the entry index from the list of entries for which N1 mode is not allowed for 3GPP access (or remove the SNPN identity from the list of SNPNs for which N1 mode is not allowed for 3GPP access); and
  re-enable the N1 mode capability for non-3GPP access and, if the SNPN-specific N1 mode attempt counter for non-3GPP access has a value greater than zero and less than a UE implementation-specific maximum value, remove the respective entry index from the list of entries for which N1 mode is not allowed for non-3GPP access (or remove the SNPN identity from the list of SNPNs for which N1 mode is not allowed for non-3GPP access).

In some embodiments, The registration on the selected SNPN and the LR are only necessary if the MS is capable of services which require registration. Otherwise, the SNPN selection procedures are performed without registration.

The ME is configured with a "list of subscriber data" containing zero or more entries. Each entry of the "list of subscriber data" consists of:
  aa) entry index;
  a) a subscriber identifier in the form of a SUPI containing a network-specific identifier;
  b) credentials except when the SNPN uses:
    1) the EAP based primary authentication and key agreement procedure using the EAP-AKA'; or
    2) the 5G AKA based primary authentication and key agreement procedure;
In some embodiments, credentials for the EAP based primary authentication and key agreement procedure using the EAP-AKA' and for the 5G AKA based primary authentication and key agreement procedure are available in USIM.
  c) an SNPN identity; and
  d) optionally, the unified access control configuration indicating, for which access identities (see 3GPP TS 24.501) the ME is configured in the SNPN.

In some embodiments, multiple entries can include the same subscriber identifier and credentialsl. In some embodiments, the handling of more than one entry with the same SNPN identity may be left up to MS implementation.

The MS can or shall maintain a list of "temporarily forbidden SNPNs" and a list of "permanently forbidden SNPNs" in the ME. Each entry of those lists consists of an SNPN identity.

The MS can or shall add an SNPN to the list of "temporarily forbidden SNPNs" and start an MS implementation specific timer not shorter than 60 minutes, if a message with cause value #74 "Temporarily not authorized for this SNPN" (see 3GPP TS 24.501) is received by the MS in response to an LR request from the SNPN and:
  the message is integrity-protected; or
  the message is not integrity-protected, and the value of the SNPN-specific attempt counter for that SNPN is equal to the MS implementation specific maximum value as defined in 3GPP TS 24.501.

The MS can or shall remove an SNPN from the list of "temporarily forbidden SNPNs", if:
  a) there is a successful LR after a subsequent manual selection of the SNPN;
  c) the MS implementation specific timer not shorter than 60 minutes expires;
  c) the MS is switched off; or
  d) an entry of the "list of subscriber data" with the SNPN identity of the SNPN is updated or the USIM is removed if:
    EAP based primary authentication and key agreement procedure using EAP-AKA'; or
    5G AKA based primary authentication and key agreement procedure;
    was performed in the selected SNPN.

The MS can or shall add an SNPN to the list of "permanently forbidden SNPNs", if a message with cause value #75 "Permanently not authorized for this SNPN" (see 3GPP TS 24.501) is received by the MS in response to an LR request from the SNPN and:
  the message is integrity-protected; or
  the message is not integrity-protected, and the value of the SNPN-specific attempt counter for that SNPN is equal to the MS implementation specific maximum value as defined in 3GPP TS 24.501.

The MS can or shall remove an SNPN from the list of "permanently forbidden SNPNs", if:
  a) there is a successful LR after a subsequent manual selection of the SNPN;
  b) an entry of the "list of subscriber data" with the SNPN identity of the SNPN is updated or the USIM is removed if:
    EAP based primary authentication and key agreement procedure using EAP-AKA'; or
    5G AKA based primary authentication and key agreement procedure;
    was performed in the selected SNPN.

When the MS reselects to a cell in a shared network, and the cell is a suitable cell for multiple SNPN identities received in the broadcast information as specified in 3GPP TS 36.331 and 3GPP TS 38.331, the AS 112 (or AS/AF 112) indicates these multiple SNPN identities to the NAS according to 3GPP TS 36.304 and 3GPP TS 38.304. The MS can or shall select one of these SNPNs. If the registered SNPN is available among these SNPNs, the MS can or shall not select a different SNPN. In some embodiments, suitable cell in SNPN needs to be specified by RAN2. In some embodiments, the MS operating in SNPN access mode can or shall maintain one or more lists of "5GS forbidden tracking areas for roaming", each associated with an SNPN. The MS can or shall use the list of "5GS forbidden tracking areas for roaming" associated with the selected SNPN. If the MS selects a new SNPN, the MS can or shall keep the list of "5GS forbidden tracking areas for roaming" associated with the previously selected SNPN. If the number of the lists to be kept is higher than supported, the MS can or shall delete the oldest stored list of "5GS forbidden tracking areas for roaming". The MS can or shall delete all lists of "5GS forbidden tracking areas for roaming", when the MS is switched off and periodically (with period in the range 12 to 24 hours). The MS can or shall delete the list of "5GS forbidden tracking areas for roaming" associated with an SNPN, when the entry of the SNPN in the list of subscriber data" is updated or when the USIM is removed if:

the EAP based primary authentication and key agreement procedure using the EAP-AKA'; or the 5G AKA based primary authentication and key agreement procedure;

was performed in the selected SNPN.

In some embodiments, the number of the lists of "5GS forbidden tracking areas for roaming" supported by the MS is MS implementation specific.

If a message with cause value #15 (see 3GPP TS 24.501) is received by an MS operating in SNPN access mode, the TA is added to the list of "5GS forbidden tracking areas for roaming" of the selected SNPN. The MS can or shall then search for a suitable cell in the same SNPN but belonging to a TA which is not in the "5GS forbidden tracking areas for roaming" list of the selected SNPN.

The MS should maintain a list of entries for which the N1 mode capability was disabled due to receipt of a reject from the network with 5GMM cause #27 "N1 mode not allowed". When the MS disables its N1 mode capability due to receipt of a reject from the network with 5GMM cause #27 "N1 mode not allowed" for an entry:

the MS should add the index of the entry used for accessing the SNPN which sent a reject with 5GMM cause #27 "N1 mode not allowed" to the list of entries and should start timer TG if timer TG is not already running. The number of entries that the MS can store for which N1 mode is not allowed is implementation specific, but it can or shall be at least one. The value of timer TG is MS implementation specific;

in automatic SNPN selection, the MS can or shall not use entries for which N1 mode is not allowed as SNPN selection candidates for NG-RAN access technology, unless no other SNPN is available; and the MS can or shall delete stored information on entries for which N1 mode is not allowed when the MS is switched off, the USIM is removed or timer TG expires.

In some embodiments, with regard to the UE 102 disabling and/or re-enabling the UE's 102 N1 mode capability for 3GPP access, The UE 102 can or shall only disable the N1 mode capability for 3GPP access when in 5GMM-IDLE mode.

When the UE 102 is disabling the N1 mode capability for 3GPP access, it should proceed as follows:

a) select an E-UTRA cell connected to EPC of the registered PLMN or a PLMN from the list of equivalent PLMNs, if the UE 102 supports S1 mode and the UE 102 has not disabled its E-UTRA capability as specified in 3GPP TS 24.301;

b) if an E-UTRA cell connected to EPC of the registered PLMN or a PLMN from the list of equivalent PLMNs cannot be found, the UE 102 does not support S1 mode or the UE 102 has disabled its E-UTRA capability as specified in 3GPP TS 24.301, the UE 102 may select another RAT of the registered PLMN or a PLMN from the list of equivalent PLMNs that the UE 102 supports;

c) in case of PLMN, if another RAT of the registered PLMN or a PLMN from the list of equivalent PLMNs cannot be found, or the UE 102 does not have a registered PLMN, then enter the state 5GMM-DEREG-ISTERED.PLMN-SEARCH and perform PLMN selection as specified in 3GPP TS 23.122. If disabling of the N1 mode capability for 3GPP access was not due to a UE-initiated de-registration procedure for 5GS services over 3GPP access not due to switch-off, the UE 102 may re-enable the N1 capability for this PLMN selection. As an implementation option, if the UE 102 does not have a registered PLMN, instead of performing PLMN selection, the UE 102 may select another RAT of the selected PLMN if the UE 102 has chosen a PLMN and the RAT is supported by the UE 102.

In case of SNPN, enter the state 5GMM-DEREGIS-TERED.PLMN-SEARCH and perform SNPN selection as specified in 3GPP TS 23.122. If disabling of the N1 mode capability for 3GPP access was not due to a UE-initiated de-registration procedure for 5GS services over 3GPP access not due to switch-off, the UE 102 may re-enable the N1 capability for the previously used entry in the "list of subscriber data" for this SNPN selection; or d) if no other allowed PLMN and RAT combinations are available or if no other SNPN is available, then the UE 102 may re-enable the N1 mode capability for 3GPP access and indicate to lower layers to remain camped in NG-RAN of the registered PLMN or SNPN, and may periodically scan for another PLMN and RAT combination which can provide EPS services or non-EPS services (if the UE 102 supports EPS services or non-EPS services). How this periodic scanning is done, is UE 102 implementation dependent.

When the UE 102 is disabling the N1 mode capability upon receiving reject cause #31 "Redirection to EPC required" as specified in subclauses 5.5.1.2.5 and 5.5.1.3.5, it should proceed as follows:

a) If the UE 102 is in NB-N1 mode:

1) if lower layers do not provide an indication that the current E-UTRA cell is connected to EPC or lower layers do not provide an indication that the current E-UTRA cell supports CIoT EPS optimizations that are supported by the UE 102, search for a suitable NB-IoT cell connected to EPC according to 3GPP TS 36.304;

2) if lower layers provide an indication that the current E-UTRA cell is connected to EPC and the current E-UTRA cell supports CIoT EPS optimizations that are supported by the UE 102, perform a core network selection to select EPC as specified in subclause 4.8.4A.1; or 3) if lower layers cannot find a suitable NB-IoT cell connected to EPC or there is no suitable NB-IoT cell connected to EPC which supports CIoT EPS optimizations that are supported by the UE 102, the UE 102 may re-enable the N1 mode capability for 3GPP access, and indicate to lower layers to remain camped in E-UTRA connected to 5GCN of the previously registered PLMN and proceed with the appropriate 5GMM procedure.

b) If the UE 102 is in WB-N1 mode:

1) if lower layers do not provide an indication that the current E-UTRA cell is connected to EPC or lower layers do not provide an indication that the current E-UTRA cell supports CIoT EPS optimizations that are supported by the UE 102, search for a suitable E-UTRA cell connected to EPC according to 3GPP TS 36.304;

2) if lower layers provide an indication that the current E-UTRA cell is connected to EPC and the current E-UTRA cell supports CIoT EPS optimizations that are supported by the UE 102, then perform a core network selection to select EPC as specified in subclause 4.8.4A.1; or 3) if lower layers cannot find a suitable E-UTRA cell connected to EPC or there is no suitable E-UTRA cell connected to EPC which supports CIoT EPS optimizations that are supported by the UE 102, the UE 102 may re-enable the N1 mode capability for 3GPP access, and indicate to lower layers to remain camped in E-UTRA connected to 5GCN of the previously registered PLMN and proceed with the appropriate 5GMM procedure.

When the UE 102 supporting both N1 mode and S1 mode needs to stay in E-UTRA connected to EPC (e.g. due to the domain selection for UE 102 originating sessions as specified in subclause 4.3.2), in order to prevent unintentional handover or cell reselection from E-UTRA connected to EPC to NG-RAN connected to 5GCN, the UE 102 operating in single-registration mode can or shall disable the N1 mode capability for 3GPP access and:

a) can or shall set the N1 mode bit to "N1 mode not supported" in the UE 102 network capability IE (see 3GPP TS 24.301) of the ATTACH REQUEST message and the TRACKING AREA UPDATE REQUEST message in EPC; and b) the UE NAS layer can or shall indicate the access stratum layer(s) of disabling of the N1 mode capability for 3GPP access.

If the UE 102 is required to disable the N1 mode capability for 3GPP access and select E-UTRA or another RAT, and the UE 102 is in the 5GMM-CONNECTED mode,
  if the UE 102 has a persistent PDU session, then the UE 102 waits until the radio bearer associated with the persistent PDU session has been released;
  otherwise the UE 102 can or shall locally release the established NAS signalling connection;
  and enter the 5GMM-IDLE mode before selecting E-UTRA or another RAT.

If the UE 102 is disabling its N1 mode capability for 3GPP access before selecting E-UTRA or another RAT, the UE 102 may not, cannot, or shall not perform the UE-initiated de-registration procedure of subclause 5.5.2.2.

The UE 102 can or shall re-enable the N1 mode capability for 3GPP access when the UE 102 performs PLMN or SNPN selection over 3GPP access, unless
  disabling of the N1 mode capability for 3GPP access was due to a UE-initiated de-registration procedure for 5GS services over 3GPP access not due to switch-off; or
  the UE 102 has already re-enabled the E-U IRA capability when performing items c) or d) above.

If the disabling of N1 mode capability for 3GPP access was due to IMS voice is not available over 3GPP access and the UE's usage setting is "voice centric", the UE 102 can or shall re-enable the N1 mode capability for 3GPP access when the UE's usage setting is changed from "voice centric" to "data centric", as specified in subclauses 4.3.3.

The UE 102 should remember, record, memorize, or the like, the identity of the PLMN or the index of the entry in the "list of subscriber data" used for accessing the SNPN where N1 mode capability for 3GPP access was disabled and should use that stored information in subsequent PLMN or SNPN selections as specified in 3GPP TS 23.122.

If the disabling of N1 mode capability for 3GPP access was due to successful completion of an emergency services fallback, the criteria to enable the N1 mode capability again are UE 102 implementation specific.

As an implementation option, the UE 102 may start a timer for enabling the N1 mode capability for 3GPP access when the UE's registration attempt counter reaches 5 and the UE 102 disables the N1 mode capability for 3GPP access for cases described in subclauses 5.5.1.2.7 and 5.5.1.3.7. The UE 102 should record, remember, or memorize the identity of the PLMNs where N1 mode capability for 3GPP access was disabled. On expiry of this timer:
  if the UE 102 is in Iu mode or A/Gb mode and is in idle mode as specified in 3GPP TS 24.008 on expiry of the timer, the UE 102 should enable the N1 mode capability for 3GPP access;
  if the UE 102 is in Iu mode or A/Gb mode and an RR connection exists, the UE 102 can or shall delay enabling the N1 mode capability for 3GPP access until the RR connection is released;
  if the UE 102 is in Iu mode and a PS signalling connection exists, but no RR connection exists, the UE 102 may abort the PS signalling connection before enabling the N1 mode capability for 3GPP access;
  if the UE 102 is in S1 mode and is in EMM-IDLE mode as specified in 3GPP TS 24.301, on expiry of the timer, the UE 102 should enable the N1 mode capability for 3GPP access; and
  if the UE 102 is in S1 mode and is in EMM-CONNECTED mode as specified in 3GPP TS 24.301, on expiry of the timer, the UE 102 can or shall delay enabling the N1 mode capability for 3GPP access until the NAS signalling connection in S1 mode is released.

If the UE 102 attempts to establish an emergency PDU session in a PLMN where N1 mode capability was disabled due to the UE's registration attempt counter have reached 5, the UE 102 may enable N1 mode capability for that PLMN memorized by the UE 102.

In some embodiments, if N1 mode capability is disabled due to the UE's registration attempt counter reaches 5, the value of the timer for re-enabling N1 mode capability is recommended to be the same as the value of T3502 which follows the handling specified in subclause 5.3.8.

In the case of SNPNs, for instance, If the UE 102 is not SNPN enabled, the UE 102 is always considered to be not operating in SNPN access mode. If the UE 102 is SNPN enabled, the UE 102 can operate in SNPN access mode. Details of activation and deactivation of SNPN access mode at the SNPN enabled UE 102 are up to UE 102 implementation.

The functions and procedures of NAS described in the present document are applicable to an SNPN and an SNPN enabled UE 102 unless indicated otherwise. The key differences brought by the SNPN to the NAS layer are as follows:

a) instead of the PLMN selection process, the SNPN selection process is performed by a UE 102 operating in SNPN access mode (see 3GPP TS 23.122 for further details on the SNPN selection);

b) a "permanently forbidden SNPNs" list and a "temporarily forbidden SNPNs" list are managed by a UE 102 operating in SNPN access mode instead of forbidden PLMN lists;

c) inter-system change to and from S1 mode is not supported;

d) emergency services are not supported in SNPN access mode;

e) CAG is not supported in SNPN access mode;

f) with respect to the 5GMM cause values:
1) 5GMM cause values #74 "Temporarily not authorized for this SNPN" and #75 "Permanently not authorized for this SNPN" are supported whereas these 5GMM cause values cannot be used in a PLMN;
2) 5GMM cause values #11 "PLMN not allowed" and #73 "Serving network not authorized" are not supported whereas these 5GMM cause values can be used in a PLMN; and
3) 5GMM cause value #76 "Not authorized for this CAG or authorized for CAG cells only" is not supported whereas this 5GMM cause value can be used in a PLMN; and In some embodiments, 5GMM cause values #31 "Redirection to EPC required" and #72 "Non-3GPP access to 5GCN not allowed" are/is supported in an SNPN.

g) a list of "5GS forbidden tracking areas for roaming" and a list of "5GS forbidden tracking areas for regional provision of service" are managed per SNPN (see 3GPP TS 23.122);
h) when accessing SNPN services via a PLMN, access to 5GCN of the SNPN is performed using 5GMM procedures for non-3GPP access and 5GMM parameter for non-3GPP access. When accessing PLMN services via a SNPN, access to 5GCN of the PLMN is performed using 5GMM procedures for non-3GPP access and 5GMM parameter for non-3GPP access;
i) when registered to an SNPN, the UE 102 can or shall use only the UE 102 policies provided by the registered SNPN; and
j) equivalent SNPN is not supported; and
x) the N1 mode capability for an access type is disabled and re-enabled per entry in the "list of subscriber data".

Furthermore, there may be particular requirements for a UE 102 when accessing, registering with, and/or receiving services from an SNPN. In some embodiments, If the UE 102 is operating in SNPN access mode, the UE 102 can or shall maintain, for each of the entries in the "list of subscriber data":
one SNPN-specific attempt counter for 3GPP access. The counter is applicable to access attempts via 3GPP access only;
one SNPN-specific attempt counter for non-3GPP access. The counter is applicable in case of accessing SNPN services via a PLMN only;
one SNPN-specific N1 mode attempt counter for 3GPP access. The maximum number of possible entries in the list is implementation dependent. This list is applicable to access attempts via 3GPP access only;
one SNPN-specific N1 mode attempt counter for non-3GPP access. The maximum number of possible entries in the list is implementation dependent. This list is applicable in case of accessing SNPN services via a PLMN only;
one counter for "the entry for the current SNPN considered invalid for 3GPP access" events; and
one counter for "the entry for the current SNPN considered invalid for non-3GPP access" events. The counter is applicable in case of accessing SNPN services via a PLMN only.

In some embodiments, the term "non-3GPP access," which may be used in the counter for "the entry for the current SNPN considered invalid for 3GPP access" events and the counter for "the entry for the current SNPN considered invalid for non-3GPP access" events, can be used to express access to SNPN services via a PLMN.

The UE 102 can or shall store the above counters in its non-volatile memory. The UE 102 can or shall erase the attempt counters and reset the event counters to zero when the entry of the "list of subscriber data" with the corresponding SNPN identity is updated. The counter values may not, cannot, or shall not be affected by the activation or deactivation of MICO mode or power saving mode (see 3GPP TS 24.301).

The UE 102 implementation-specific maximum value for any of the above counters may not, cannot, or shall not be greater than 1, 2, 3, 4, 5, 6, 7, 8, 9, 10, or more. In some embodiments, different counters can use different UE 102 implementation-specific maximum values.

If the UE 102 receives a REGISTRATION REJECT or SERVICE REJECT message without integrity protection with 5GMM cause value #3, #6, #7, #12, #13, #15, #27, #72, #74, or #75 before the network has established secure exchange of NAS messages for the N1 NAS signalling connection, the UE 102 can or shall stop timer T3510 or T3517, if running, and start timer T3247 (see 3GPP TS 24.008) with a random value uniformly drawn from the range between:
a) 15 minutes and 30 minutes for 5GMM cause value #74; or
b) 30 minutes and 60 minutes for other 5GMM cause values;
if the timer is not running, and take the following actions:
a) if the 5GMM cause value received is #3, #6, or #7:
1) if the 5GMM cause value is received over 3GPP access:
i) if the UE 102 is already registered over another access, the UE 102 can or shall:
A) store the current TAI in the list of "5GS forbidden tracking areas for roaming", memorize the current TAI was stored in the list of "5GS forbidden tracking areas for roaming" for non-integrity protected NAS reject message and enter the state 5GMM-DEREGISTERED.LIMITED-SERVICE; and
B) search for a suitable cell in another tracking area according to 3GPP TS 38.304 or 3GPP TS 36.304; or
ii) otherwise if the counter for "the entry for the current SNPN considered invalid for 3GPP access" events has a value less than a UE implementation-specific maximum value, the UE 102 can or shall:
A) set the 5GS update status to 5U3 ROAMING NOT ALLOWED (and can or shall store it according to subclause 5.1.3.2.2) and can or shall delete 5G-GUTI, last visited registered TAI, TAI list, and ngKSI for 3GPP access;
B) increment the counter for "the entry for the current SNPN considered invalid for 3GPP access" events;
C) reset the registration attempt counter in case of a REGISTRATION REJECT message or reset the service request attempt counter in case of a SERVICE REJECT message;
D) store the current TAI in the list of "5GS forbidden tracking areas for roaming" for the current SNPN, memorize the current TAI was stored in the list of "5GS forbidden tracking areas for roaming" for the current SNPN for non-integrity protected NAS reject message, and enter the state 5GMM-DEREGISTERED.LIMITED-SERVICE; and
E) search for a suitable cell in another tracking area according to 3GPP TS 38.304 or 3GPP TS 36.304. As a UE 102 implementation option, if accessing SNPN services via a PLMN is available and the entry of the "list of subscriber data" with the SNPN identity of the current SNPN is not considered invalid for non-3GPP access, then the UE 102 may attempt to access SNPN services via a PLMN; or
iii) otherwise, the UE 102 can or shall proceed as specified in subclauses 5.5.1 and 5.6.1;
2) if the 5GMM cause value is received over non-3GPP access:
In some embodiments, a 5GMM cause value "received over non-3GPP access" may refer to a 5GMM cause value received via a PLMN when the UE 102 attempts to access SNPN services via a PLMN.
  i) if the UE 102 is already registered over another access, the UE 102 can or shall enter the state 5GMM-DEREGISTERED. LIMITED-SERVICE; or
  ii) otherwise if the counter for "the entry for the current SNPN considered invalid for non-3GPP access" events has a value less than a UE implementation-specific maximum value, the UE 102 can or shall:
    A) set the 5GS update status to 5U3 ROAMING NOT ALLOWED (and can or shall store it according to subclause 5.1.3.2.2) and can or shall delete the 5G-GUTI, last visited registered TAI, TAI list, and ngKSI for non-3GPP access;
    B) enter the state 5GMM-DEREGISTERED.LIMITED-SERVICE; and
    C) increment the counter for "the entry for the current SNPN considered invalid for non-3GPP access" events. As a UE implementation option, if 3GPP access is available and the entry of the "list of subscriber data" with the SNPN identity of the current SNPN is not considered invalid for 3GPP access, then the UE 102 may make a registration attempt over 3GPP access; or
  iii) otherwise, the UE 102 can or shall proceed as specified in subclauses 5.5.1 and 5.6.1;
b) if the 5GMM cause value received is #12, #13, or #15, the UE 102 can or shall proceed as specified in subclauses 5.5.1 and 5.6.1. Additionally:
  1) if the 5GMM cause value is received over 3GPP access, accessing SNPN services via a PLMN is available, the UE 102 has not accessed SNPN services via a PLMN yet, and the entry of the "list of subscriber data" with the SNPN identity of the current SNPN is not considered invalid for non-3GPP access, the UE 102 may attempt to access SNPN services via a PLMN; or
  2) if the 5GMM cause value is received over non-3GPP access, 3GPP access is available, the UE 102 is not registered to the current SNPN over 3GPP access yet, and the entry of the "list of subscriber data" with the SNPN identity of the current SNPN is not considered invalid for 3GPP access, the UE 102 may make a registration attempt over 3GPP access;
c) if the 5GMM cause value received is #27, the UE 102 can or shall proceed as specified in subclauses 5.5.1 and 5.6.1. Additionally, if the SNPN-specific N1 mode attempt counter for the respective access type 3GPP access and for the current SNPN has a value less than a UE implementation-specific maximum value, the UE 102 can or shall increment this counter for the entrySNPN; and
c1) if the 5GMM cause value received is #72, the UE 102 can or shall proceed as specified in subclauses 5.5.1 and 5.6.1. Additionally, if the SNPN-specific N1 mode attempt counter for non-3GPP access for the current SNPN has a value less than a UE implementation-specific maximum value, the UE 102 can or shall increment this counter for the entry; and d) if the 5GMM cause value received is #74 or #75, the UE 102 can or shall:
  1) if the 5GMM cause value is received over 3GPP access, the UE 102 can or shall:
    i) set the 5GS update status to 5U3 ROAMING NOT ALLOWED (and can or shall store it according to clause 5.1.3.2.2) and can or shall delete the 5G-GUTI, last visited registered TAI, TAI list, and ngKSI for 3GPP access;
    ii) reset the registration attempt counter in case of a REGISTRATION REJECT message or reset the service request attempt counter in case of a SERVICE REJECT message;
    iii) store the current TAI in the list of "5GS forbidden tracking areas for roaming" for the current SNPN, memorize the current TAI was stored in the list of "5GS forbidden tracking areas for roaming" for the current SNPN for non-integrity protected NAS reject message, and enter the state 5GMM-DEREGISTERED.LIMITED-SERVICE; and
    iv) search for a suitable cell in another tracking area according to 3GPP TS 38.304 or 3GPP TS 36.304. As a UE implementation option, if accessing SNPN services via a PLMN is available, the UE 102 has not accessed SNPN services via a PLMN yet, and the entry of the "list of subscriber data" with the SNPN identity of the current SNPN is not considered invalid for non-3GPP access, then the UE 102 may attempt to access SNPN services via a PLMN; or
  2) if the 5GMM cause value is received over non-3GPP access, the UE 102 can or shall:
    i) set the 5GS update status to 5U3 ROAMING NOT ALLOWED (and can or shall store it according to subclause 5.1.3.2.2) and can or shall delete the 5G-GUTI, last visited registered TAI, TAI list and ngKSI for non-3GPP access;
    ii) reset the registration attempt counter in case of a REGISTRATION REJECT message or reset the service request attempt counter in case of a SERVICE REJECT message; and
    iii) enter the state 5GMM-DEREGISTERED.LIMITED-SERVICE. As a UE 102 implementation option, if 3GPP access is available, the UE 102 is not registered to the current SNPN over 3GPP access yet, and the entry of the "list of subscriber data" with the SNPN identity of the current SNPN is not considered invalid for 3GPP access, the UE 102 may make a registration attempt over 3GPP access.
Upon expiry of timer T3247, the UE 102 can or shall:
remove, for the current SNPN, all tracking areas from the list of "5GS forbidden tracking areas for regional provision of service" and the list of "5GS forbidden tracking areas for roaming", which were stored in these lists for non-integrity protected NAS reject message;
set the entry of the "list of subscriber data" with the SNPN identity of the current SNPN to valid for 3GPP access, if the counter for "the entry for the current SNPN considered invalid for 3GPP access" events has a value less than a UE implementation-specific maximum value;
set the entry of the "list of subscriber data" with the SNPN identity of the current SNPN to valid for non-3GPP access, if the counter for "the entry for the current SNPN invalid for non-3GPP access" events has a value less than a UE implementation-specific maximum value;

remove the SNPN identity of the current SNPN from the "permanently forbidden SNPNs" list or "temporarily forbidden SNPNs" list, if the SNPN-specific attempt counter for 3GPP access for the current SNPN has a value greater than zero and less than a UE implementation-specific maximum value and the SNPN identity of the current SNPN is included in any of the "permanently forbidden SNPNs" list or "temporarily forbidden SNPNs" list;

remove the SNPN identity of the current SNPN from the "permanently forbidden SNPNs" list for non-3GPP access or "temporarily forbidden SNPNs" list for non-3GPP access, if the SNPN-specific attempt counter for non-3GPP access that has a value greater than zero and less than a UE implementation-specific maximum value and the SNPN identity of the current SNPN is included in any of the "permanently forbidden SNPNs" list for non-3GPP access or "temporarily forbidden SNPNs" list for non-3GPP access; and re-enable the N1 mode capability for 3GPP access for the entry and, if the SNPN-specific N1 mode attempt counter for 3GPP access has a value greater than zero and less than a UE implementation-specific maximum value, remove the entry index from the list of entries for which N1 mode is not allowed for 3GPP access (see 3GPP TS 23.122);

re-enable the N1 mode capability for non-3GPP access and, if the SNPN-specific N1 mode attempt counter for non-3GPP access has a value greater than zero and less than a UE implementation-specific maximum value, remove the respective entry index from the list of entries for which N1 mode is not allowed for non-3GPP access; and initiate a registration procedure, if still needed, dependent on 5GMM state and 5GS update status, or perform SNPN selection according to 3GPP TS 23.122.

When the UE 102 is switched off:

for each SNPN-specific attempt counter for 3GPP access having a value greater than zero and less than the UE implementation-specific maximum value, the UE 102 can or shall remove the respective SNPN identity from the "permanently forbidden SNPNs" list or "temporarily forbidden SNPNs" list, if available; and for each SNPN-specific attempt counter for non-3GPP access having a value greater than zero and less than the UE implementation-specific maximum value, the UE 102 can or shall remove the respective SNPN identity from the "permanently forbidden SNPNs" list for non-3GPP access or "temporarily forbidden SNPNs" list for non-3GPP access, if available.

When an entry of the "list of subscriber data" is updated:

if the SNPN-specific attempt counter for 3GPP access for the SNPN corresponding to the entry has a value greater than zero and less than the UE implementation-specific maximum value, the UE 102 can or shall remove the SNPN identity corresponding to the entry from the "permanently forbidden SNPNs" list or "temporarily forbidden SNPNs" list, if available; and if the SNPN-specific attempt counter for non-3GPP access for the SNPN corresponding to the entry has a value greater than zero and less than the UE implementation-specific maximum value, the UE 102 can or shall remove the SNPN identity corresponding to the entry from the "permanently forbidden SNPNs" list for non-3GPP access or "temporarily forbidden SNPNs" list for non-3GPP access, if available.

When initial registration with a network is requested by the UE 102 and the network returns a rejection message that includes cause code #27 ("N1 mode not allowed"), for instance, The UE 102 can or shall set the 5GS update status to 5U3 ROAMING NOT ALLOWED (and can or shall store it according to subclause 5.1.3.2.2) and can or shall delete any 5G-GUTI, last visited registered TAI, TAI list and ngKSI. Additionally, the UE 102 can or shall reset the registration attempt counter and can or shall enter the state 5GMM-DEREGISTERED.LIMITED-SERVICE. If the message has been successfully integrity checked by the NAS, the UE 102 can or shall set:

1) the PLMN-specific N1 mode attempt counter for 3GPP access and the PLMN-specific N1 mode attempt counter for non-3GPP access for that PLMN in case of PLMN; or
2) —the SNPN-specific attempt counter for 3GPP access for the current SNPN in case of SNPN;

to the UE implementation-specific maximum value.

The UE 102 can or shall disable the N1 mode capability for the specific access type for which the message was received (see subclause 4.9.3).

If the message has been successfully integrity checked by the NAS, the UE 102 can or shall disable the N1 mode capability also for the other access type for both 3GPP access and non-3GPP access (see subclause 4.9).

If the message was received via 3GPP access and the UE 102 is operating in single-registration mode, the UE 102 can or shall in addition set the EPS update status to EU3 ROAMING NOT ALLOWED and can or shall delete any 4G-GUTI, last visited registered TAI, TAI list and eKSI. Additionally, the UE 102 can or shall reset the attach attempt counter and enter the state EMM-DEREGISTERED.

When initial registration with a network is requested by the UE 102 and the network returns a rejection message that includes cause code #72 ("Non-3GPP access to 5GCN not allowed"), for instance, When received over non-3GPP access the UE 102 can or shall set the 5GS update status to 5U3 ROAMING NOT ALLOWED (and can or shall store it according to subclause 5.1.3.2.2) and can or shall delete 5G-GUTI, last visited registered TAI, TAI list and ngKSI. Additionally, the UE 102 can or shall reset the registration attempt counter and enter the state 5GMM-DEREGISTERED. If the message has been successfully integrity checked by the NAS, the UE 102 can or shall set the PLMN-specific N1 mode attempt counter for non-3GPP access for that PLMN to the UE implementation-specific maximum value.

In some embodiments, the 5GMM sublayer states, the 5GMM parameters, and the registration status are managed per access type independently, e.g., 3GPP access or non-3GPP access.

In some embodiments, the UE 102 can or shall disable the N1 mode capability for non-3GPP access (see subclause 4.9.3).

As an implementation option, the UE 102 may enter the state 5GMM-DEREGISTERED.PLMN-SEARCH in order to perform a PLMN selection according to 3GPP TS 23.122.

If received over 3GPP access the cause can or shall be considered as an abnormal case and the behaviour of the UE 102 for this case is specified in subclause 5.5.1.2.7 of 3GPP TS 24.501.

Referring now to FIG. 8, a method 10 can be provided for managing a device's (e.g., UE 102) network capabilities (e.g., for a 5G network) in a private network (e.g., a SNPN or the like). In some embodiments, the method 10 can be carried out by an apparatus, e.g., the CNA 200 and/or the apparatus 300, which may comprise means, such as a processor, memory storing computer program code, and/or a communications interface, which can cause, at least, maintaining, for a user equipment, a list of subscriber data for one or more networks, the list of subscriber data comprising one or more entries, each of which includes an entry index or a network identity and is used to send a request to a particular network, at 11. In some embodiments, the method 10 can further comprise maintaining one or more counters, for each of the one or more entries, at 12. In some embodiments, the method 10 can further comprise maintaining a list of one or more entry indices of entries which are used to send requests to particular networks not allowing the particular network access mode or a list of one or more network identities of particular networks not allowing the particular network access mode, at 13. In some embodiments, the method 10 can further comprise, in an instance in which a non-integrity protected rejection message to the request is received from the particular network that indicates the particular network does not allow a particular network access mode and a counter value for one of the one or more counters is below a predetermined threshold, disabling the particular network access mode for the entry used to send a request or the particular network, starting a timer, and incrementing the one of the one or more counters associated with the entry, at 14. In some embodiments, the method 10 can further comprise, once the timer expires, in an instance in which a counter value for the one of the one or more counters is below a predetermined threshold, re-enabling the particular network access mode for the entry used to send a request or the particular network, at 15. In some embodiments, the method 10 can further comprise, once the timer expires, in an instance in which the counter value for the one of the one or more counters satisfies the predetermined threshold, including the index of the entry used to send a request or the identity of the particular network in the list of one or more entry indices or the list of one or more network identities. In some embodiments, the particular network access mode comprises one from among a trusted network access mode, an untrusted network access mode, or a non-access stratum interface or protocol. In some embodiments, the one or more networks comprise at least one of a non-public network (NPN), a private network, a standalone non-public network (SNPN), an NPN deployed in conjunction with a public network, an NPN deployed in conjunction with a public land mobile network (PLMN), an NPN deployed in conjunction with a public network using a shared radio access network, an NPN deployed in conjunction with a public network using a shared radio access network and a shared control plane, an NPN deployed in a public network, or an NPN deployed in a PLMN. In some embodiments, the non-integrity protected rejection message comprises an indication that the N1 mode is not allowed for the particular network or an indication that an untrusted network access mode is not allowed for the particular network. In some embodiments, the one or more networks comprise an NPN deployed in conjunction with a PLMN, wherein the user equipment is deployed in a PLMN access mode, and the list of subscriber data comprises a list of PLMNs. In some embodiments, the predetermined threshold for the one of the one or more counters is implementation dependent and specific to the particular network access mode and the indication received in the non-integrity protected rejection message.

Referring now to FIG. 9, a method 20 can be provided for managing a device's (e.g., UE 102) network capabilities (e.g., for a 5G network) in a private network (e.g., a SNPN or the like). In some embodiments, the method 20 can be carried out by an apparatus, e.g., the CNA 200 and/or the apparatus 300, which may comprise means, such as a processor, memory storing computer program code, and/or a communications interface, which can cause, at least, maintaining, for a user equipment, a list of subscriber data for one or more networks, the list of subscriber data comprising one or more entries, each of which includes an entry index or a network identity and is used to send a request to a particular network, at 21. In some embodiments, the method 20 can further comprise maintaining a list of one or more entry indices of entries which are used to send requests to particular networks not allowing the particular network access mode or a list of one or more network identities of particular networks not allowing the particular network access mode, at 22. In some embodiments, the method 20 can further comprise, in an instance in which an integrity protected rejection message to the request is received from the particular network that indicates the particular network does not allow a particular network access mode, disabling the particular network access mode for the entry used to send a request or the particular network, at 23. In some embodiments, the method 20 can further comprise including the index of the entry used to send a request or the identity of the particular network in the list of one or more entry indices or the identity of the particular network in the list of one or more network identities, at 24.

Referring now to FIG. 10, a method 30 can be provided for managing a device's (e.g., UE 102) network capabilities (e.g., for a 5G network) in a private network (e.g., a SNPN or the like). In some embodiments, the method 30 can be carried out by an apparatus, e.g., the CNA 200 and/or the apparatus 300, which may comprise means, such as a processor, memory storing computer program code, and/or a communications interface, which can cause, at least, maintaining, for a user equipment, a list of subscriber data for one or more networks, the list of subscriber data comprising an entry index comprising a list of networks for which one or more network access modes are disabled, at 31. In some embodiments, the method 30 can further comprise maintaining one or more counters, for each of the one or more networks, of access attempts via the one or more network access modes, at 32. In some embodiments, the method 20 can further comprise, in an instance in which a non-integrity protected rejection message is received that indicates a particular network of the one or more networks is not configured for a particular network access mode of the one or more network access modes, disabling the particular network access mode for the particular network, starting a timer, and incrementing one of the one or more counters associated with the particular network, at 33. In some embodiments, the method 30 can further comprise, once the timer expires, in an instance in which a counter value for the one of the one or more counters is below a predetermined threshold, re-enabling the particular network access mode for the particular network, at 34. In some embodiments, the method 30 can further comprise, once the timer expires, in an instance in which the counter value for the one of the one or more counters satisfies the predetermined threshold, removing the respective entry index for the particular access mode for the particular network from the list of subscriber data, at 35.

Referring now to FIG. 11, a method 40 can be provided for managing a device's (e.g., UE 102) network capabilities (e.g., for a 5G network) in a private network (e.g., a SNPN or the like). In some embodiments, the method 40 can be carried out by an apparatus, e.g., the CNA 200 and/or the apparatus 300, which may comprise means, such as a processor, memory storing computer program code, and/or a communications interface, which can cause, compiling a list of networks for which one or more access modes or one or more access types have been disabled at a user equipment, at 41. In some embodiments, the method 40 can further comprise transmitting, from a user equipment to a network entity of a network, via a particular access mode, for a particular access type, an initial registration request message or a service request message, at 42. In some embodiments, the method 40 can further comprise receiving from said network entity, in response to the initial registration request or the service request message, a rejection message comprising an indication of a reason for rejection of the initial registration request message or the service request message, at 43. In some embodiments, the method 40 can further comprise, in an instance in which the reason is that the particular access mode is a N1 access mode and the network entity is not configured for N1 access, determining a number of times the rejection message has been received from the network entity and, if the number of times satisfies a threshold, adding an entry for the network to said list of networks, at 44. In some embodiments, the method 40 can further comprise, in an instance in which the reason is that the particular access type is an untrusted access type and the network is not configured for untrusted access, determining a number of times the rejection message has been received from the network entity and, if the number of times satisfies a threshold, adding an entry for the particular access type, associated with the network, to said list of networks, at 45.

Referring now to FIG. 12, a method 50 can be provided for managing a device's (e.g., UE 102) network capabilities (e.g., for a 5G network) in a private network (e.g., a SNPN or the like). In some embodiments, the method 50 can be carried out by an apparatus, e.g., the CNA 200 and/or the apparatus 300, which may comprise means, such as a processor, memory storing computer program code, and/or a communications interface, which can cause, optionally, retrieving a list of subscriber data for a user equipment and associated with one or more networks, the list of subscriber data comprising one or more entries, each of the one or more entries including an entry index or a network identity, the one or more entries being operable to track sending of a request to a particular network or to track rejections received by the particular network, at 51. In some embodiments, the method 50 can further comprise, optionally, providing one or more counters for each of the one or more entries, at 52. In some embodiments, the method 50 can further comprise, optionally, retrieving a list of one or more entry indices of entries operable to be used to send requests to particular networks not allowing a particular network access mode or a list of one or more network identities of particular networks not allowing the particular network access mode, at 53. In some embodiments, the method 50 can further comprise sending, using a particular entry associated with the particular network and the particular network access mode, a request to the particular network, wherein the request comprises one of an initial registration request or a service request, at 54. In some embodiments, the method 50 can further comprise, in an instance in which, in response to the sending of the request to the particular network, a non-integrity protected rejection message is received from the particular network that indicates the particular network does not allow the particular network access mode, disabling the particular network access mode for the particular entry used to send the request or the particular network, starting a timer, and incrementing a corresponding counter of the one or more counters associated with the particular entry, the corresponding counter being associated with a cause value indicated in the non-integrity protected rejection message, at 55. In some embodiments, the method 50 can further comprise, once the timer expires, in an instance in which a counter value for the corresponding counter of the one or more counters is below a predetermined threshold, re-enabling the particular network access mode for the particular entry used to send the request or the particular network, at 56. In some embodiments, the method 50 can further comprise, e.g., as an alternative to method element 56, once the timer expires, in an instance in which the counter value for the corresponding counter of the one or more counters is equal to or greater than the predetermined threshold, including the index of the particular entry used to send the request or the identity of the particular network in the list of one or more entry indices or the list of one or more network identities, at 57.

As described above, FIGS. 8-12 are flowcharts of methods that can be carried out by an apparatus according to related computer program products comprising computer program code. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device, e.g., 204, of an apparatus, e.g., 200, employing an embodiment of the present invention and executed by processing circuitry, e.g., 202, of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of at least FIGS. 8-12. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

When a conventional user equipment (UE) is accessing a network or requests access to the network and is denied access by the network, the UE may determine that a particular network access approach or interface is disallowed by the network. In such instances, a conventional UE typically must disable that particular network access approach or interface for all networks and/or disable all network access approaches or interfaces for that particular network. The system, apparatus, method, and computer program product described herein are, according to some embodiments, provided to solve at least some of the technical issues faced in conventional and emergent networks. For instance, an improved UE of some embodiments can be provided by physically, configurationally, operatively, and/or functionally modifying a conventional UE, such as a smart phone or the like, such that network capability information can be stored at the embodied UE in a much more granular and organized manner. This increased granularity of network access capabilities, e.g., by generating a hierarchical data storage structure in which subscriber information stores an index of network-specific entries, network access approach-specific, and/or interface-specific entries. In some embodiments, such a structure and the inclusion of such information in subscriber information at the UE may lead to a reduction in the number of instances in which the embodied UE is falsely disabled for a particular network, for a particular network access approach or interface, and/or for a particular network access approach or interface for a particular network. Said otherwise, the embodied apparatus (and/or the embodied method or the embodied computer program product), when practically applied to manage network access capabilities for a UE, can lead to less computational complexity and less messaging between the UE and the network or network entity because the UE does not need to continue requesting access from a network that has disallowed access for the UE. Likewise, the UE may retain a larger network availability and/or have a larger set of network access approaches or interfaces by which the UE can access networks, which leads to improved performance of the UE with regard to, e.g., the speed and availability of messaging between UE of different users, requesting services from a network, the provisioning of services by the network, the handling of emergency services, the downlink/uplink speed and bandwidth (capacity), and the like. Some described embodiments lead to substantial technical improvements of UE, such as a smart phone or another mobile device, when the UE is accessing a network or requesting access to a network, e.g., because the UE may be able to review a list of available networks, determine a particular network or subset of the list of available networks that the UE either knows can be accessed via a particular network access approach or interface or for which the UE does not have any information that the network does not allow a particular network access approach or interface. As such, the UE may send a message, such as an initial registration request or the like, to the particular network or subset of the list of available networks for registration or to request a service without having to use a conventional trial-and-error approach and/or without having to send extraneous messages back and forth between the UE and each of the available networks in order to request information regarding a networks capabilities and/or what access approaches/interfaces are allowed/disallowed by the network. This may also lead the UE to be able to receive a registration acceptance message from a requested network more rapidly because there is a lower likelihood that the network to which the UE requested access is going to deny access. Over time, the UE may continue to update and improve the index of network entries containing network capability information such that the UE may reduce the time required to access a network, receive a provisioned service, send a message, upload/download packets, etc.

As such, described herein are approaches for managing network capabilities for UEs. Embodied UEs may maintain subscriber data that comprises an entry index of networks for which various access modes are enabled/disabled, and a counter for each network/access mode combination. After requesting access to a network, the UE may receive a non-integrity protected rejection message that indicates the network does not allow a particular access mode. Based on the cause of access rejection, the UE can disallow the particular access mode for the network, start a timer, and increment a counter associated with the network/access mode combination. Once the timer expires, if the counter value is below a threshold the UE re-enables the particular access mode for the network, or if the counter value is at or above the threshold, the UE removes the respective entry index for the particular access mode for the network. As such, provided herein are methods, apparatuses, and computer program products in accordance with example embodiments for managing a device's network capabilities in private networks.

In some embodiments, a method can comprise maintaining, for a user equipment, a list of subscriber data for one or more networks, the list of subscriber data comprising one or more entries, each of which includes an entry index or a network identity and is used to send a request to a particular network; maintaining one or more counters, for each of the one or more entries; maintaining a list of one or more entry indices of entries which are used to send requests to particular networks not allowing the particular network access mode or a list of one or more network identities of particular networks not allowing the particular network access mode; in an instance in which a non-integrity protected rejection message to the request is received from the particular network that indicates the particular network does not allow a particular network access mode, disabling the particular network access mode for the entry used to send a request or the particular network, starting a timer, and incrementing the one of the one or more counters associated with the entry; once the timer expires, in an instance in which a counter value for the one of the one or more counters is below a predetermined threshold, re-enabling the particular network access mode for the entry used to send a request or the particular network; and once the timer expires, in an instance in which the counter value for the one of the one or more counters satisfies the predetermined threshold, including the index of the entry used to send a request or the identity of the particular network in the list of one or more entry indices or the list of one or more network identities. In some embodiments, the particular network access mode comprises one from among a trusted network access mode, an untrusted network access mode, or a non-access stratum interface or protocol. In some embodiments, the one or more networks comprise at least one of a non-public network (NPN), a private network, a standalone non-public network (SNPN), an NPN deployed in conjunction with a public network, an NPN deployed in conjunction with a public land mobile network (PLMN), an NPN deployed in conjunction with a public network using a shared radio access network, an NPN deployed in conjunction with a public network using a shared radio access network and a shared control plane, an NPN deployed in a public network, or an NPN deployed in a PLMN. In some embodiments, the non-integrity protected rejection message comprises an indication that the N1 mode is not allowed for the particular network or an indication that an untrusted network access mode is not allowed for the particular network. In some embodiments, the one or more networks comprise an NPN deployed in conjunction with a PLMN, wherein the user equipment is deployed in a PLMN access mode, and the list of subscriber data comprises a list of PLMNs. In some embodiments, the predetermined threshold for the one of the one or more counters is implementation dependent and specific to the particular network access mode and the indication received in the non-integrity protected rejection message.

In some embodiments, an apparatus can comprise at least one processor; and at least one memory including computer program code, the at least one memory and the computer program code configured to, with the at least one processor, cause the apparatus at least to perform: maintaining, for a user equipment, a list of subscriber data for one or more networks, the list of subscriber data comprising one or more entries, each of which includes an entry index or a network identity and is used to send a request to a particular network; maintaining one or more counters, for each of the one or more entries; maintaining a list of one or more entry indices of entries which are used to send requests to particular networks not allowing the particular network access mode or a list of one or more network identities of particular networks not allowing the particular network access mode; in an instance in which a non-integrity protected rejection message to the request is received from the particular network that indicates the particular network does not allow a particular network access mode, disabling the particular network access mode for the entry used to send a request or the particular network, starting a timer, and incrementing the one of the one or more counters associated with the entry; once the timer expires, in an instance in which a counter value for the one of the one or more counters is below a predetermined threshold, re-enabling the particular network access mode for the entry used to send a request or the particular network; and once the timer expires, in an instance in which the counter value for the one of the one or more counters satisfies the predetermined threshold, including the index of the entry used to send a request or the identity of the particular network in the list of one or more entry indices or the list of one or more network identities. In some embodiments, the particular network access mode comprises one from among a trusted network access mode, an untrusted network access mode, or a non-access stratum interface or protocol. In some embodiments, the one or more networks comprise at least one of a non-public network (NPN), a private network, a standalone non-public network (SNPN), an NPN deployed in conjunction with a public network, an NPN deployed in conjunction with a public land mobile network (PLMN), an NPN deployed in conjunction with a public network using a shared radio access network, an NPN deployed in conjunction with a public network using a shared radio access network and a shared control plane, an NPN deployed in a public network, or an NPN deployed in a PLMN. In some embodiments, the non-integrity protected rejection message comprises an indication that the N1 mode is not allowed for the particular network or an indication that an untrusted network access mode is not allowed for the particular network. In some embodiments, the one or more networks comprise an NPN deployed in conjunction with a PLMN, wherein the user equipment is deployed in a PLMN access mode, and the list of subscriber data comprises a list of PLMNs. In some embodiments, the predetermined threshold for the one of the one or more counters is implementation dependent and specific to the particular network access mode and the indication received in the non-integrity protected rejection message.

In some embodiments, an apparatus can comprise means, such as a processor or processing circuitry and a memory storing computer program code, for maintaining, for a user equipment, a list of subscriber data for one or more networks, the list of subscriber data comprising one or more entries, each of which includes an entry index or a network identity and is used to send a request to a particular network; means for maintaining one or more counters, for each of the one or more entries; means for maintaining a list of one or more entry indices of entries which are used to send requests to particular networks not allowing the particular network access mode or a list of one or more network identities of particular networks not allowing the particular network access mode; means for, in an instance in which a non-integrity protected rejection message to the request is received from the particular network that indicates the particular network does not allow a particular network access mode, disabling the particular network access mode for the entry used to send a request or the particular network, starting a timer, and incrementing the one of the one or more counters associated with the entry; means for, once the timer expires, in an instance in which a counter value for the one of the one or more counters is below a predetermined threshold, re-enabling the particular network access mode for the entry used to send a request or the particular network; and means for, once the timer expires, in an instance in which the counter value for the one of the one or more counters satisfies the predetermined threshold, including the index of the entry used to send a request or the identity of the particular network in the list of one or more entry indices or the list of one or more network identities. In some embodiments, the particular network access mode comprises one from among a trusted network access mode, an untrusted network access mode, or a non-access stratum interface or protocol. In some embodiments, the one or more networks comprise at least one of a non-public network (NPN), a private network, a standalone non-public network (SNPN), an NPN deployed in conjunction with a public network, an NPN deployed in conjunction with a public land mobile network (PLMN), an NPN deployed in conjunction with a public network using a shared radio access network, an NPN deployed in conjunction with a public network using a shared radio access network and a shared control plane, an NPN deployed in a public network, or an NPN deployed in a PLMN. In some embodiments, the non-integrity protected rejection message comprises an indication that the N1 mode is not allowed for the particular network or an indication that an untrusted network access mode is not allowed for the particular network. In some embodiments, the one or more networks comprise an NPN deployed in conjunction with a PLMN, wherein the user equipment is deployed in a PLMN access mode, and the list of subscriber data comprises a list of PLMNs. In some embodiments, the predetermined threshold for the one of the one or more counters is implementation dependent and specific to the particular network access mode and the indication received in the non-integrity protected rejection message.

In some embodiments, a computer program product can comprise a non-transitory computer readable medium comprising computer instructions stored thereon for performing at least the following: maintaining, for a user equipment, a list of subscriber data for one or more networks, the list of subscriber data comprising one or more entries, each of which includes an entry index or a network identity and is used to send a request to a particular network; maintaining one or more counters, for each of the one or more entries; maintaining a list of one or more entry indices of entries which are used to send requests to particular networks not allowing the particular network access mode or a list of one or more network identities of particular networks not allowing the particular network access mode; in an instance in which a non-integrity protected rejection message to the request is received from the particular network that indicates the particular network does not allow a particular network access mode, disabling the particular network access mode for the entry used to send a request or the particular network, starting a timer, and incrementing the one of the one or more counters associated with the entry; once the timer expires, in an instance in which a counter value for the one of the one or more counters is below a predetermined threshold, re-enabling the particular network access mode for the entry used to send a request or the particular network; and once the timer expires, in an instance in which the counter value for the one of the one or more counters satisfies the predetermined threshold, including the index of the entry used to send a request or the identity of the particular network in the list of one or more entry indices or the list of one or more network identities. In some embodiments, the particular network access mode comprises one from among a trusted network access mode, an untrusted network access mode, or a non-access stratum interface or protocol. In some embodiments, the one or more networks comprise at least one of a non-public network (NPN), a private network, a standalone non-public network (SNPN), an NPN deployed in conjunction with a public network, an NPN deployed in conjunction with a public land mobile network (PLMN), an NPN deployed in conjunction with a public network using a shared radio access network, an NPN deployed in conjunction with a public network using a shared radio access network and a shared control plane, an NPN deployed in a public network, or an NPN deployed in a PLMN. In some embodiments, the non-integrity protected rejection message comprises an indication that the N1 mode is not allowed for the particular network or an indication that an untrusted network access mode is not allowed for the particular network. In some embodiments, the one or more networks comprise an NPN deployed in conjunction with a PLMN, wherein the user equipment is deployed in a PLMN access mode, and the list of subscriber data comprises a list of PLMNs. In some embodiments, the predetermined threshold for the one of the one or more counters is implementation dependent and specific to the particular network access mode and the indication received in the non-integrity protected rejection message.

In some embodiments, a method can comprise maintaining, for a user equipment, a list of subscriber data for one or more networks, the list of subscriber data comprising one or more entries, each of which includes an entry index or a network identity and is used to send a request to a particular network; maintaining a list of one or more entry indices of entries which are used to send requests to particular networks not allowing the particular network access mode or a list of one or more network identities of particular networks not allowing the particular network access mode; in an instance in which an integrity protected rejection message to the request is received from the particular network that indicates the particular network does not allow a particular network access mode, disabling the particular network access mode for the entry used to send a request or the particular network; and including the index of the entry used to send a request or the identity of the particular network in the list of one or more entry indices or the identity of the particular network in the list of one or more network identities.

In some embodiments, an apparatus can comprise at least one processor; and at least one memory including computer program code, the at least one memory and the computer program code configured to, with the at least one processor, cause the apparatus at least to perform: maintaining, for a user equipment, a list of subscriber data for one or more networks, the list of subscriber data comprising one or more entries, each of which includes an entry index or a network identity and is used to send a request to a particular network; maintaining a list of one or more entry indices of entries which are used to send requests to particular networks not allowing the particular network access mode or a list of one or more network identities of particular networks not allowing the particular network access mode; in an instance in which an integrity protected rejection message to the request is received from the particular network that indicates the particular network does not allow a particular network access mode, disabling the particular network access mode for the entry used to send a request or the particular network; and once the timer expires, including the index of the entry used to send a request or the identity of the particular network in the list of one or more entry indices or the list of one or more network identities.

In some embodiments, an apparatus can comprise means, such as a processor or processing circuitry and a memory storing computer program code, for maintaining, for a user equipment, a list of subscriber data for one or more networks, the list of subscriber data comprising one or more entries, each of which includes an entry index or a network identity and is used to send a request to a particular network; means for maintaining a list of one or more entry indices of entries which are used to send requests to particular networks not allowing the particular network access mode or a list of one or more network identities of particular networks not allowing the particular network access mode; means for, in an instance in which an integrity protected rejection message to the request is received from the particular network that indicates the particular network does not allow a particular network access mode, disabling the particular network access mode for the entry used to send a request or the particular network; and means for, once the timer expires, including the index of the entry used to send a request or the identity of the particular network in the list of one or more entry indices or the list of one or more network identities.

In some embodiments, a computer program product can comprise a non-transitory computer readable medium comprising computer instructions stored thereon for performing at least the following: maintaining, for a user equipment, a list of subscriber data for one or more networks, the list of subscriber data comprising one or more entries, each of which includes an entry index or a network identity and is used to send a request to a particular network; maintaining a list of one or more entry indices of entries which are used to send requests to particular networks not allowing the particular network access mode or a list of one or more network identities of particular networks not allowing the particular network access mode; in an instance in which an integrity protected rejection message to the request is received from the particular network that indicates the particular network does not allow a particular network access mode, disabling the particular network access mode for the entry used to send a request or the particular network; and once the timer expires, including the index of the entry used to send a request or the identity of the particular network in the list of one or more entry indices or the list of one or more network identities.

In some embodiments, a method can comprise maintaining, for a user equipment, a list of subscriber data for one or more networks, the list of subscriber data comprising an entry index comprising a list of networks for which one or more network access modes are disabled; maintaining one or more counters, for each of the one or more networks, of access attempts via the one or more network access modes; in an instance in which a non-integrity protected rejection message is received that indicates a particular network of the one or more networks is not configured for a particular network access mode of the one or more network access modes, disabling the particular network access mode for the particular network, starting a timer, and incrementing one of the one or more counters associated with the particular network; once the timer expires, in an instance in which a counter value for the one of the one or more counters is below a predetermined threshold, re-enabling the particular network access mode for the particular network; and once the timer expires, in an instance in which the counter value for the one of the one or more counters satisfies the predetermined threshold, removing the respective entry index for the particular access mode for the particular network from the list of subscriber data.

In some embodiments, an apparatus can comprise at least one processor; and at least one memory including computer program code, the at least one memory and the computer program code configured to, with the at least one processor, cause the apparatus at least to perform: maintaining, for a user equipment, a list of subscriber data for one or more networks, the list of subscriber data comprising an entry index comprising a list of networks for which one or more network access modes are disabled; maintaining one or more counters, for each of the one or more networks, of access attempts via the one or more network access modes; in an instance in which a non-integrity protected rejection message is received that indicates a particular network of the one or more networks is not configured for a particular network access mode of the one or more network access modes, disabling the particular network access mode for the particular network, starting a timer, and incrementing one of the one or more counters associated with the particular network; once the timer expires, in an instance in which a counter value for the one of the one or more counters is below a predetermined threshold, re-enabling the particular network access mode for the particular network; and once the timer expires, in an instance in which the counter value for the one of the one or more counters satisfies the predetermined threshold, removing the respective entry index for the particular access mode for the particular network from the list of subscriber data.

In some embodiments, an apparatus can comprise means, such as a processor or processing circuitry and a memory storing computer program code, for maintaining, for a user equipment, a list of subscriber data for one or more networks, the list of subscriber data comprising an entry index comprising a list of networks for which one or more network access modes are disabled; means for maintaining one or more counters, for each of the one or more networks, of access attempts via the one or more network access modes; means for, in an instance in which a non-integrity protected rejection message is received that indicates a particular network of the one or more networks is not configured for a particular network access mode of the one or more network access modes, disabling the particular network access mode for the particular network, starting a timer, and incrementing one of the one or more counters associated with the particular network; means for, in an instance in which a counter value for the one of the one or more counters is below a predetermined threshold once the timer expires, re-enabling the particular network access mode for the particular network; and means for, in an instance in which the counter value for the one of the one or more counters satisfies the predetermined threshold once the timer expires, removing the respective entry index for the particular access mode for the particular network from the list of subscriber data.

In some embodiments, a computer program product can comprise a non-transitory computer readable medium comprising computer instructions stored thereon for performing at least the following: maintaining, for a user equipment, a list of subscriber data for one or more networks, the list of subscriber data comprising an entry index comprising a list of networks for which one or more network access modes are disabled; maintaining one or more counters, for each of the one or more networks, of access attempts via the one or more network access modes; in an instance in which a non-integrity protected rejection message is received that indicates a particular network of the one or more networks is not configured for a particular network access mode of the one or more network access modes, disabling the particular network access mode for the particular network, starting a timer, and incrementing one of the one or more counters associated with the particular network; once the timer expires, in an instance in which a counter value for the one of the one or more counters is below a predetermined threshold, re-enabling the particular network access mode for the particular network; and once the timer expires, in an instance in which the counter value for the one of the one or more counters satisfies the predetermined threshold, removing the respective entry index for the particular access mode for the particular network from the list of subscriber data.

In some embodiments, a method can comprise compiling a list of networks for which one or more access modes or one or more access types have been disabled at a user equipment; transmitting, from a user equipment to a network entity of a network, via a particular access mode, for a particular access type, an initial registration request message or a service request message; receiving from said network entity, in response to the initial registration request or the service request message, a rejection message comprising an indication of a reason for rejection of the initial registration request message or the service request message; in an instance in which the reason is that the particular access mode is a N1 access mode and the network entity is not configured for N1 access, determining a number of times the rejection message has been received from the network entity and, if the number of times satisfies a threshold, adding an entry for the network to said list of networks; and, in an instance in which the reason is that the particular access type is an untrusted access type and the network is not configured for untrusted access, determining a number of times the rejection message has been received from the network entity and, if the number of times satisfies a threshold, adding an entry for the particular access type, associated with the network, to said list of networks.

In some embodiments, an apparatus can comprise at least one processor; and at least one memory including computer program code, the at least one memory and the computer program code configured to, with the at least one processor, cause the apparatus at least to perform: compiling a list of networks for which one or more access modes or one or more access types have been disabled at a user equipment; transmitting, from a user equipment to a network entity of a network, via a particular access mode, for a particular access type, an initial registration request message or a service request message; receiving from said network entity, in response to the initial registration request or the service request message, a rejection message comprising an indication of a reason for rejection of the initial registration request message or the service request message; in an instance in which the reason is that the particular access mode is a N1 access mode and the network entity is not configured for N1 access, determining a number of times the rejection message has been received from the network entity and, if the number of times satisfies a threshold, adding an entry for the network to said list of networks; and, in an instance in which the reason is that the particular access type is an untrusted access type and the network is not configured for untrusted access, determining a number of times the rejection message has been received from the network entity and, if the number of times satisfies a threshold, adding an entry for the particular access type, associated with the network, to said list of networks.

In some embodiments, an apparatus can comprise means, such as a processor or processing circuitry and a memory storing computer program code, for compiling a list of networks for which one or more access modes or one or more access types have been disabled at a user equipment; means for transmitting, from a user equipment to a network entity of a network, via a particular access mode, for a particular access type, an initial registration request message or a service request message; means for receiving from said network entity, in response to the initial registration request or the service request message, a rejection message comprising an indication of a reason for rejection of the initial registration request message or the service request message; means for, in an instance in which the reason is that the particular access mode is a N1 access mode and the network entity is not configured for N1 access, determining a number of times the rejection message has been received from the network entity and, if the number of times satisfies a threshold, adding an entry for the network to said list of networks; and means for, in an instance in which the reason is that the particular access type is an untrusted access type and the network is not configured for untrusted access, determining a number of times the rejection message has been received from the network entity and, if the number of times satisfies a threshold, adding an entry for the particular access type, associated with the network, to said list of networks.

In some embodiments, a computer program product can comprise a non-transitory computer readable medium comprising computer instructions stored thereon for performing at least the following: compiling a list of networks for which one or more access modes or one or more access types have been disabled at a user equipment; transmitting, from a user equipment to a network entity of a network, via a particular access mode, for a particular access type, an initial registration request message or a service request message; receiving from said network entity, in response to the initial registration request or the service request message, a rejection message comprising an indication of a reason for rejection of the initial registration request message or the service request message; in an instance in which the reason is that the particular access mode is a N1 access mode and the network entity is not configured for N1 access, determining a number of times the rejection message has been received from the network entity and, if the number of times satisfies a threshold, adding an entry for the network to said list of networks; and, in an instance in which the reason is that the particular access type is an untrusted access type and the network is not configured for untrusted access, determining a number of times the rejection message has been received from the network entity and, if the number of times satisfies a threshold, adding an entry for the particular access type, associated with the network, to said list of networks.

In some embodiments, a method can comprise retrieving a list of subscriber data for a user equipment and associated with one or more networks, the list of subscriber data comprising one or more entries, each of the one or more entries including an entry index or a network identity, the one or more entries being operable to track sending of a request to a particular network or to track rejections received by the particular network; providing one or more counters for each of the one or more entries; retrieving a list of one or more entry indices of entries operable to be used to send requests to particular networks not allowing a particular network access mode or a list of one or more network identities of particular networks not allowing the particular network access mode; sending, using a particular entry associated with the particular network and the particular network access mode, a request to the particular network, wherein the request comprises one of an initial registration request or a service request; in an instance in which, in response to the sending of the request to the particular network, a non-integrity protected rejection message is received from the particular network that indicates the particular network does not allow the particular network access mode, disabling the particular network access mode for the particular entry used to send the request or the particular network, starting a timer, and incrementing a corresponding counter of the one or more counters associated with the particular entry, the corresponding counter being associated with a cause value indicated in the non-integrity protected rejection message; and, once the timer expires, in an instance in which a counter value for the corresponding counter of the one or more counters is below a predetermined threshold, re-enabling the particular network access mode for the particular entry used to send the request or the particular network; or, once the timer expires, in an instance in which the counter value for the corresponding counter of the one or more counters is equal to or greater than the predetermined threshold, including the index of the particular entry used to send the request or the identity of the particular network in the list of one or more entry indices or the list of one or more network identities.

In some embodiments, an apparatus can comprise at least one processor; and at least one memory including computer program code, the at least one memory and the computer program code configured to, with the at least one processor, cause the apparatus at least to perform: retrieving a list of subscriber data for a user equipment and associated with one or more networks, the list of subscriber data comprising one or more entries, each of the one or more entries including an entry index or a network identity, the one or more entries being operable to track sending of a request to a particular network or to track rejections received by the particular network; providing one or more counters for each of the one or more entries; retrieving a list of one or more entry indices of entries operable to be used to send requests to particular networks not allowing a particular network access mode or a list of one or more network identities of particular networks not allowing the particular network access mode; sending, using a particular entry associated with the particular network and the particular network access mode, a request to the particular network, wherein the request comprises one of an initial registration request or a service request; in an instance in which, in response to the sending of the request to the particular network, a non-integrity protected rejection message is received from the particular network that indicates the particular network does not allow the particular network access mode, disabling the particular network access mode for the particular entry used to send the request or the particular network, starting a timer, and incrementing a corresponding counter of the one or more counters associated with the particular entry, the corresponding counter being associated with a cause value indicated in the non-integrity protected rejection message; and once the timer expires, in an instance in which a counter value for the corresponding counter of the one or more counters is below a predetermined threshold, re-enabling the particular network access mode for the particular entry used to send the request or the particular network; or once the timer expires, in an instance in which the counter value for the corresponding counter of the one or more counters is equal to or greater than the predetermined threshold, including the index of the particular entry used to send the request or the identity of the particular network in the list of one or more entry indices or the list of one or more network identities.

In some embodiments, an apparatus can comprise means, such as a processor or processing circuitry and a memory storing computer program code, for retrieving a list of subscriber data for a user equipment and associated with one or more networks, the list of subscriber data comprising one or more entries, each of the one or more entries including an entry index or a network identity, the one or more entries being operable to track sending of a request to a particular network or to track rejections received by the particular network; means for providing one or more counters for each of the one or more entries; means for retrieving a list of one or more entry indices of entries operable to be used to send requests to particular networks not allowing a particular network access mode or a list of one or more network identities of particular networks not allowing the particular network access mode; means for sending, using a particular entry associated with the particular network and the particular network access mode, a request to the particular network, wherein the request comprises one of an initial registration request or a service request; means for, in an instance in which, in response to the sending of the request to the particular network, a non-integrity protected rejection message is received from the particular network that indicates the particular network does not allow the particular network access mode, disabling the particular network access mode for the particular entry used to send the request or the particular network, starting a timer, and incrementing a corresponding counter of the one or more counters associated with the particular entry, the corresponding counter being associated with a cause value indicated in the non-integrity protected rejection message; and means for, once the timer expires, in an instance in which a counter value for the corresponding counter of the one or more counters is below a predetermined threshold, re-enabling the particular network access mode for the particular entry used to send the request or the particular network; or means for, once the timer expires, in an instance in which the counter value for the corresponding counter of the one or more counters is equal to or greater than the predetermined threshold, including the index of the particular entry used to send the request or the identity of the particular network in the list of one or more entry indices or the list of one or more network identities.

In some embodiments, a computer program product can comprise a non-transitory computer readable medium comprising computer instructions stored thereon for performing at least the following: retrieving a list of subscriber data for a user equipment and associated with one or more networks, the list of subscriber data comprising one or more entries, each of the one or more entries including an entry index or a network identity, the one or more entries being operable to track sending of a request to a particular network or to track rejections received by the particular network; providing one or more counters for each of the one or more entries; retrieving a list of one or more entry indices of entries operable to be used to send requests to particular networks not allowing a particular network access mode or a list of one or more network identities of particular networks not allowing the particular network access mode; sending, using a particular entry associated with the particular network and the particular network access mode, a request to the particular network, wherein the request comprises one of an initial registration request or a service request; in an instance in which, in response to the sending of the request to the particular network, a non-integrity protected rejection message is received from the particular network that indicates the particular network does not allow the particular network access mode, disabling the particular network access mode for the particular entry used to send the request or the particular network, starting a timer, and incrementing a corresponding counter of the one or more counters associated with the particular entry, the corresponding counter being associated with a cause value indicated in the non-integrity protected rejection message; and once the timer expires, in an instance in which a counter value for the corresponding counter of the one or more counters is below a predetermined threshold, re-enabling the particular network access mode for the particular entry used to send the request or the particular network; or once the timer expires, in an instance in which the counter value for the corresponding counter of the one or more counters is equal to or greater than the predetermined threshold, including the index of the particular entry used to send the request or the identity of the particular network in the list of one or more entry indices or the list of one or more network identities.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation. Any application, publication, technical document, or the like that is cited in this disclosure is hereby incorporated herein by reference in its entirety for all purposes.

The embodiments described herein have been particularly shown and described, but it will be understood that various changes in form and details may be made. Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems, apparatuses, or methods of the present disclosure.

As used herein, the term "about" and "approximately" generally mean plus or minus 10% of the value stated, for example about 250 µm would include 225 µm to 275 µm, approximately 1,000 µm would include 900 µm to 1,100 µm.

Conventional terms in the fields of telecommunications, network engineering, electrical engineering, computer science, and software engineering have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is adapted to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, technical documents, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

That which is claimed is:

1. A method comprising:
    maintaining, at a user equipment, a list of subscriber data for one or more standalone non-public networks (SNPNs), the list of subscriber data comprising one or more entries, wherein respective entries of the one or more entries includes a respective SNPN identity that is usable by the user equipment when sending requests to a particular SNPN of the one or more SNPNs associated with the respective SNPN identity;
    maintaining, at the user equipment, for respective entries of the one or more entries, one or more counters;
    maintaining, at the user equipment, a list of one or more SNPNs that disallow N1 mode;

in an instance in which a non-integrity protected rejection message is received in response to a request sent to a particular SNPN and the non-integrity protected rejection message comprises an indication that the particular SNPN disallows N1 mode,
disabling a N1 mode capability of the user equipment,
causing the user equipment to enter a PLMN.SEARCH state,
including an SNPN identity of the particular SNPN in the list of one or more entries including one or more SNPN identities maintained at the user equipment,
starting a timer maintained at the user equipment, and
incrementing a particular counter of the one or more counters maintained at the user equipment, the particular counter being associated with an entry used by the user equipment for sending the request to the particular SNPN;
upon expiration of the timer, re-enabling the N1 mode capability at the user equipment; and
in an instance in which a counter value for the particular counter of the one or more counters maintained at the user equipment is below a predetermined threshold, removing the SNPN identity of the particular SNPN associated with the entry used for sending the request to the particular SNPN from the list including the of one or more SNPN identities maintained at the user equipment.

2. The method of claim 1, wherein the predetermined threshold for the particular counter of the one or more counters maintained at the user equipment is implementation dependent.

3. The method of claim 1, wherein the predetermined threshold for the particular counter of the one or more counters maintained at the user equipment is specific to N1 mode and the indication received in the non-integrity protected rejection message.

4. A user equipment comprising:
at least one processor; and
at least one memory comprising instructions stored thereon that, when executed by the at least one processor, cause the user equipment to perform at least:
maintaining a list of subscriber data for one or more standalone non-public networks (SNPNs), the list of subscriber data comprising one or more entries, wherein respective entries of the one or more entries includes a respective SNPN identity that is to be used when sending requests to a particular SNPN;
maintaining, for respective entries of the one or more entries, one or more counters;
maintaining a list of one or more SNPN identities that disallow N1 mode;
in an instance in which a non-integrity protected rejection message is received in response to a request sent to the particular SNPN and the non-integrity protected rejection message comprises an indication that the particular SNPN disallows N1 mode,
disabling a N1 mode capability of the user equipment,
causing the user equipment to enter a PLMN.SEARCH state,
including an SNPN identity of the particular SNPN in the list of the one or more entries including one or more SNPN identities maintained at the user equipment,
starting a timer maintained at the user equipment, and
incrementing a particular counter of the one or more counters, the particular counter being associated with the entry used by the user equipment to send the request to the particular SNPN;
upon expiration of the timer, re-enabling the N1 mode capability of the user equipment; and
in an instance in which a counter value for the particular counter of the one or more counters maintained at the user equipment is below a predetermined threshold, removing the SNPN identity of the particular SNPN associated with the entry used for sending the request to the particular SNPN from the list including the one or more SNPN identities maintained at the user equipment.

5. The user equipment of claim 4, wherein the predetermined threshold for the particular counter of the one or more counters maintained at the user equipment is implementation dependent.

6. The user equipment of claim 4, wherein the predetermined threshold for the particular counter of the one or more counters maintained at the user equipment is specific to N1 mode and the indication received in the non-integrity protected rejection message.

7. An apparatus comprising:
at least one processor; and
at least one memory storing instructions thereon that, when executed by the at least one processor, cause the apparatus to perform at least:
maintaining, for a user equipment, a list of subscriber data for one or more standalone non-public networks (SNPNs), the list of subscriber data comprising one or more entries, wherein respective entries of the one or more entries includes an SNPN identity and is used by the user equipment when sending a requests to a particular SNPN;
maintaining, for the user equipment, a list of one or more SNPNs that disallow N1 mode;
in an instance in which a non-integrity protected rejection message is received in response to a request sent to a particular SNPN and the integrity-protected rejection message comprises an indication that the particular SNPN disallows N1 mode,
disabling N1 capability, and
including the SNPN identity of the particular SNPN in the list of one or more SNPN identities,
wherein the non-integrity protected rejection message is operable to cause the user equipment to
cause the user equipment to enter a PLMN.SEARCH state,
start a timer at the user equipment, and
increment a counter at the user equipment, the counter being associated with an entry used by the user equipment to send the request to the particular SNPN.

8. The apparatus of claim 7, wherein the predetermined threshold for the particular counter of the one or more counters maintained at the user equipment is implementation dependent.

9. The apparatus of claim 7, wherein the predetermined threshold for the particular counter of the one or more counters maintained at the user equipment is specific to N1 mode and the indication received in the non-integrity protected rejection message.

* * * * *